US010228449B2

(12) United States Patent
Nguyen et al.

(10) Patent No.: US 10,228,449 B2
(45) Date of Patent: Mar. 12, 2019

(54) METHOD AND SYSTEM FOR JOINTLY SEPARATING NOISE FROM SIGNALS

(71) Applicant: U.S. Army Research Laboratory ATTN: RDRL-LOC-I, Adelphi, MD (US)

(72) Inventors: Lam H. Nguyen, Laurel, MD (US); Trac D. Tran, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 139 days.

(21) Appl. No.: 15/175,886

(22) Filed: Jun. 7, 2016

(65) Prior Publication Data

US 2016/0341814 A1 Nov. 24, 2016

Related U.S. Application Data

(63) Continuation-in-part of application No. 14/452,902, filed on Aug. 6, 2014, now Pat. No. 9,363,024, which
(Continued)

(51) Int. Cl.
*G01S 7/02* (2006.01)
*H04L 27/00* (2006.01)
(Continued)

(52) U.S. Cl.
CPC .......... *G01S 7/023* (2013.01); *G01S 13/0209* (2013.01); *G01S 13/90* (2013.01);
(Continued)

(58) Field of Classification Search
CPC ...... G01S 7/023; G01S 13/0209; G01S 13/90; H04L 27/0004; H04B 17/345; H04B 1/71632
See application file for complete search history.

(56) References Cited

U.S. PATENT DOCUMENTS 5,057,843 A * 10/1991 Dubois ................... G01S 13/90
342/188
5,805,098 A 9/1998 McCorkle
(Continued)

FOREIGN PATENT DOCUMENTS

EP 2667555 A1 * 11/2013 ......... H04L 25/0206

OTHER PUBLICATIONS

Lam H. Nguyen, Trac Tran, "Estimation and Extraction of Radio-Frequency Interference from Ultra-Wideband Radar Signals," IEEE Geoscience and Remote Sensing Symposium (IGARSS), Date of conference Jul. 26-31, 2015. Date Added to IEEE Xplore: Nov. 12, 2015; Electronic ISBN: 978-1-4799-7929-5. pp. 2848-2861.
(Continued)

*Primary Examiner* — Bernarr E Gregory
(74) *Attorney, Agent, or Firm* — Lawrence E. Anderson; Alan I. Kalb

(57) ABSTRACT

A system for reception of electromagnetic waves in a spectrum in which interference with radio frequencies of other electronics devices occurs comprising a transmitter; at least one receiver configured to receive the received signal; each received signal organized into a digital vector; at least one memory portion configured to store a plurality of received signals in a vector form; the vectors being combined into a matrix, each vector of the matrix being a digital data record representing a received signal; at least one processor operatively connected to the at least one memory portion; the at least one processor configured to estimate that portion of the received signal attributable to noise; the at least one processor operating to jointly estimate a minimal number of distinctive noise patterns and minimize the simplicity of the data of interest; the at least processor operating to process the noise and data of interest separately.

20 Claims, 36 Drawing Sheets
(30 of 36 Drawing Sheet(s) Filed in Color)

Related U.S. Application Data is a continuation-in-part of application No. 13/891,050, filed on May 9, 2013, now Pat. No. 9,172,476, which is a continuation-in-part of application No. 13/477,282, filed on May 22, 2012, now Pat. No. 8,824,544, which is a continuation-in-part of application No. 13/416,062, filed on Mar. 9, 2012, now Pat. No. 8,861,588.

(51) Int. Cl.
| | |
|---|---|
| G01S 13/02 | (2006.01) |
| G01S 13/90 | (2006.01) |
| H04B 17/345 | (2015.01) |
| H04B 1/7163 | (2011.01) |
| G01S 13/00 | (2006.01) |

(52) U.S. Cl.
CPC ...... *H04L 27/0004* (2013.01); *H04B 1/71632* (2013.01); *H04B 17/345* (2015.01)

(56) References Cited

U.S. PATENT DOCUMENTS

| | | | | |
|---|---|---|---|---|
| 5,841,395 | A * | 11/1998 | Simone | G01S 13/5244 342/196 |
| 6,292,592 | B1 * | 9/2001 | Braunreiter | G01S 7/295 342/90 |
| 7,787,555 | B2 * | 8/2010 | Kim | H04B 7/0434 375/260 |
| 7,796,829 | B2 | 9/2010 | Nguyen et al. | |
| 8,824,544 | B2 | 9/2014 | Nguyen et al. | |
| 8,861,588 | B2 | 10/2014 | Nguyen et al. | |
| 9,172,476 | B2 | 10/2015 | Nguyen et al. | |
| 9,363,024 | B2 | 6/2016 | Nguyen et al. | |
| 2003/0071750 | A1 * | 4/2003 | Benitz | G01S 13/9011 342/25 R |
| 2011/0012787 | A1 * | 1/2011 | Na | H01Q 3/2605 342/373 |
| 2012/0112954 | A1 * | 5/2012 | Kurono | G01S 13/42 342/147 |
| 2012/0249361 | A1 * | 10/2012 | Sahinoglu | G01S 7/292 342/159 |

OTHER PUBLICATIONS

Lam H Nguyen, Trac D Tran, Thong T Do, "Sparse Models and Sparse Recovery for Ultra-wideband SAR Applications," IEEE Transactions on Aerospace and Electronic Systems, vol. 50, issue 2, Apr. 2014, pp. 940-958. Date of publication Jul. 21, 2014.
Lam Nguyen, Trac Tran, "Robust and Adaptive Extraction of RFI Signals from Ultra-Wideband Radar Data," IEEE Xplore, IEEE International Geoscience and Remote Sensing (IGARSS), Jul. 2012. INSPEC Accession No. 13133803 DOI: 10.1109/IGARSS.2012.6352017; IGARSS 2012 p. 7137.
T. Miller, L. Potter, and J. Mccorkle, "RFI Suppression for Ultra Wideband Radar," IEEE Transactions on Aerospace and Electronic Systems, vol. 33, No. 4, pp. 1142-1157 Oct. 4, 1997.
T. T. Do, L. Gan, N. H. Nguyen, and T. D. Tran, "Sparsity adaptive matching pursuit algorithm for practical compressed sensing," in Proc. Asilomar Conf. on Signals, Systems, and Computers, pp. 581-587, Pacific Grove (Oct. 2008).
B.. R. Crowgey, E. J. Rothwell, L. C. Kempel, and E. L. Mokole, "Comparison of UWB short-pulse and stepped-frequency radar systems for imaging through barriers," Progress in Electromagnetics Research, vol. 110, pp. 403-419, (2010).
S.-E. Hamran, "Radar performance of ultra wideband waveforms," INTECH Open Access Publisher (2010).
L.H. Nguyen, K. Kappra, D. Wong, R. Kapoor, and J. Sichina, "Mine field detection algorithm utilizing data from an ultrawideband wide-area surveillance radar," Proc. SPIE Int. Soc. Opt. Eng., vol. 3392, 627, (1998).
L. H. Nguyen, M. Ressler, and J. Sichina, "Sensing through the wall imaging using the Army Research Lab ultra-wideband synchronous impulse reconstruction (UWB SIRE) radar," Proceedings of SPIE, vol. 6947, 69470B (2008)~.
T. Koutsoudis and L. A. Lovas, "RF interference suppression in ultrawideband radar receivers," Proc. of the SPIE, Int. Symp. on Algorithms for Synthetic Aperture Radar Imagery II, vol. 2487, pp. 107-118, Orlando, FL, Apr. (1995).
D. O. Carhoun, "Adaptive nulling and spatial spectral estimation using an iterated principal components decomposition," Proc. of the International Conference on Acoustics, Speech, and Signal Processing, pp. 3309-3312, Toronto (1991).
H. Subbaram and K. Abend, "Interference suppression via orthogonal projections: a performance analysis," IEEE Transactions on Antennas and Propagation, vol. 41, pp. 1187-1194, Sep. 1993.
X.-Y. Wang, W.-D. Yu, X.-Y. Qi and Y. Liu, "RFI suppression in SAR based on approximated spectral decomposition algorithm," Electronics Letters, vol. 48, (May 2012).
F. Zhou, M. Tao, and X. Bai, "Narrow-band interference suppression for SAR based on independent component analysis," IEEE Trans. on Geoscience and Remote Sensing, vol. 51, pp. 4952-4960, (Oct. 2013).
F. Zhou and M. Tao, "Research on Methods for Narrow-Band Interference Suppression in Synthetic Aperture Radar Data," IEEE Journal of Selected Topics in Applied Earth Observations and Remote Sensing, vol. 8, No. 7, pp. 3476-3485, (Jul. 2015).
C. Yu, Y. Zhang, Z. Dong, and D. Liang, "Eigen-decomposition method for RFI Suppression Applied to SAR data," Proc. of IEEE Int. Conf. on Multimedia Technology (ICMT), pp. 1-4, (2010).
E. J. Candes and T. Tao, "Near optimal signal recovery from random projections: universal encoding strategies?" IEEE Trans. on Information Theory, vol. 52, pp. 5406-5425, (Dec. 2006).
E. J. Candes and T. Tao, "Decoding by linear programming," IEEE Trans. on Information Theory, vol. 51, pp. 4203-4215 ( Dec. 2005).
D. Donoho, "Compressed sensing," IEEE Trans. on Information Theory, vol. 52, pp. 1289-1306, (Apr. 2006).
E. J. Candes, J. Romberg, and T. Tao, "Robust uncertainty principles: exact signal reconstruction from highly incomplete frequency information," IEEE Trans. on Information Theory, vol. 52, pp. 489-509, (Feb. 2006).
R. Baraniuk and P. Steeghs, "Compressive radar imaging," Proc. IEEE Radar Conference,, Waltham, pp. 128-133, (Apr. 2007).
M. Herman and T. Strohmer, "Compressed sensing radar," Proc. IEEE Acoustics, Speech and Signal Processing, pp. 1509-1512, (May 2008).
L. C. Potter, E. Ertin, J. T. Parker, and M. Cetin. "Sparsity and compressed sensing in radar imaging." Proceedings of the IEEE 98, No. 6, pp. 1006-1020, (Jun. 2010).
M. A. T. Figueiredo, R. D. Nowak, and S. J. Wright, "Gradient projection for sparse reconstruction: Application to compressed sensing and other inverse problems," IEEE Journal of Selected Topics in Signal Processing: Special Issue on Convex Optimization Methods for Signal Processing, vol. 1, No. 4, pp. 586-598 (Apr. 2007).
J. Tropp and A. Gilbert, "Signal recovery from random measurements via orthogonal matching pursuit," IEEE Trans. on Information Theory, vol. 53, No. 12, pp. 4655-4666 (Dec. 2007).
D. Needell and R. Vershynin, "Signal recovery from incomplete and inaccurate measurements via regularized orthogonal matching pursuit," IEEE Journal of Selected Topics in Signal Processing, vol. 4, pp. 310-316 (Apr. 2010).
W. Dai and O. Milenkovic, "Subspace pursuit for compressive sensing: Closing the gap between performance and complexity," IEEE Trans. on Information Theory, vol. 55, pp. 2230-2249 (May 2009).

\* cited by examiner

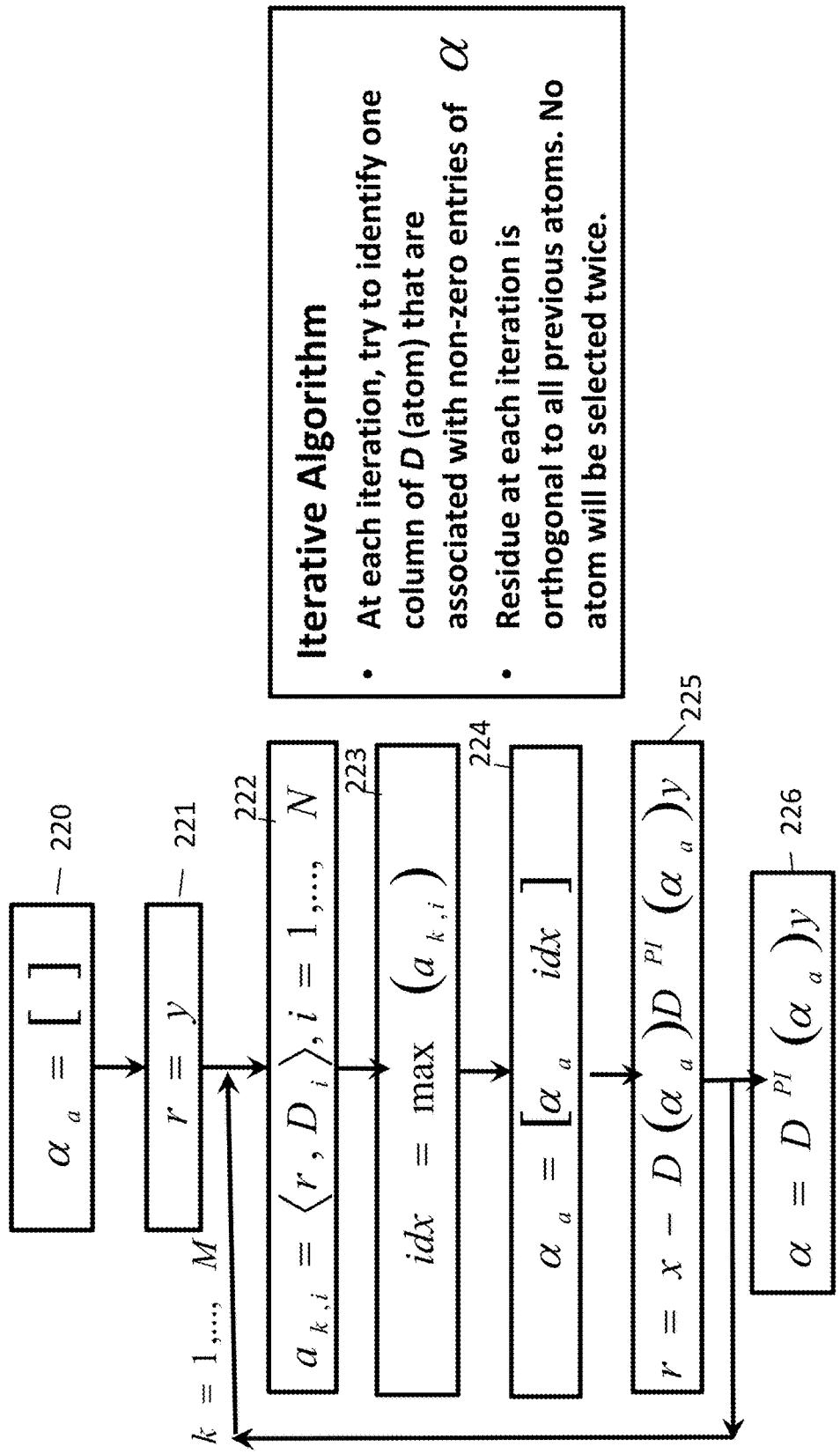
FIG. 4 Block Diagram of Orthogonal Matching Pursuit (OMP) Algorithm

FIG. 7 Raw (Before Imaging) Radar Data with Interference Noise

FIG. 17 Flowgraph of the noise-source separation algorithm in the present invention RFI suppression performance using simulation data injected with RFI data. The SAR signal to RFI noise ratio in this case is -20 dB. Spectrum of SAR, RFI, and SAR plus RFI signals in this experiment (e) SAR image after RFI suppression using the PCA technique: processing gain = -4.16 dB; SNR = -11 dB.

(f) SAR image after RFI suppression using the MSR technique: processing gain = 22.83 dB; SNR = 16.14 dB.

(g) SAR image after RFI suppression using the proposed SLS technique: processing gain = 19.69 dB; SNR = 13.00 dB.

RFI suppression performance using data from the ARL side-looking UWB BoomSAR radar and real RFI data. The signal to RFI noise ratio in this case is -20 dB. Spectrum of SAR, RFI, and SAR plus RFI signals in this experiment.

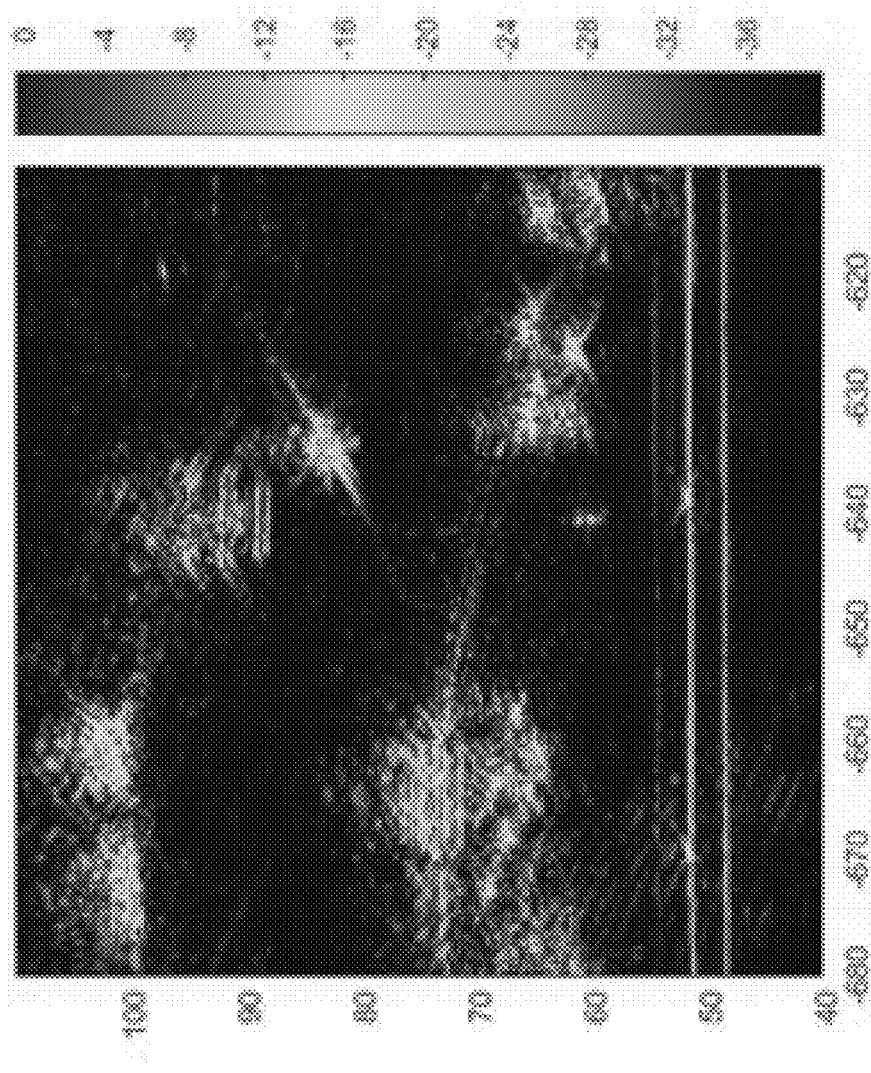
FIG. 20B  Original SAR image.

SAR image after RFI extraction using the notch filtering technique: processing gain = 10.67 dB; SNR = -3.62 dB.

SAR image after RFI extraction using the PCA technique: processing gain = 5.77 dB SAR image after RFI extraction using the MSR technique: processing gain = 19.45 dB SAR image after RFI extraction using the Low-Rank and Sparse Recovery technique: processing gain = 20.56 dB More detailed higher-noise level SAR image with a small value of λ

Less detailed with lower noise level SAR image with a large value of λ

METHOD AND SYSTEM FOR JOINTLY SEPARATING NOISE FROM SIGNALS

CROSS REFERENCE TO RELATED APPLICATIONS

This application is a continuation-in-part of and claims priority to U.S. patent Ser. No. 14/452,902 ('902 application)(ARL 11-77 CIP3), now U.S. Pat. No. 9,363,024, entitled "Method and System for Estimation and Extraction of Interference Noise From Signals" filed Aug. 6, 2014, through which priority is claimed to U.S. patent application Ser. No. 13/891,050, entitled "Method and System for Removal of Noise in Signal," by Lam H, Nguyen and Trac D. Tran filed May 9, 2013 (ARL 11-77 CIP2), now U.S. Pat. No. 9,172,476, which is a continuation-in-part of and claims priority to U.S. patent application Ser. No. 13/477,282 (U.S. Pat. No. 8,824,544) entitled "Method and System for Recovery of Missing Spectral Information in Wideband Signal" by Lam H. Nguyen and Thong Do filed May 22, 2012 (ARL 11-77CIP), now U.S. Pat. No. 8,824,544, which is a continuation-in-part and claims priority to U.S. patent application Ser. No. 13/416,062 (U.S. Pat. No. 8,861,588) entitled "Apparatus and Method for Sampling and Reconstruction of Wide Bandwidth Signals below Nyquist Rate," by Lam H. Nguyen and Trac D. Tran filed Mar. 9, 2012, now U.S. Pat. No. 8,861,588, all of which are hereby incorporated by reference.

STATEMENT OF GOVERNMENT INTEREST

The embodiments herein may be manufactured, used, and/or licensed by or for the United States Government without the payment of royalties thereon.

BACKGROUND OF THE INVENTION

The present invention relates to, Inter alia, noise extraction from a signal. The signal may be used, for example, in the generation of images from projection measurements. Examples of images generated from projection measurements include two-dimensional and three-dimensional SAR (synthetic aperture radar) systems, such as that disclosed in U.S. Pat. No. 5,805,098 to McCorkle, hereby incorporated by reference, wherein an aircraft mounted detector array is utilized to take ground radar measurements. Other examples of systems relating to noise extraction from a signal include fault inspection systems using acoustic imaging, submarine sonar for imaging underwater objects, imaging systems for tunnel detection, oil exploration, geological surveys, etc., and medical diagnostic tools such as sonograms, echocardiograms, x-ray CAT (computer-aided tomography) equipment and MRI (magnetic resonance imaging) equipment.

The U.S. Army has been developing low-frequency ultra-wideband systems to detect targets in foliage, explosive devices buried in the ground, moving targets behind walls or barriers (sensing-through-the-wall). Such systems operate in the low-frequency spectrum than spans from under 100 MHz to several GHz in order to have penetration capability while maintaining high image resolution. Therefore, these systems must operate in the low-frequency spectrum that spans from under 100 MHz to several GHz in order to achieve the penetration capability. A critical challenge for ultra-wideband radar is that collected radar information is corrupted in both the time and frequency domain by radio frequency interference (RFI) signals within the operating spectrum of UWB radar, as the signal occupies a wide spectrum that is also shared by radio, TV, cellular phone, wireless networking, amateur radio and other systems. Because of this interference, the received signal contains spectral content that includes many frequency subbands that are corrupted by energy from all other sources. Within these corrupted subbands, the energy of the received signal is much smaller than that from the interference sources, since the interfering signals are essentially large amplitude noise that often masks the underlying radar signals. In the time domain, the signal is very noisy and might be embedded in the noise floor. Except for targets with very large amplitudes, targets may not be detectable in the presence of interference noise. Conventional techniques usually detect the corrupted frequency bands (due to the interference sources) by searching for the spikes in the spectral domain. The fast Fourier transform (FFT) bins that correspond to the contaminated frequency bands are zeroed out. This technique results in severe sidelobes in the time or spatial domain of the output data and imagery due to the sharp transitions (frequency samples with no information) in the frequency domain. In addition, simply suppressing the information in the contaminated frequency bands will reduce the signal-to-noise ratio (SNR) of the received signal.

One noise suppression technique that has been widely employed in practice involves implementing adaptive notch filters (whose notches in the frequency domain correspond to interference noise components) to suppress the energy from interference noise signals. Depending on the nature of interference noise sources, the notch-filter approach generally results in (i) large sidelobes in the time domain of the received signal and (ii) reduced target amplitudes since our transmitted radar signals are UWB and notching partially eliminates the radar signals of interest. It is generally more desirable to extract the interference noise from signal directly in the time domain for best performance. To avoid the side effects of the notch-filter implementation, Timothy Miller, et al., in the publication entitled "RFI Suppression for Ultra Wideband Radar," IEEE Transactions on Aerospace and Electronic Systems, vol. 33, no. 4, (October 1997) (herein incorporated by reference) proposed an interference noise suppression technique that estimates the noise components and subtracts (in the time domain) the estimated noise signal from the received radar signal. However, the technique requires complete knowledge of the interference sources. The technique is based on the assumption that the interference sources consist of a number of narrowband amplitude modulation (AM) and frequency modulation (FM) channels. This assumption is no longer valid with the current frequency spectrum, in which most of the communications and TV channels are broadcasting using various digital modulation schemes. Within each communications channel, the radio frequency (RF) signal looks like white noise in the time domain with its amplitude and phase quickly varying with respect to time. Thus, it is not practical to use the Miller technique to estimate these RF interference (RFI) components with digital modulation contents. Besides parametric noise modeling, spectral decomposition, and adaptive filtering have also been explored to solve the RFI problem and so far have yielded limited successes. Most can only provide acceptable results with one particular source of RFI.

Of interest are low-frequency ultra-wideband (UWB) radar systems which transmit signals spanning a wide frequency spectrum from under 100 MHz to several GHz, delivering penetration capability while maintaining high image resolution. See, e.g. J. D. Taylor, ed. Ultra-wideband radar technology, CRC press, 2000; B. R. Crowgey, E. J.

Rothwell, L. C. Kempel, and E. L. Mokole, "Comparison of UWB short-pulse and stepped-frequency radar systems for imaging through barriers," Progress In Electromagnetics Research, vol. 110, pp. 403-419, 2010; and S.-E. Hamran. Radar performance of ultra wideband waveforms. INTECH Open Access Publisher, 2010, all of which are incorporated by reference as though fully reproduced herein. For example, the U.S. Army Research Laboratory (ARL) has been developing low-frequency UWB radar systems to detect difficult targets in various applications such as foliage penetration (FOPEN) [9], ground penetration for improvised explosive device (IED) detection (see. H. Nguyen, K. Kappra, D. Wong, R. Kapoor, and J. Sichina, "Mine field detection algorithm utilizing data from an ultrawideband wide-area surveillance radar," Proc. SPIE Int. Soc. Opt. Eng., vol. 3392, 627, (1998) herein incorporated by reference) and sensing-through-the-wall (STTW) See, L. H. Nguyen, M. Ressler, and J. Sichina, "Sensing through the wall imaging using the Army Research Lab ultra-wideband synchronous impulse reconstuction (UWB SIRE) radar," Proceedings of SPIE, vol. 6947, 69470B, 2008, herein incorporated by reference. A critical challenge for low-frequency UWB radars is that collected radar information is very susceptible to corruption by radio frequency interference (RFI) signals within the huge operating spectrum since the radar signal spectrum in this case contains significant overlaps with those of radio, TV, cellular phone, wireless networking, amateur radio, etc., resulting in a severely reduced signal-to-noise ratio (SNR) and ultimately reducing the effectiveness of target detection/classification. The observed received radar signal at aperture $i^{th}$ can often be modeled as a linear combination of the true back-scattered radar signal, the RFI signal, and the typical unstructured dense noise with small variance (e.g., atmospheric interference and thermal noise from transmitter/receiver circuits). Since the interference is often dominated by various modulation schemes popular in wireless broadcasting and communication, the received signal contains spectral content that includes many frequency sub-bands that are corrupted by energy from all other RFI sources. Within these corrupted sub-bands, the energy of the received signal can be much smaller than that from the interference sources, since the interfering signals are essentially large amplitude noise that often masks the underlying radar signals. Alternatively, from the time-domain viewpoint, the signal is very noisy and might be embedded in the noise floor. Except for targets with very large amplitudes, targets may not be detectable in the presence of interference noise.

Mitigation of RFI is a notoriously challenging problem due to the dynamic and unpredictable nature of the noise sources, not to mention the strength of the noisy signals. Previous work in this RFI-mitigation area can be classified into two categories: (i) RFI suppression via filtering techniques, where estimated RFI sources are filtered out or suppressed under the noise floor, and (ii) RFI extraction, where RFI components are first identified, estimated, and then subtracted out of the observed signals.

Following the former approach includes notch filtering, sub-band filtering, and/or adaptive filtering techniques, which are popular in practical implementations due to its simplicity. See for example, T. Koutsoudis and L. A. Lovas, "RF interference suppression in ultrawideband radar receivers," Proc. of the SPIE, Int. Symp. on Algorithms for Synthetic Aperture Radar Imagery II, vol. 2487, pp. 107-118, Orlando, Fla., April (1995); D. O. Carhoun, "Adaptive nulling and spatial spectral estimatin using an iterated principal components decomposition," Proc. of the International Conference on Acoustics, Speech, and Signal Processing, pp. 3309-3312, Toronto (1991); and H. Subbaram and K. Abend, "Interference suppression via orthogonal projections: a performance analysis," IEEE Transactions on Antennas and Propagation, vol. 41, pp. 1187-1194, September (1993), all three of which are incorporated by reference as though fully reproduced herein. This simple approach has been widely employed in practice and it typically involves implementing adaptive notch filters (whose notches in the frequency domain correspond to interference noise components) to suppress the energy from interference noise signals. Depending on the nature of interference noise sources, the notch-filter approach generally would result in (i) large sidelobes in the time domain of the received signal and (ii) reduced target amplitudes since our transmitted radar signals are UWB and obviously notching would eliminate partially the radar signals of interest. To preserve the strength of SAR signals and to avoid significant side-lobes, (which leads to severe ringing problems in the final SAR image), it is always more desirable to extract the interference noise from signal directly in the time domain for best performance.

The first effort in the RFI extraction direction is pioneered by T. R. Miller, J. McCorkle, and L. C. Potter, "Radio frequency interference suppression for foliage penetrating radar imaging," IEEE Trans. on Aerospace and Electronic Systems, vol. 33, pp. 1142-1156, (October 1997), herein incorporated by reference, which proposes to estimate the noise components and subtracts (in the time domain) the estimated noise signal from the received radar signal. However, this early technique requires complete knowledge of the interference sources since it is based on the assumption that the interference sources consist of a number of narrow-band amplitude modulation (AM) and frequency modulation (FM) channels. The assumption is no longer valid with the current frequency spectrum, in which most of the communications and TV channels are broadcasting using various digital modulation schemes. Within each communications channel, the radio frequency (RF) signal looks like white noise in the time domain with its amplitude and phase quickly varying with respect to time. Thus, it is not possible to use the Miller technique to estimate these RF interference (RFI) components with digital modulation contents.

More recent techniques that follows the RFI-extraction approach comprise spectral decomposition X.-Y. Wang, W.-D. Yu, X.-Y. Qi and Y. Liu, "RFI suppression in SAR based on approximated spectral decomposition algorithm," Electronics Letters, vol. 48, (May 2012), herein incorporated by reference, independent component analysis (ICA) F. Zhou, M. Tao, and X. Bai, "Narrow-band interference suppression for SAR based on independent component analysis," IEEE Trans. on Geoscience and Remote Sensing, vol. 51, pp. 4952-4960, (October 2013) and F. Zhou and M. Tao, "Research on Methods for Narrow-Band Interference Suppression in Synthetic Aperture Radar Data," IEEE Journal of Selected Topics in Applied Earth Observations and Remote Sensing, vol. 8, no. 7, pp. 3476-3485, (July 2015); and eigen-decompositions as disclosed in C. Yu, Y. Zhang, Z. Dong, and D. Liang, "Eigen-decomposition method for RFI Suppression Applied to SAR data," in Proc. Of IEEE Int. Conf on Multimedia Technology (ICMT), pp. 1-4, (2010); E. J. Candes and T. Tao, "Near optimal signal recovery from random projections: universal encoding strategies?," IEEE Trans. on Information Theory, vol. 52, pp. 5406-5425, (December 2006); E. J. Candes and T. Tao, "Decoding by linear programming," IEEE Trans. on Information Theory, vol. 51, pp. 4203-4215 (December 2005), all of which are hereby incorporated by reference. The main difficulty here is that collected data are already heavily contaminated with RFI. Hence, unless very accurate prior information on RFI sources exists, it is often very difficult to effectively model or estimate (and then separate) RFI component from the desired SAR component. Most of these algorithms can only provide acceptable results with one particular source of RFI and very restrictive assumptions (e.g., very narrow corrupted RFI sub-bands) due various difficulties in modeling complicated RFI noise sources. For instances, several past efforts have taken advantage of the low-rank or narrowband RFI property to extract them via ICA or eigen-decompositions. See, for example. Donoho, "Compressed sensing," IEEE Trans. on Information Theory, vol. 52, pp. 1289-1306, (April 2006); E. J. Candes, J. Romberg, and T. Tao, "Robust uncertainty principles: exact signal reconstruction from highly incomplete frequency information," IEEE Trans. on Information Theory, vol. 52, pp. 489-509, (February 2006); R. Baraniuk, and P. Steeghs, "Compressive radar imaging," Proc. IEEE Radar Conference, Waltham, pp. 128~133, (April 2007); M. Herman and T. Strohmer, "Compressed sensing radar," Proc. IEEE Acoustics, Speech and Signal Processing, pp. 1509-1512, (May 2008), all of which are incorporated by reference. However, these principal-component-based techniques heavily depend on the quality of the orthogonal subspaces and cannot distinguish signal-versus-noise if they happen to have the same power within the same subspace.

The recently emerging theory of compressed sensing (see for example, L. C. Potter, E. Ertin, J. T. Parker, and M. Cetin. "Sparsity and compressed sensing in radar imaging." Proceedings of the IEEE 98, no. 6, pp. 1006-1020, (June 2010)) stimulates numerous investigations on the applicability of sparsity in radar imaging. See for example, L. H. Nguyen and T. D. Tran, "Robust and adaptive extraction of RFI signals from ultra-wideband radar data," IEEE Int. Geoscience and Remote Sensing Symposium (IGARSS), pp. 7137-7140, (July 2012), L. H. Nguyen, T. D. Tran, and T. Do, "Sparse models and sparse recovery for ultra-wideband SAR applications," IEEE Trans. on Aerospace and Electronic Systems, vol. 50, no. 2, pp. 940-958, (February 2014); L. H. Nguyen and T. D. Tran, "Method and system for removal of noise in signal," U.S. Pat. No. 9,172,476. (October 2015); L. H. Nguyen and T. D. Tran, "Estimation and extraction of radio-frequency interference from ultra-wideband radar signals," IEEE Int. Geoscience and Remote Sensing Symposium (IGARSS), pp. 2848-2851, (July 2015); L. H. Nguyen and T. D. Tran, "Efficient and robust RFI extraction via sparse recovery," IEEE Journal of Selected Topics in Applied Earth Observations and Remote Sensing, to appear in future, (2016) L. H. Nguyen and T. D. Tran, "Method and system for estimation and extraction of interference noise from signals," U.S. patent application Ser. No. 14/452,902, filed Aug. 6, 2014, now U.S. Pat. No. 9,363,024; all of which are herein incorporated by reference. Most sparsity-based approaches tend to focus on obtaining sparse scenes; hence, they involve computationally expensive optimization algorithms with the image formation step embedded right within the main iterative loop. As a result, these algorithms are not directly applicable to UWB high-resolution SAR applications, where sampling rates are often in the GHz range, scene resolution is usually in the sub-meter range, and hundreds of data records need to be collected and processed every second.

Previous attempt in solving the RFI problem follows the RFI-extraction approach via sparse recovery and requires prior knowledge of the SAR system or the RFI sources or both. Our very first effort requires a priori information on both SAR and RFI components described in U.S. Pat. No. 9,172,476. This technique has one significant drawback: the radar system has to continuously monitor the surrounding environment in order to build a representation dictionary for the interference sources. We have suggested turning the radar transmitter off occasionally while leaving the receiver on as a simple and quick solution. This way, whenever the radar system is in the sniffing stage, i.e., the transmitter is turned off, the receiver would collect only the vital information on the interference (since there is no radar signal present, what we sense must be pure interference). However, even this simple "sniffing" solution (i) increases the complexity of the system control and (ii) reduces the system's effective pulse repetition frequency (PRF). Obviously, if we desire to capture the interference characteristics accurately, then we would need to increase the sniffing frequency and the system's PRF would decrease significantly. On the other hand, if we try to minimize the amount of sniffing, then the interference modeling will not be as precise, rendering our proposed solution to be much less effective.

More recently, a sparsity-driven technique was developed that directly estimates the interference noise components in the time domain and extracts them from radar data U.S. patent application Ser. No. 14/452,902, filed Aug. 6, 2014, now U.S. Pat. No. 9,363,024. The first-advantage of this technique is that the time-domain extraction of RFI noise does not result in (i) large side-lobes in the time domain of the received signal and (ii) reduced target amplitudes. The second advantage is that it is completely adaptive with the changing environment and does not assume any knowledge (amplitude, frequency band, modulation scheme, etc.) of the interference sources. The invented technique simultaneously estimates (i) the radar signal embedded in interference noise with large amplitudes and (ii) the interference noise signal via a joint-sparse-recovery framework. However, the effectiveness of this technique still depends on the quality of the RFI estimation step, particularly when the RFI is highly non-stationary over time and aperture positions. Also, this estimation stage adds additional level of complexity to the overall radar system.

SUMMARY OF THE INVENTION

A preferred embodiment system for reception of electromagnetic waves in a spectrum in which interference with radio frequencies of other electronics devices occurs comprises:
at least one transmitter configured to transmit signals at a wide range of frequencies, including frequencies in which RF devices transmit;
at least one receiver configured to receive the received signal; each received signal organized into a digital vector;
at least one memory portion configured to store a plurality of received signals in a vector form; the vectors being combined into a matrix, each vector of the matrix being a digital data record representing a received signal;
at least one processor operatively connected to the at least one memory portion; the at least one processor configured to estimate that portion of the received signal attributable to noise; the at least one processor operating to jointly estimate a minimal number of distinctive noise patterns and minimize the simplicity of the data of interest;
the at least processor operating to process the noise and data of interest separately.

Optionally, the at least one memory portion of the preferred embodiment may comprise comprises a first portion for storing the received signal, a second portion in which the processor stores the noise and a third memory portion in which the at least one processor stores the data of interest.

Optionally, the noise and data may be separated by using the optimization problem:

$$\{\hat{R}, \hat{X}\} = \underset{R,X}{\operatorname{argmin}} \; \operatorname{rank}(R) + \lambda \|X\|_0 \; \text{subject to} \; Y = X + R$$

where Y is the received signal which is separated into components X representing the data of interest and R representing the noise; the rank operator computes the matrix rank of R whereas the $l_0$-norm of the matrix X counts the number of its non-zero entries, and searches for the lowest-rank matrix R and the sparsest matrix X with respect to the constraint that the noise R and data X to the received signal matrix Y.

Optionally, the noise and data may be separated by using the optimization problem:

$$\{\hat{R}, \hat{X}\} = \underset{R,X}{\operatorname{argmin}} \|R\|_* + \lambda \|X\|_1 \; \text{subject to} \; Y = X + R$$

where Y is the received signal which is separated into components X representing the data of interest and R representing the noise, $\|R\|_*$ is the nuclear norm of R, approximating its rank, while $\|X\|_1$, is the $l_1$ entry norm of X, approximating its simplicity level, and the $\lambda$ parameter controls the trade-off between the two components with respect to the constraint that the noise R and data X to the received signal matrix Y.

Optionally, the noise and data may be separated by using the optimization problem:

$$\{\hat{R}, \hat{S}\} = \underset{R,S}{\operatorname{argmin}} \|R\|_* + \lambda \|S\|_1 + \frac{\tau}{2} \|Y - D^x S - R\|_F^2$$

subject to $Y = X + R$ where Y is the received signal which is separated into components X representing the data of interest modeled as $X = D^x S$ where $D^x$ is the dictionary of a transmitted waveform, R representing the noise, a $\|R\|_*$ is the nuclear norm of R, approximating its rank, S is a matrix of data the sparse codes, $\|S\|_1$ represents the $l_1$ entry norm of S, and the $\{\lambda, \tau\}$ parameters control the trade-off between the three components with respect to the constraint that the summation of the noise R and data X comes substantially close to the received signal matrix Y as enforced by the Frobenius-norm term $\|Y - D^x S - R\|_F^2$.

A method of making a system for reception of electromagnetic waves in a spectrum in which interference with radio frequencies of other electronics devices occurs comprising:

providing at least one transmitter configured to transmit signals at a wide range of frequencies, including frequencies in which RF devices transmit;

providing at least one receiver configured to receive the received signal; each received signal organized into a digital vector;

providing at least one memory portion configured to store a plurality of received signals in a vector form; the vectors being combined into a matrix, each vector of the matrix being a digital data record representing a received signal;

proving at least one processor operatively connected to the at least one memory portion; the at least one processor configured to estimate that portion of the received signal attributable to noise; the at least one processor operating to jointly estimate a minimal number of distinctive noise patterns and minimize the simplicity of the data of interest; the at least processor being configured to process the noise and data of interest separately.

An alternate preferred embodiment comprises a system for reception of electromagnetic waves in which noise occurs comprising:

a transmitter configured to transmit signals at a wide range of frequencies, including frequencies in which radio frequency devices transmit;

at least one receiver configured to receive the received signal; each received signal organized into a vector;

at least one memory portion configured to store a plurality of received signals in a vector form; the vectors being combined into a matrix, each vector of the matrix being a digital data record representing a received signal;

at least one processor operatively connected to the at least one receiver; the at least one processor operating to jointly estimate a minimal number of distinctive noise patterns and minimize the simplicity of the data of interest;

the at least processor operating to process the noise and data of interest separately.

Optionally, the at least one processor is configured to form a matrix comprising rows and columns for storage of point target response data and components of the interfering signal and wherein the at least one processor is configured to utilize an optimization process in conjunction with the low-rank representations to determine amplitudes and frequency locations of the noise components in the received signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments herein will be better understood from the following detailed description with reference to the drawings.

FIG. 4 is a block diagram of an Orthogonal Matching Pursuit (OMP) algorithm.

FIG. 6 includes the frequency ranges in which FM, digital TV and cellular phones operate.

FIG. 12 also illustrates that the magnitude of singular values of the pure-RFI matrix R decays very quickly, indicating that R is low-rank.

FIG. 13 depicts a preferred embodiment where, at each pulse repetition interval (PRI), the radar transmitter (101) transmits radar signals to illuminate the area of interest and receives return radar signals that correspond to the physical objects from the area. The receiver (102) receives the return radar signals that are severely contaminated by many interference sources (radio, TV, cellular phone, communications systems, etc.). A key to the present invention is the joint sparse and low-rank signal recovery processor (106) which employs a single dictionary of impulses (103), i.e., the identity matrix.

FIG. 14 illustrates an overall system block diagram of a preferred embodiment where it is assumed that one now has knowledge of the SAR transmitter and the transmitted waveforms. In this case, a SAR dictionary (104) consisting of phase-shifted versions of the transmitted waveforms can be constructed as in our previous inventions disclosed in H. Nguyen and T. D. Tran, "Method and system for removal of noise in signal," U.S. Pat. No. 9,172,476. October 2015. and L. H. Nguyen and T. D. Tran, "Method and system for estimation and extraction of interference noise from signals," U.S. patent application Ser. No. 14/452,902, filed Aug. 6, 2014, now U.S. Pat. No. 9,363,024, both of which are herein incorporated by reference. This SAR dictionary now replaces the impulsive dictionary (103) in the previous preferred embodiment configuration.

FIG. 15 illustrates another alternative preferred embodiment configuration. At each pulse repetition interval (PRI), the radar transmitter (301) transmits radar signals to illuminate the area of interest and receives return radar signals that correspond to the physical objects from the area. The receiver (302) receives the return radar signals that are severely contaminated by many interference sources (radio, TV, cellular phone, communications systems, etc.). A key to the present invention is the joint sparse and low-rank signal recovery processor (306). The signal recovery processor (306) estimates, separates, and extracts the noise signal components via a separation process where the RFI is modeled as low-rank components while SAR signals are treated as sparse outliers embedded on top.

FIG. 16 illustrates an alternate preferred embodiment configuration comprising at each pulse repetition interval (PRI), the radar transmitter (301) transmits radar signals to illuminate the area of interest and receives return radar signals that correspond to the physical objects from the area. The receiver (302) receives the return radar signals that are severely contaminated by many interference sources (radio, TV, cellular phone, communications systems, etc.). A key to the present invention is the joint sparse and low-rank signal recovery processor (306) which employs a single dictionary of impulses (303), i.e., the identity matrix.

FIG. 19A shows the spectral contents of the original data, the RFI data, and the RFI contaminated radar data.

FIG. 19B shows the SAR image of the simulation scene without noise. All targets, including the smallest RCS targets, show up clearly in the SAR image.

FIG. 19C shows the SAR image formed using the RF contaminated radar data. Only a few largest targets are discernable from the image.

FIG. 19D shows the resulting SAR image using the notch filtering technique for RFI suppression. This SAR image suffers from the severe side-lobes of the larger RCS targets due to the spectral gaps introduced by the notch filter. The processing gain in this case is 11.26 dB.

FIG. 19E shows the resulting SAR image using the PCA technique, which performs poorly on this data set. The processing gain is −4.16 dB.

FIG. 19F shows the resulting SAR image using our previous MSR technique. All targets, including the smallest RCS targets, are discernable. The processing gain is 22.83 dB.

FIG. 19G shows the resulting SAR image using the proposed SLS technique. The processing gain for SLSR is 19.68 dB, which is approximately 3 dB lower than that of the MSR technique. The superior performance of MSR is expected since it can model a perfect SAR dictionary based on the radar impulse response in this simulation case, while the proposed SLSR algorithm does not incorporate any of these prior information.

FIG. 20A specifically depicts the spectrum of SAR, RFI, and SAR plus RFI signals in this experiment.

FIG. 20B shows the SAR image of the simulation scene without noise. All targets, including the smallest RCS targets, show up clearly in the SAR image.

DETAILED DESCRIPTION OF PREFERRED EMBODIMENTS

Figure 1:
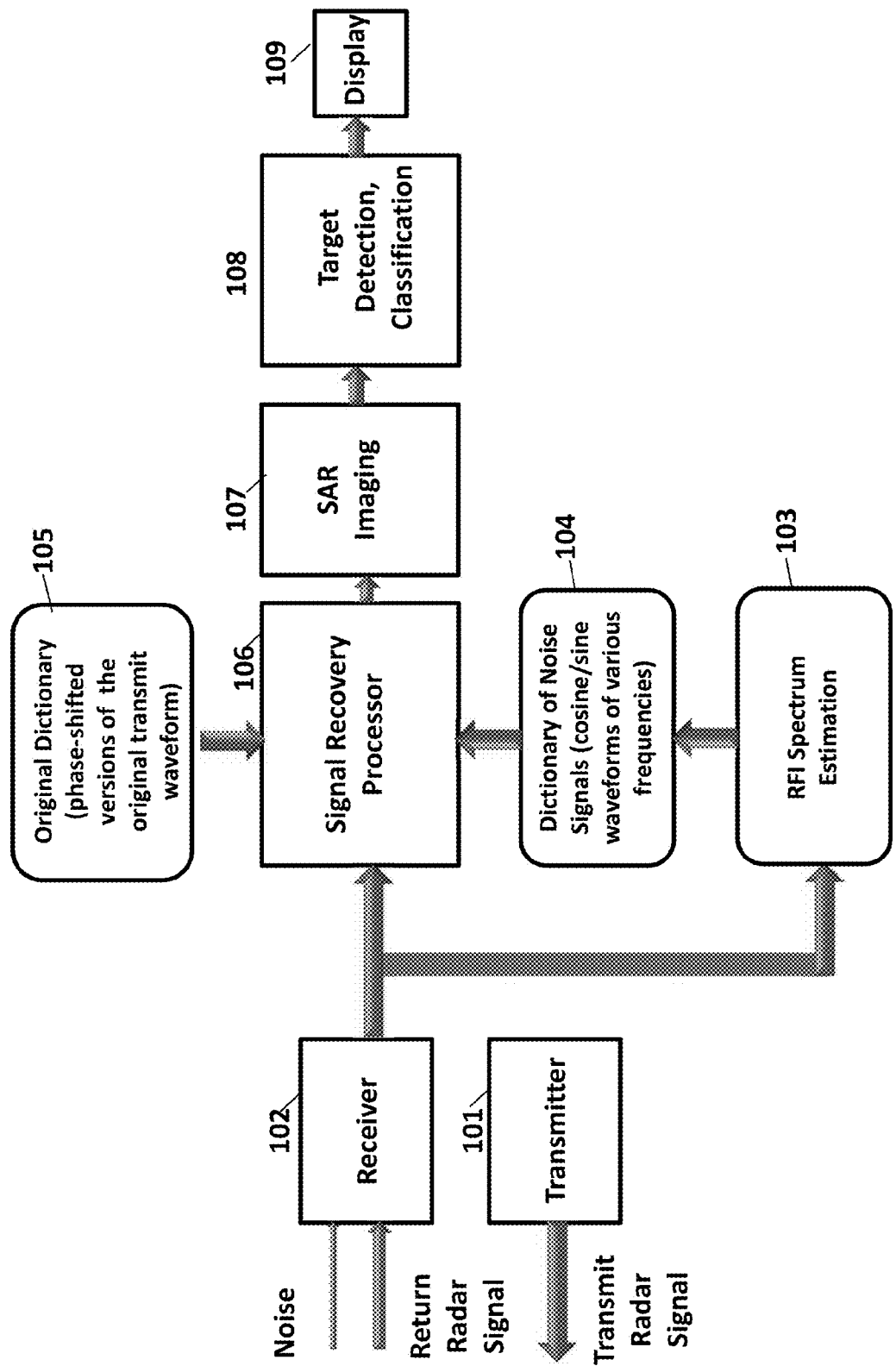
FIG. 1 is a schematic block diagram of a preferred embodiment of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. For example, when referring first and second elements, these terms are only used to distinguish one element from another element. Thus, a first element could be termed a second element, without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As described in the U.S. patent application Ser. No. 14/452,902, filed Aug. 6, 2014, now U.S. Pat. No. 9,363,024, the U.S. patent application Ser. No. 14/452,902, filed Aug. 6, 2014, now U.S. Pat. No. 9,363,024 invention is directed to system for reception of electromagnetic waves in spectrum in which interference with radio frequencies of other electronics devices occurs comprising;

at least one transmitter configured to transmit signals at a wide range of frequencies, including frequencies in which RF devices transmit;

at least one receiver configured to receive the received signal;

a first memory portion configured to store data relating to a point target response of the system derived from the transmitted signals;

a spectrum estimator configured to estimate the frequencies at which interfering signals occur;

at least one processor operatively connected to the receiver, the first memory portion and the spectrum estimator, the at least one processor configured to generate an estimation of the interfering signals at the frequencies estimated by the spectrum estimator;

a second memory portion operatively connected to the at least one processor configured to store the estimation of the components of the interfering signals; the at least one processor configured to substantially reduce or eliminate radio frequency interfering signals from the received signal utilizing the point target response from the first memory portion and the estimation of the interfering signals from the second memory portion.

As describe in the U.S. patent application Ser. No. 14/452,902, filed Aug. 6, 2014, now U.S. Pat. No. 9,363,024, an alternate preferred embodiment of the Ser. No. 14/452,902 system for reception of electromagnetic waves in spectrum in which interference with radio frequencies of other electronics devices occurs comprises;

at least one transmitter configured to transmit signals at a wide range of frequencies, including frequencies in which RF devices transmit;

at least one receiver configured to receive the received signal;

a first memory portion configured to store data relating to a point target response of the system derived from the transmitted signals;

a spectrum estimator configured to estimate the frequencies at which interfering signals occur;

at least one processor operatively connected to the receiver, the first memory portion and the spectrum estimator, the at least one processor configured to generate an estimation of the interfering signals at the frequencies estimated by the spectrum estimator;

a second memory portion operatively connected to the at least one processor configured to store the estimation of the components of the interfering signals;

the at least one processor configured to substantially reduce or eliminate radio frequency interfering signals from the received signal by utilizing an optimization process in conjunction with the point target response from the first memory portion and the estimation of the components of the interfering signals from the second memory portion to jointly determine a composite response of the target or targets from a scene of interest.

As described in the U.S. patent application Ser. No. 14/452,902, filed Aug. 6, 2014, now U.S. Pat. No. 9,363,024, the invention is also directed to a method for obtaining image data utilizing the transmission of electromagnetic waves in spectrum in which interference with electromagnetic waves at various frequencies occurs comprising;

providing at least one processor;

providing at least one transmitter operatively connected to the at least one processor;

providing at least one receiver operatively connected to the at least one processor;

transmitting signals into a target area having a wide frequency range, including frequencies in which other RF devices transmit;

using the at least one receiver, receiving a signal comprising the reflection of the transmitted signals and interfering signal data from other RF devices;

providing a first memory portion for storing replicas of the point target response signal operatively associated with the at least one processor;

providing a spectrum estimator operatively associated with the at least one receiver and the at least one processor configured to identify the frequency bands at which interfering signals occupy;

generating an estimation of the interfering signals at the frequencies estimated by the spectrum estimator for storage in the second memory portion;

providing a second memory portion to store the estimation of components of the interfering signals;

matching the receive signal with stored replicas of the point target response and extracting data relating to the interfering signals from the received signal to determine a composite response of the target or targets from a scene of interest.

In conjunction with U.S. patent application Ser. No. 14/452,902, filed Aug. 6, 2014, now U.S. Pat. No. 9,363,024 preferred embodiment systems and method, as an option the spectrum estimator may operate to determine interfering signals such as jamming signals, noise, cross-talk, cell phones, citizen band radios, television, radio and radar. In addition, the estimation of the components of the interfering signal stored in the second memory may be generated using sinusoidal representations. In addition, the at least one processor may be configured to utilize an optimization process in conjunction with the sinusoidal representations to determine amplitudes and frequency locations of the noise components in the received signal. As a further option, the at least one processor may be configured to use an optimization process in conjunction with the point target response from the first memory portion and the components of the interfering signal from the second memory portion to jointly determine a composite response of the target or targets from a scene of interest and the estimated interfering signals. The optimization process may be one of orthogonal matching pursuit, basis pursuit, gradient projection, matching pursuit, orthogonal matching pursuit, regularized matching pursuit or subspace pursuit. As a further option, the sinusoidal representations may be generated using the equation $$D_{ij}^{rfi}[\cos(2\pi(f_L(j)+k\Delta f_D))|\sin(2\pi(f_L(j)+k\Delta f_D))]k=0,\ldots,N_j-1$$

where j is the index for the RFI frequency band, $f_L(j)$ is the lowest frequency of the detected band, k is the frequency index, $\Delta f_D$ is the frequency increment, $N_j$ is the total number of sine and cosine pairs within the RFI frequency band and wherein components of $D_{ij}^{rfi}$ are concatenated for insertion into the second memory portion.

As described in the U.S. patent application Ser. No. 14/452,902, filed Aug. 6, 2014, now U.S. Pat. No. 9,363,024, as another-option the first memory portion may be constructed using phase shifted replicas of the point target response which correspond to received signals reflected back from objects in the scene of interest located at specific distances, and the at least one processor may be configured to match the receive data with stored replicas of the point target response to determine a composite response of the target or targets from a scene of interest. As described in the U.S. patent application Ser. No. 14/452,902, filed Aug. 6, 2014, now U.S. Pat. No. 9,363,024, embodiment comprises a sparse-recovery model and reconstruction scheme. The Ser. No. 14/452,902 invention allows the reconstruction of a wideband signal following the extraction of RFI noise.

Although the U.S. patent application Ser. No. 14/452,902, filed Aug. 6, 2014, now U.S. Pat. No. 9,363,024, invention is demonstrated with the application of this technique to radar applications, the noise extraction technique of the Ser. No. 14/452,902 invention also works with other communication systems, including television reception and transmission, headphones with noise filters, and other communications devices; especially ones that employ ultra high-frequency modulation schemes.

U.S. patent application Ser. No. 13/477,282 ('282 application) entitled "Method and System for Recovery of Missing Spectral Information in Wideband Signal" by Lam H. A Nguyen and Thong Do filed May 22, 2012 (ARL 11-77CIP), now U.S. Pat. No. 8,824,544 to which priority is being claimed, discloses a sparsity-driven technique that directly estimates the interference noise components in the time domain and extracts them from radar data. In the '282 application, a first memory or dictionary comprises time-shifted responses based upon the wide band signal responses and a second memory or dictionary comprises a plurality of spectrally filtered time-shifted responses. The first and second memories (or dictionaries) operate to provide data to the processor to compensate for the information missing at the plurality of frequencies.

U.S. patent application Ser. No. 13/891,050 ('050) (a continuation-in-part of the '282 application; to which priority is also claimed) entitled "Method and System for Removal of A Noise in Signal," filed May 9, 2013, now U.S. Pat. No. 9,172,476, discloses a system comprising, inter alia, a processor, a first memory or dictionary for storing transmitted signal waveforms; a second memory or dictionary for storing RF interfering signal data; and a switch for periodically allowing the RF interfering signal data to enter the second memory portion from the receiver. The processor operates to process the received signal containing RF interfering signal data by matching the received signal against data relating to the transmitted signal waveforms from the first memory portion (or dictionary) and RF interfering signal data from the second memory portion (or dictionary) and extract the RF interfering signal data. The time-domain extraction of RFI noise does not result in (i) large side-lobes in the time domain of the received signal and (ii) reduced target amplitudes and are adaptive to a changing environment.

Unfortunately, the technique of the '050 application has a significant drawback as the radar system has to continuously monitor the surrounding environment in order to build a sparse-representation dictionary for the interference sources. In order to determine the background noise, the system disclosed in the '050 application incorporates noise-only intervals that occur when the transmitter is turned off and the data switch sends the noise signals to the memory buffer in which dictionary resides via channel to construct a "noise" dictionary. During the standard radar transmit and receive cycle a pulse repetition frequency (PRF) is established where the signal is first transmitted by the transmitter. Depending upon the range or distance in which targets are to be detected, the receiver waits a time interval t=2R/c where R is the range and c is the speed of light. During the operation of the '050 application system however, after a certain number of PRF cycles, transmission is stopped and the noise is observed whereupon the data switch is programmed to allow noise data to enter the noise dictionary. Noise data from the noise signal (i.e., the return signal occurring when no transmission from the transmitter is taking place) is entered into a first column of a noise dictionary the noise dictionary using a shifted window mechanism or approach. To enter the second column, the window is effectively shifted a minute amount, and the second column is data realized from the shifted interval of the noise signal. Similarly, columns of noise data are entered into the noise dictionary during the time interval when the switch diverts the data from the signal recovery processor into the noise dictionary. Noise data using the sliding window approach may be entered by an additional processor or processor or such operations may be performed by the signal recovery processor. Since the noise in the return signal is detected during the intervals during which the transmitter does not transmit, there is no signal component present in the return signal. Since the signal may be transmitted and received in a matter of nanoseconds, the interval between the PRF cycles and the reception of the noise only signal for the purposes of entering data into the noise dictionary may occur within a matter of nanoseconds or tens of nanoseconds. At other intervals when the transmitter are turned on, the data switch 9 allows the received signals that include noisy radar signals to pass to the signal recovery processor for processing. In addition to the noise dictionary, the '050 application discloses another dictionary that includes many time-shifted versions of the transmitted waveform, which may be stored columns beginning with data at the beginning of the range of interest. For example, if the range of interest is between 1000 meters to 5000 meters, the first column of data in the signal dictionary may be a pulse representing the appearance of a target at 1000 meters. In the '050 application, the signal recovery processor utilizes the noise dictionary to estimate and extract the noise signal components from the noisy receive signals to generate clean radar signals. Specifically, the lower or noise dictionary includes the column of noise data which are to be extracted out of the processed signal in combination with the processing of the time-shifted versions of the transmitted waveform included in the other dictionary. The output of the signal recovery processor is the received signal with reduced noise level. In the '050 application, the output signals from the signal recovery processor are sent to the image processor, and subsequently, to the target detection and discrimination. The resulting synthetic aperture radar (SAR) image and detection information are then visualized by the display. A further description of the image formation is found in U.S. Pat. No. 7,796,829 entitled "Method and System for Forming an Image with Enhanced Contrast and/or Reduced Noise, by Lam H. Nguyen and Jeffrey Sichina, issued Sep. 14, 2010, herein incorporated by reference.

The process of monitoring of the environment by turning the radar transmitter off occasionally while leaving the receiver on is known as "sniffing." Whenever the radar system is in the sniffing stage, i.e., with the transmitter turned off, the receiver collects only the vital information on the interference (since there is no radar signal present). However, even this simple "sniffing" solution still has two weaknesses: (i) it increases the complexity of the system control; and (ii) it reduces the system's effective pulse repetition frequency (PRF). In order to capture the interference characteristics accurately, the "sniffing" frequency must be increased and the system's PRF decreases significantly. On the other hand, if the amount of "sniffing" is minimized, then the interference modeling will not be as precise. In accordance with a preferred embodiment of this invention, "sniffing" is no longer needed. Instead, the interference sources are modeled as a sparse linear combination of a few active cosine and sine waves whose frequencies are estimated directly from past-collected radar data.

Using a preferred embodiment and method of the U.S. patent application Ser. No. 14/452,902, filed Aug. 6, 2014, now U.S. Pat. No. 9,363,024 invention, the influence of noise signals is effectively removed from radar signals via sparse recovery using a technique that models the interference as a sparse linear combination of cosine and sine waves (tones) of various frequencies. The RFI frequency coverage range is estimated from previously-collected radar data in common operation mode resulting in the elimination of the "sniffing" stage. Instead of notching out the sub-bands or frequency ranges that are RFI-dominant, a joint sparse recovery optimization is employed in which the RFI-dominant sub-bands are represented by a dictionary of cosine/sine tones whereas the radar signals are captured by a signal dictionary—constructed from the transmitted radar signal at different phase shifts. With these two sparsifying dictionaries, sparse-recovery optimization automatically separates the interference noise components from the radar signal components in the time domain and hence, the RFI sources are extracted from the radar data. Advantages of this technique are that the time-domain extraction of RFI noise does not result in (i) large sidelobes in the time domain of the received signal and (ii) reduced target amplitudes. Another advantage is that it is completely adaptive with the changing environment and does not assume any prior knowledge (amplitude, frequency band, modulation scheme, etc.) of the interference sources. In other words, the invented technique simultaneously estimates (i) the radar signal and (ii) the interference noise signal, both of which have been mixed together in the raw data observation. Lastly, the preferred embodiment radar system does not require monitoring or "sniffing" of the noise signals in the environment.

FIG. 1 illustrates overall schematic system block diagram of a U.S. patent application Ser. No. 14/452,902 filed Aug. 6, 2014, now U.S. Pat. No. 9,363,024 embodiment. At each pulse repetition interval (PRI), the radar transmitter 101 transmits radar signals to the area of interest and receives return radar signals that correspond to the physical objects from the area. The transmitter 101 transmits an ultra wide band signal (UWB), however, the use of the preferred embodiment is not limited to UWB signals. The backscattered pulses are reflected from objects in the scene. The receiver 102 receives the return radar signals that may be severely contaminated by inference sources such as radio, TV, cellular phones, communication systems, etc.

The signal recovery processor in the U.S. patent application Ser. No. 14/452,902, filed Aug. 6, 2014, now U.S. Pat. No. 9,363,024 uses two dictionaries 104 and 105. The dictionary 105 includes the phase-shifted versions of the radar point-target response which is defined as the system's response to a point-target of interest. More precisely, this point-target response is the reconstructed signal at the receiver output from a point-like target in the surveyed scene. The point-target response can be represented in time domain s(t) or in frequency domain S(f), where S(f) is the Fourier transform of s(t). S(f) also occupies the same frequency band of the radar transmit signal. The dictionary 104 includes the interference noise signals modeled as pure cosine and sine waveforms at various frequency bands which have been detected as interference-dominant by the RFI spectrum estimator 103, which is a processor which looks for the spikes in the received spectrum and obtains all the bands of the noise; i.e. the frequency location of the interference. In a U.S. patent application Ser. No. 14/452,902, filed Aug. 6, 2014, now U.S. Pat. No. 9,363,024 embodiment, the spectrum estimator may operate on all of the received signals go through the spectrum estimator 103. The system may be adaptive in that multiple receivers may be utilized and if one receiver is receiving excessive noise, the surrounding receivers may be relied on to compensate for the receiver receiving excessive noise. Moreover, the spectrum estimator may store the data previously received and average the present spectrum with the past spectrums. The signal recovery processor 106 estimates, separates, and extracts the noise signal components from the raw received signals to generate clean radar signals. For a typical communications system, the output signals would be processed by a detector. In this radar block diagram, the output signals are sent to the image processor 107, and target detection and classification 108. The resulting radar data, image and detection information are then visualized by the display 109.

The U.S. patent application Ser. No. 14/452,902, filed Aug. 6, 2014, now U.S. Pat. No. 9,363,024 embodiment technique separates the noise signals from radar signals via sparse recovery. This technique directly estimates and subtracts noise signals from the contaminated radar signals. Therefore, it does not suffer from either high sidelobe or reduced target-amplitude effects as in existing notch-filtering approaches. Additionally, the technique is completely adaptive with the changing environment and does not assume any knowledge (amplitude, frequency band, modulation scheme, how man interference sources are present, etc.) of the interference sources. The U.S. patent application Ser. No. 14/452,902, filed Aug. 6, 2014, now U.S. Pat. No. 9,363,024 technique on a sparse recovery approach that simultaneously solves for (i) radar signals embedded in noise with large amplitudes and (ii) interference noise signals.

The following sparse-signal sparse-noise model is utilized for the received radar data record $y_i$, where i can be considered as the pulse repetition interval (PRI) index:

$$y_i = x_i + r_i + w_i = D_i^x \alpha_i + D_i^{rfi} e_i + w_i. \quad (1)$$

In this model, the original SAR signal $x_i$ at the i-th aperture is assumed to be sparse with respect to $D_i^x$ the phase-shifted dictionary (105) constructed from our transmitted signal s. The received signal $y_i$ is often contaminated by various different noise sources, modeled here as the RFI $r_i$ and the dense white noise $w_i$. The latter noise component is the common thermal, atmospheric, mechanical noise that exists in any radar and communication system. It is usually modeled as dense Gaussian white noise that is fortunately negligible magnitude-wise. In other words, $w_i$ in equation (1) has small bounded energy $\|w_i\| \leq \sigma$. The RFI $r_i$ noise component is the radio-frequency interference that is significant. The main difference between the two noise sources here is that $r_i$ is sparse with a properly designed RFI noise dictionary and can be captured with only a few significant entries, but each can be large in magnitude, whereas $w_i$ is dense and generally insignificant in magnitude.

RFI sources typically are frequency-sparse compared to the full bandwidth of the radar signals. The frequency-sparse feature of RFI can be easily explained: most modern communication systems rely on modulation to various higher frequencies for data transmission and broadcasting, and each system typically occupies only a few MHz of the spectrum. As a generalized estimation, the RFI noise sources $r_i$ can be captured effectively with its own sparse representation as: $r_i D_i^{rfi} e_i$, where $D_i^{rfi}$ is the adaptive RFI noise sparsifying dictionary 104 constructed from cosine and sine waveforms.

The first step to construct the RFI dictionary 104 in the U.S. patent application Ser. No. 14/452,902, filed Aug. 6, 2014, now U.S. Pat. No. 9,363,024 is to exploit important prior knowledge obtained from an RFI spectrum estimator 103. This system component takes advantage of the long-term frequency correlation structure of common RFI-source to provide a rough estimate of frequency bands that are most likely to contain RFI. One particular solution is to average the spectrum of the received radar signals $y_i$ over many apertures within a reasonable spatial-temporal window. More precisely, when processing the received radar signal $y_i$ at aperture position indexed by i, a certain P number of past received signals can be borrowed to form the estimated local spectrum average $Y_i^{average}(f)$ at the i-th location as $$Y_i^{average}(f) = \sum_{k=-P}^{0} |Y_{i+k}(f)|^2 = $$

$$\sum_{k=-P}^{0} |X_{i+k}(f) + R_{i+k}(f) + W_{i,k}(f)|^2 \approx \sum_{k=-P}^{0} |Y_{i+k}(f)|^2 + |R_{i,k}(f)|^2$$

where the assumption was made that the power of the bounded noise component $|w_{i+k}(f)|^2$ is small and all 3 components $(x_i, r_i, w_i)$ of the received signal $y_i$ have negligible cross-correlation. This averaging operation in the frequency domain yields a typical spectrum resembling somewhat that illustrated in FIG. 3. Most importantly, the averaging process above identifies the location of the most persistent RFI sources as local peaks (maxima) in the overall observed spectrum due to the energy contribution from the terms $|R_{i+k}(f)|^2$. Note that this operation is locally adaptive and the sensitivity of the operation can be controlled from tuning the parameter P. If the value of P is too small, frequency bands that contain RFI sources of weaker magnitudes may not be located. On the other hand, if the value of P is too large, the RFI spectrum estimation at aperture location i will not truly reflect the interference that affects particularly the received signal at aperture i.

Figure 3:
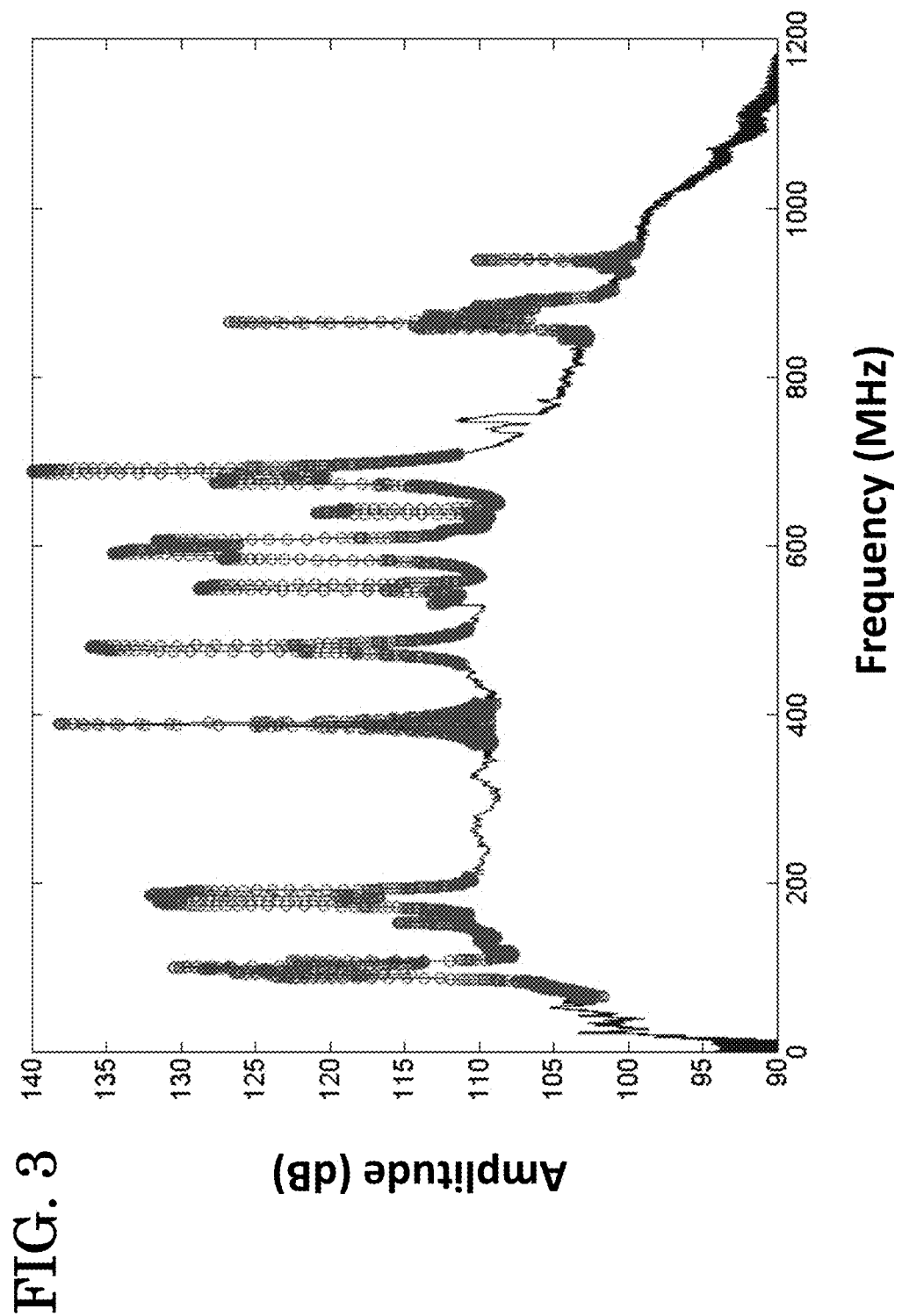
FIG. 3 is an illustration of a typical frequency spectrum showing potential interference at various frequencies. The detected RFI bins are plotted using the symbol "o."

The U.S. patent application Ser. No. 14/452,902, filed Aug. 6, 2014, now U.S. Pat. No. 9,363,024 averaging process identifies the location of the most persistent RFI sources as local peaks (maxima) in the overall observed spectrum. Popular local-maxima identification algorithms can then be applied iteratively to locate frequency bands that contain persistent RFI components. FIG. 3 illustrates an example of this RFI-detection process where red asterisks provide markers for likely RFI-dominant locations in the operating frequency spectrum. More specifically, only sinusoids in frequency bands identified by the RFI spectrum estimator (for example, those marked by the red circles in FIG. 3) are retained in the RFI dictionary $D_i^{rfi}$.

As described in the U.S. patent application Ser. No. 14/452,902, filed Aug. 6, 2014, now U.S. Pat. No. 9,363,024, referring again to FIG. 1, the spectrum estimator 103 detects $M_{RFI}$ frequency bands that are associated with RFI. The $j^{th}$ RFI band (j=1, ..., $M_{RFI}$) spans the frequency range from $f_L(j)$ to $f_H(j)$. For each detected RFI frequency band, a number of pairs of sine and cosine tones (waveforms) are generated to form the sub-dictionary for this RFI band. The RFI dictionary 104 comprises cosine and sine waveforms within the frequency range identified as RFI-contaminated from the RFI spectrum estimator 103.

As described in the U.S. patent application Ser. No. 14/452,902, filed Aug. 6, 2014, now U.S. Pat. No. 9,363,024, the steps for forming the RFI comprise:
(1) Averaging the frequency spectrum of the received signals from P neighboring apertures (P is a parameter that can be controlled): frequency bands with significant RFI energy will emerge from the averaging operation;
(2) Filling the RFI dictionary 104 with frequency regions that contain local peaks (maxima) as shown in FIG. 3 (regions in red, which are RFI-contaminated, contain local peaks).

Cosine and sine waves in the regions marked by the color red in FIG. 3 become the atoms (columns) of the estimated noise dictionary 104. The followed-up sparse-recovery optimization algorithm (based on the familiar OMP algorithm that you have seen multiple times) remains exactly the same. This optimization is the step where RFI is separated and then suppressed.

As described in the U.S. patent application Ser. No. 14/452,902, filed Aug. 6, 2014, now U.S. Pat. No. 9,363,024, where the frequency increment between two adjacent tones in the RFI dictionary 104 is $\Delta f_D$, the number of pairs of cosine and sine waveforms to be generated for each RFI band is $$N_j = \text{round}\left(\frac{f_H(j) - f_L(j)}{\Delta f_D}\right).$$

Figure 5A:
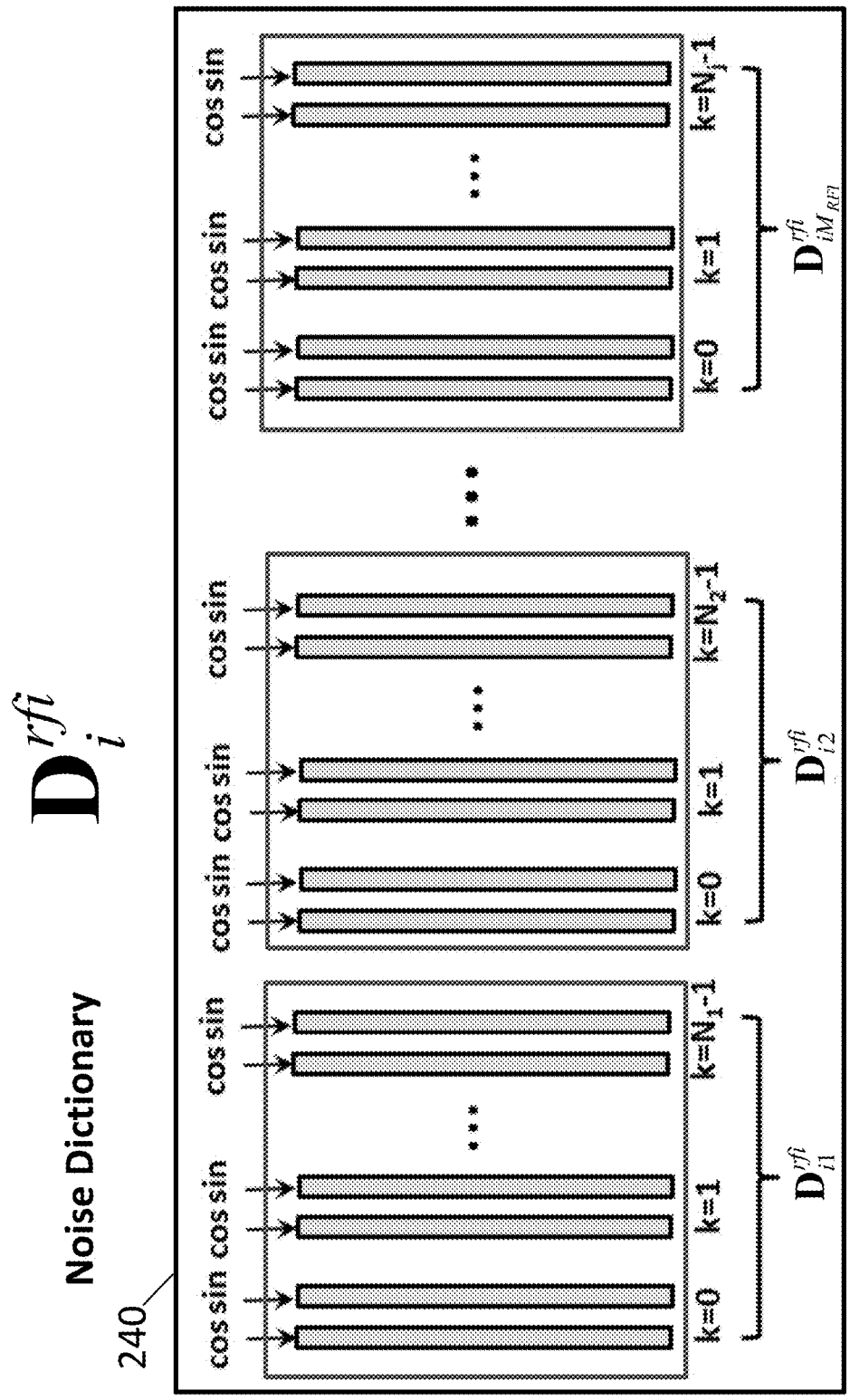
FIG. 5A is a schematic illustration of the matrix containing the RFI noise dictionary $D_i^{rfi}$ (Block 240).

As described in the U.S. patent application Ser. No. 14/452,902, filed Aug. 6, 2014, now U.S. Pat. No. 9,363,024, the RFI sub-dictionary that corresponds to the $j^{th}$ RFI band from $f_L(j)$ to $f_H(j)$.

$$D_{ij}^{rfi}[\cos(2\pi(f_L(j)+k\Delta f_D))|\sin(2\pi(f_L(j)+k\Delta f_D))]k=0, \ldots, N_j-1 \quad \text{(Equation 2A)}$$

where for every RFI frequency band that is detected (indexed by j), $f_L(j)$ is the lowest frequency limit of the detected band and $f_H(j)$ is the highest frequency limit of the RFI frequency band. The values of $D_{ij}^{rfi}$ are computed from the above equation form the columns for the dictionary 104, such as, for example, elements 241, 242, and 243. Note that the elements 241-243 represent only examples of elements in 240. A more complete versions is illustrated in FIG. 5A, which contains estimations of the RFI noise component computed using the following Equation 2B.

As described in the U.S. patent application Ser. No. 14/452,902, filed Aug. 6, 2014, now U.S. Pat. No. 9,363,024, the RFI dictionary for the $i^{th}$ aperture position is the concatenation of all RFI sub-dictionaries $$D_i^{rfi} = [D_{i1}^{rfi} D_{i2}^{rfi} \ldots D_{ij}^{rfi} \ldots D_{iM_{RFI}}^{rfi}] \quad \text{Equation 2B}$$

where j=1, 2, ... j ..., $M_{RFI}$. As shown in the arrangement depicted in FIG. 5A, the entries derived from equation 2A are placed vertically as vectors beginning from the lowest frequency band index 1 to the highest frequency band index $M_{RFI}$.

The steps to construct the RFI dictionary 104 are: (i) the RFI spectrum analyzer/estimator 103 estimates the frequency bands that the RFI signals occupy as mentioned above (for example $f_L(j)$ and $f_H(j)$ for the detected frequency band (j)), (ii) for each detected RFI frequency band, the sub-dictionary for this RFI band is constructed by generating pairs of sine and cosine waveforms that spans the frequencies within that band (j) (i.e. the above equation is solved for the matrix $D_{ij}^{rfi}$), and (iii) the RFI dictionary 104 is constructed by concatenating all RFI sub-dictionaries (for each frequency band (j)) generated in previous step). The matrix $D_i^{rfi}$ is illustrated in box 240 of FIG. 5A which contains pairs of sines and cosines spanning the frequencies of the Man RFI bands, as indexed by j from 0 to $M_{RFI}$, where M is the total number of detected RFI frequency bands. Note that the RFI dictionary $D_i^{rfi}$ is adaptive. Since the detected RFI frequency bands are data dependent, the RFI dictionary is changed with time. Note that more sophisticated techniques or available prior information can be taken into account to further improve the RFI dictionary as described above.

As described in the U.S. patent application Ser. No. 14/452,902, filed Aug. 6, 2014, now U.S. Pat. No. 9,363,024, it is important to note that although the observed scene might be complex with many objects, the complexity M of the receive data record is significantly reduced since the reflections from all targets that have the same range distance from the radar transmitter/receiver would be represented by a single reflection coefficient and phase. The publication by Lam Nguyen and Trac Tran, "Robust Recovery of Synthetic Aperture Radar Data from Uniformly Under-Sampled Measurements," IEEE IGARSS, (Jun. 28, 2011) (hereby incorporated by reference), describes how the model can robustly represent real SAR data, and is herein incorporated reference.

As described in the U.S. patent application Ser. No. 14/452,902, filed Aug. 6, 2014, now U.S. Pat. No. 9,363,024, referring now to the dictionary 105, this dictionary is constructed from phase-shifted versions of the point-target response signal. In the absence of interference sources, the received signal would be simply the summation of reflections of all targets within the radar's range swath and beamwidth, i.e., ideally the received signal would be composed of a linear combination of delayed and weighted replicas of the point target response. For example, in time domain the received signal would be:

$$y(t) = \sum_{i=1}^{M} \alpha_i s(t - \tau_i), \quad \text{(Equation 3)}$$

where s(t) is the point target response in time domain, the weighting coefficients $\alpha_i$ represent the target amplitudes and the phase-shifting parameters $\tau_i$ model the phase change that corresponds to the delay time it takes the transmit signals to travel the distance between the transmitter/receiver and the point target of interest. In other words, the received signal may comprise the output of a linear time invariant (LTI) system modeled by the reflection coefficients and its sparsity is directly related to the complexity level of the scene.

Once the two sparsifying dictionaries 104 and 105 are obtained, two sparse representations at each aperture i: one for the radar signal $x_i$ and the other for the RFI component $r_i$ may be simultaneously requested. This leads to the following optimization problem, which can be solved approximately with orthogonal matching pursuit (OMP) whose detailed operation steps are shown in FIG. 4.

$$\{\alpha'_i, e'_i\} = \underset{\alpha_i, e_i}{\operatorname{argmin}} \{\|\alpha_i\|_0 + \|e_i\|_0\} \text{ s.t.} \quad (4)$$

$$y_i = [D_i^x \quad D_i^{rfi}] \begin{bmatrix} \alpha_i \\ e_i \end{bmatrix} + w_i.$$

As described in the Ser. No. 14/452,902, the following relaxed convex optimization problem is also implemented, where λ and τ are tuning parameters that control the trade-offs between the sparsity priors and the observation consistency constraint, as described further in $$\{\alpha'_i, e'_i\} = \underset{\alpha_i, e_i}{\operatorname{argmin}} \|y_i - D_i^x \alpha_i - D_i^{rfi} e_i\|_2 + \lambda \|\alpha_i\|_1 + \tau \|e_i\|_1. \quad (4A)$$

Figure 2:
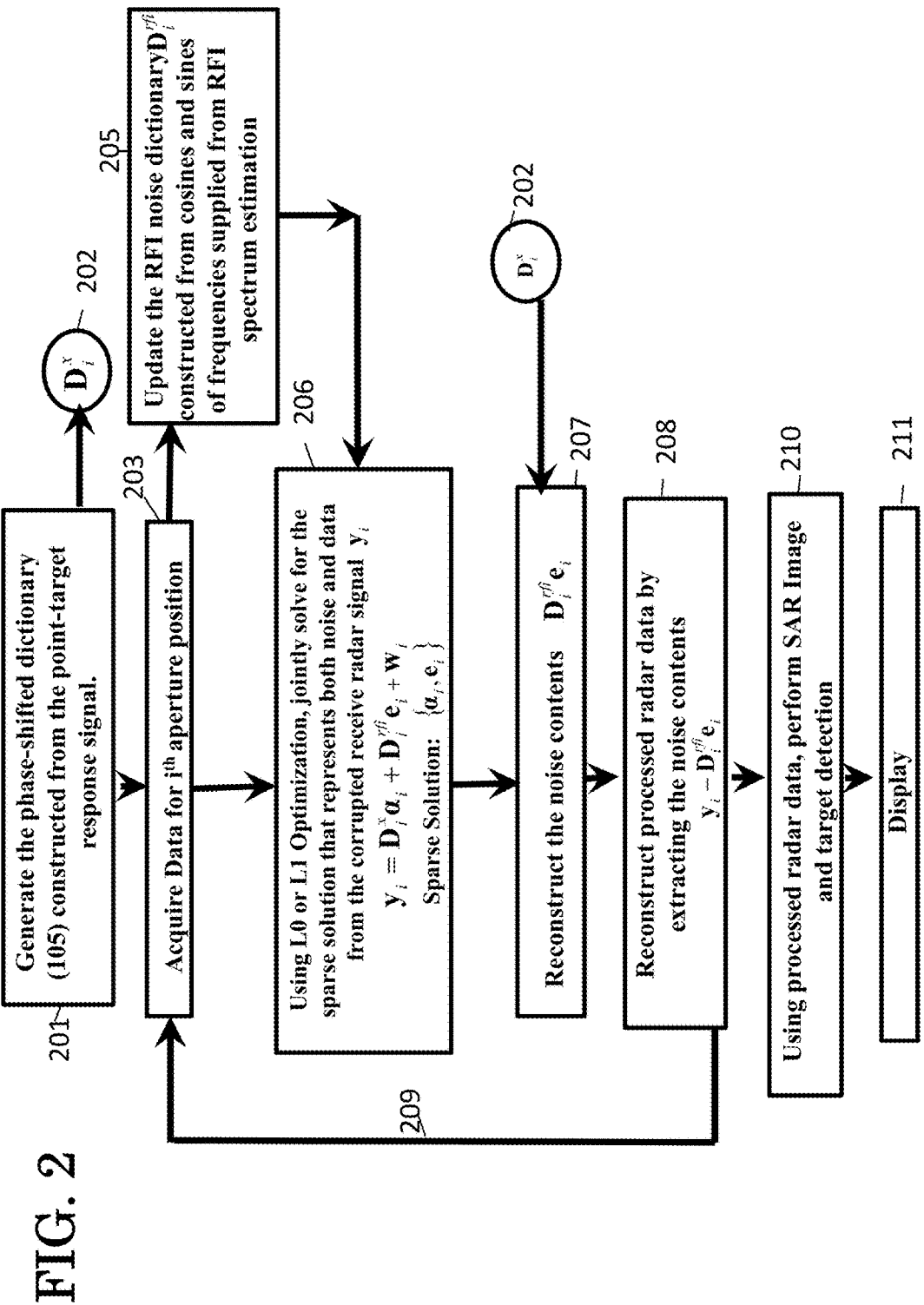
FIG. 2 is a flow chart of a showing the formation of the dictionaries and signal reconstruction in accordance with the present invention.

Note that in both formulations of Equations 4 and 4A, the entries in both dictionaries should be normalized. Hence, the optimization is not dependent on the noise energy level if the parameters λ and τ are pre-determined appropriately. The resulting noise-suppressed signal can then be computed as $x_i' = y_i - D_i^{rfi} e_i'$. Each data record that is expected to contain the SAR signal of interest is recovered independently. All are then supplied to the image processor 107 to produce the final SAR image. FIG. 2 summarizes the extracting of the noise contents and reconstruction of the processed radar data As described in the U.S. patent application Ser. No. 14/452,902, filed Aug. 6, 2014, now U.S. Pat. No. 9,363,024, iln Box 201 of FIG. 2 a phase-shifted dictionary 105 is generated. This may occur on a one time basis at the start of operations or may be updated as desired to reflect changes in the target area or target range. The circle 202 represents the step of inputting the phase-shifted data into the dictionary 105. In Box 203, the receiver is operational to receive either waveforms reflected from targets (in combination with noise). Box 205 represents the updating of the noise data constructed from cosines and sines of frequencies supplied from RFI spectrum estimation into the dictionary 105. Continuing in the flow chart of FIG. 2, in Box 206, using the data from both dictionaries 104 and 105, the system solves for the sparse solution that represents both noise and data as represented mathematically by the equation in Box 206.

As described in the U.S. patent application Ser. No. 14/452,902, filed Aug. 6, 2014, now U.S. Pat. No. 9,363,024, continuing in the description of the flow chart of FIG. 2, in Box 207, the noise contents is reconstructed as $D_i^{rfi} e_i$, and in Box 208 the signal is reconstructed by extracting the estimated noise contents as $x_i = y_i - D_i^{rfi} e_i$, where the dense noise $w_i$ in equation (1) has been ignored. The steps 203 through 208 are then repeated with the acquisition of new data in another aperture in order to form a complete image. Box 210 represents the image formulation and Box 211 represents the display of the final SAR image. Reference is made to U.S. Patent Application Publication No. 2010/0141508, herein incorporated by reference, for the further information relating to Boxes 210 and 211.

Orthogonal Matching Pursuit

As described in the U.S. patent application Ser. No. 14/452,902, filed Aug. 6, 2014, now U.S. Pat. No. 9,363,024, a number of recovery techniques in the current Compressed Sensing (CS) literature can be employed to solve the optimization problem in Equation (4A). In a preferred embodiment, Orthogonal Matching Pursuit (OMP) was used due to its simplicity, recovery robustness, and fast computation. OMP is also very simple to set up: the only required parameter is the sparsity level K. Once the sparsest coefficient vector a is found, the raw data record is recovered as in Equation (4A). All of the recovered data records are then supplied to the back-projection image formation algorithm to produce the final SAR image.

As described in the U.S. patent application Ser. No. 14/452,902, filed Aug. 6, 2014, now U.S. Pat. No. 9,363,024, FIG. 4 is a description of a generic Orthogonal Matching Pursuit Algorithm utilized in conjunction with a preferred embodiment of the present invention as represented in FIGS. 1 and 2. In box 220 α, which represents the coefficients, is initialized. In relation to the U.S. patent application Ser. No. 14/452,902, filed Aug. 6, 2014, now U.S. Pat. No. 9,363,024, embodiment, the coefficients relate to what columns are selected as "best" matches. In Box 221 the parameter r, referred to as the residual, is set initially to y, the incoming received signal. In Box 222, the operation is conducted to find out what is in the dictionary $D_i$ what is the column that most resembles the signal being examined. In Box 223, the objective is to try to find the index of columns with the best match between r and the dictionary $D_i$, which is the solution. In Box 224, the chosen index or indices are appended to the solution vector. In Box 225, the residue r is updated where $D^{PI}$ represents the pseudo inverse of the matrix (dictionary) D. The subtrahend represents the pseudo inverse matrix (dictionary) multiplied by the matrix D multiplied by the signal y. The process stops when all indices corresponding to the solution have been determined. If all indices have not been determined, there is a loop back to Box 222; as once one best match is found, the system loops back to find the second best match and so forth. The term $\alpha_a$ represents all indices of columns corresponding to the approximated solution, which is set forth in Box 226.

Figure 5B:
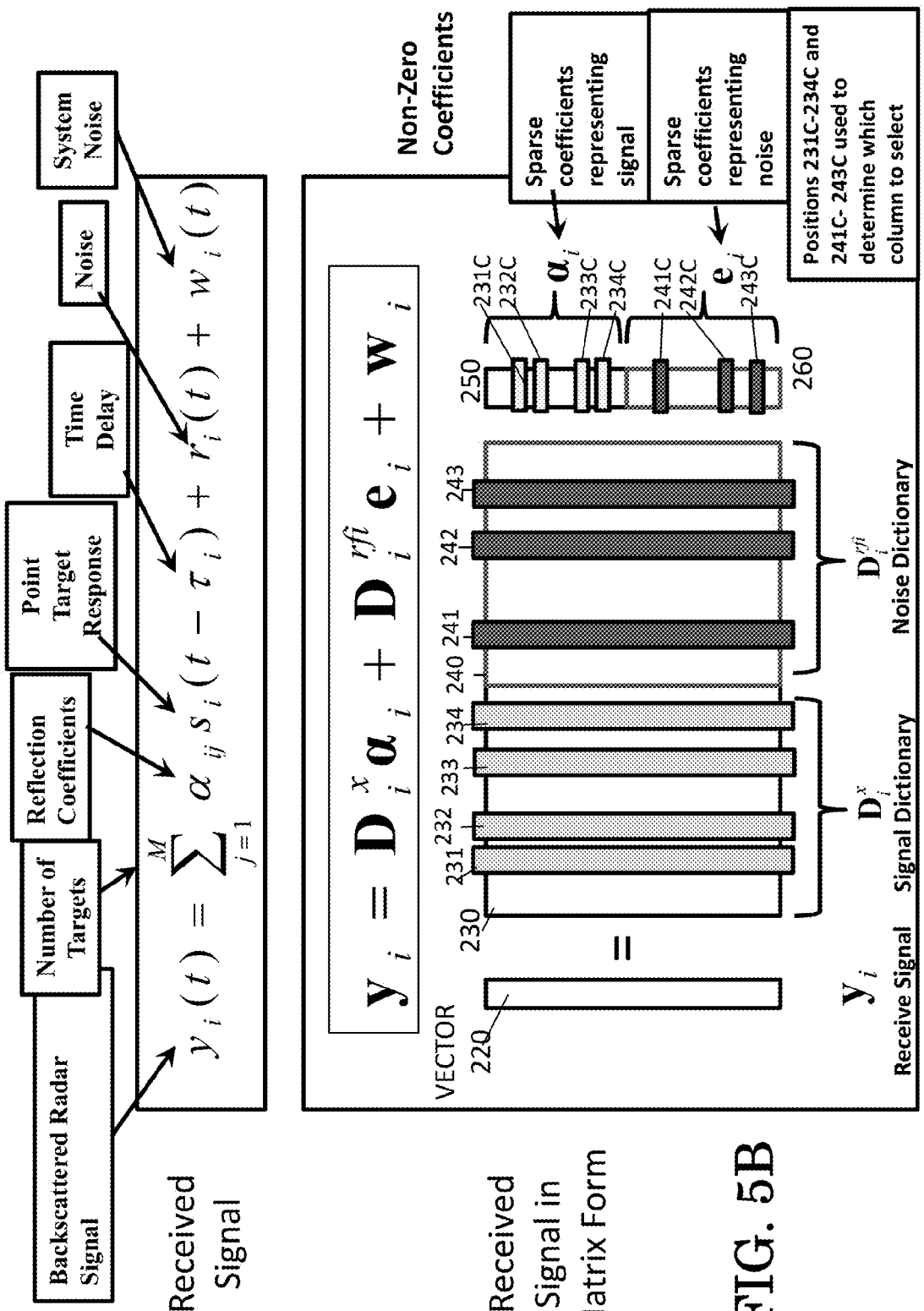
FIG. 5B is an illustration that conceptually illustrates the joint sparse optimization processor involving the signal dictionary $D_i^x$ (Block 230), with a finite number of significant coefficients in $\alpha_i$, which corresponds to the significant targets or objects within the observed scene, and the RFI noise dictionary $D_i^{rfi}$ (Block 240) with a finite number of significant coefficients in $e_i$ (Block 250), which corresponds to the significant RFI noise components present in $y_i$, the received signal at aperture index i.

As described in the U.S. patent application Ser. No. 14/452,902, filed Aug. 6, 2014, now U.S. Pat. No. 9,363,024, FIG. 5B is a diagrammatic illustration of the reconstruction of the radar signal y(t) in digital vector format 220 utilized in conjunction with the Ser. No. 14/452,902 embodiment and method illustrated in FIGS. 1 and 2. Shown in FIG. 5B are vector components of the signal dictionary 105, the RFI noise dictionary 104, and the sparse coefficient vector memory portion 250. Block 230 indicates the signal dictionary which correlates to the dictionary 105 of FIG. 1. Block 240 indicates the noise dictionary containing the solutions to the equation for $D_{ij}^{rfi}$ which correlates to the noise dictionary 104 of FIG. 1. The columns 231, 232, 233, 234 are selected by the nonzero entries in the solution $\alpha_i$. in the top part of vector memory portion 250. Vector memory portion 250 contains two sections; one selection is the sparse coefficients 231C, 232C, 233C, 234C of the solution $\alpha_i$. and the other portion is the RFI noise coefficients $e_i$ represented by 241C, 242C, 243C, which will determine the location of the nonzero entries in noise dictionary 105. The sparse coefficients 231C, 232C, 233C, and 234C are associated with the columns 231, 232, 233, 234 and the RFI noise coefficients 241C, 242C, 243C are associated with the columns 241, 242, 243. The vector coefficients in vector memory portion 250, which includes both $\alpha_i$ and $e_i$, is obtained from the $L_0$ norm or $L_1$ norm minimization.

Figure 6:
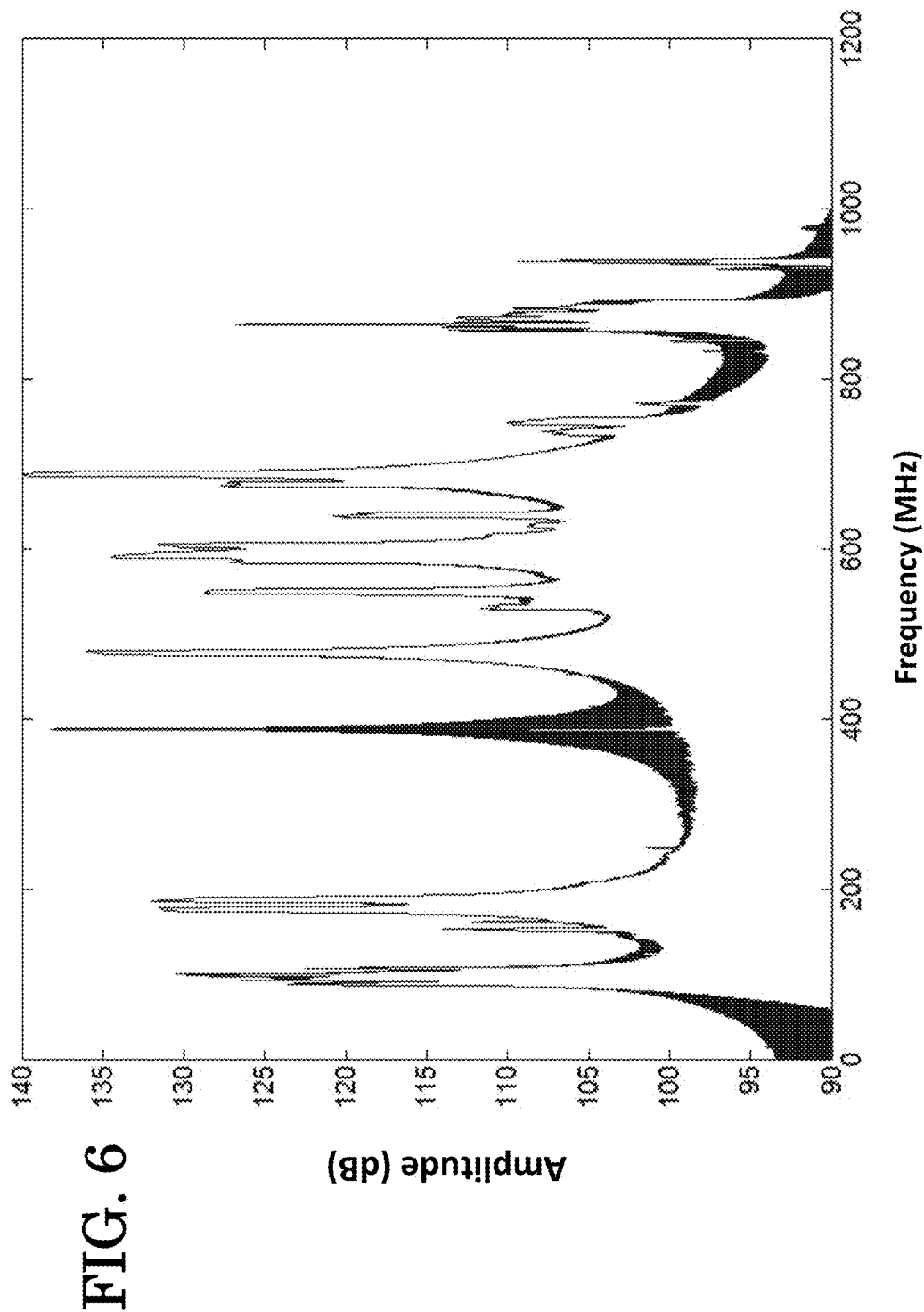
FIG. 6 is an illustration showing a noise frequency spectrum wherein the amplitudes of the signals are shown using a decibel (dB) scale.
Figure 7:
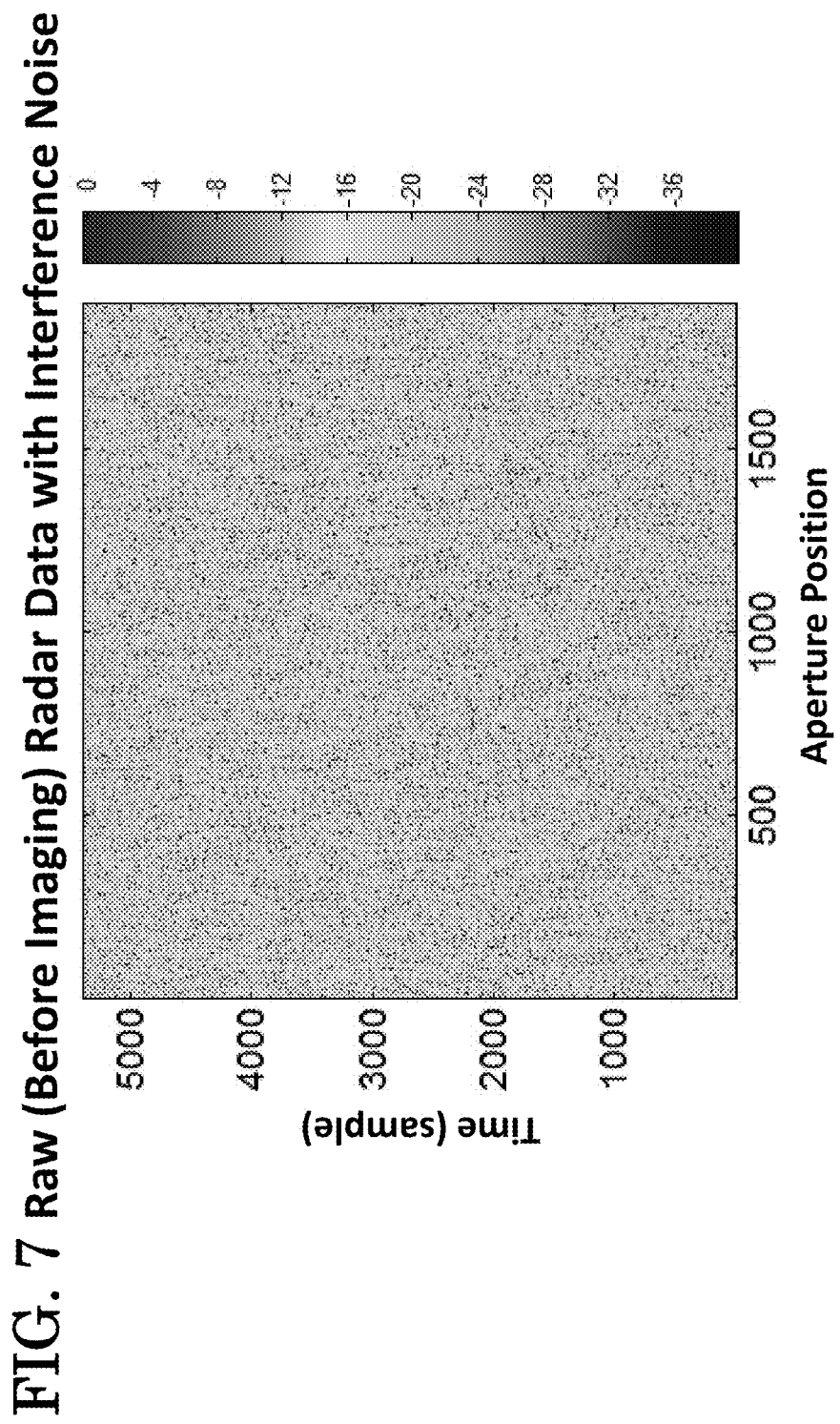
FIG. 7 illustrates a visual depiction of the radar data contaminated with noise signals without any processing.
Figure 8:
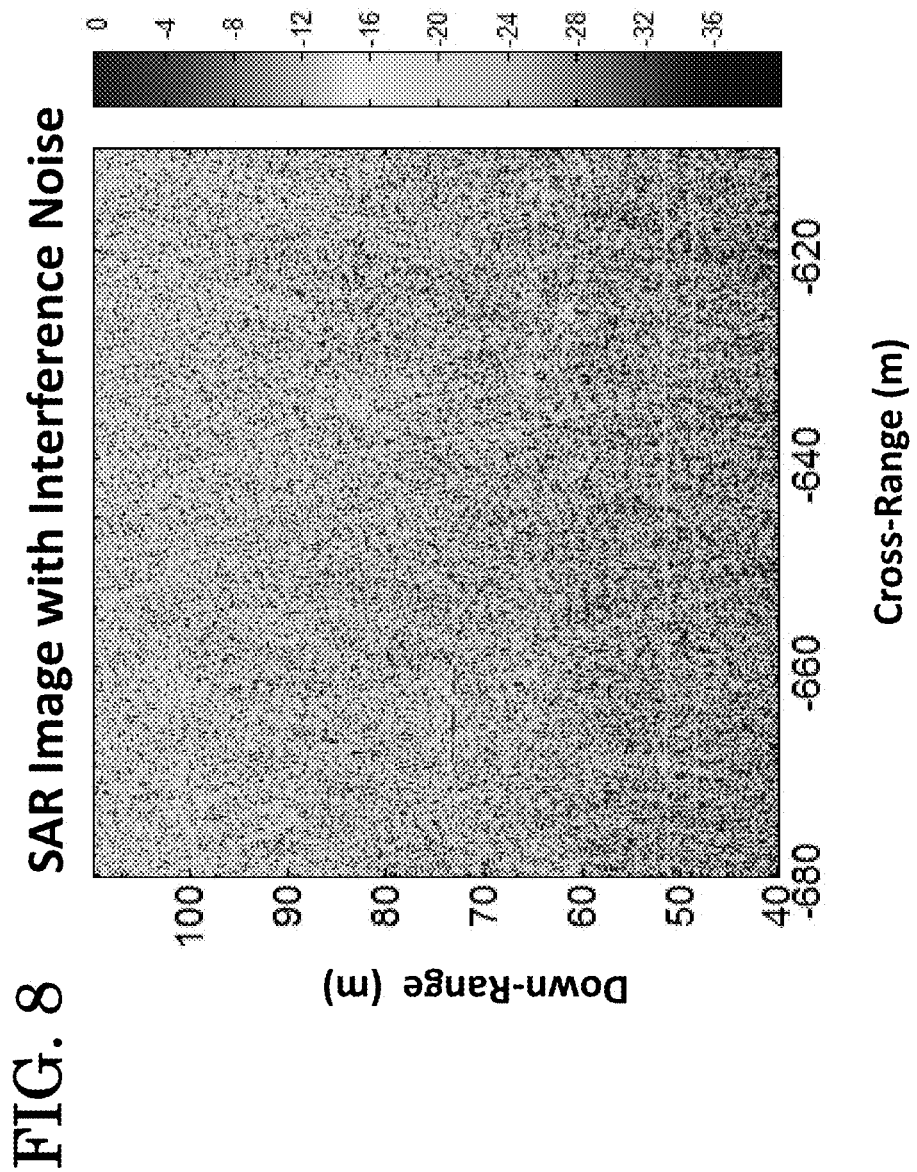
FIG. 8 is an illustration showing a SAR image with interference noise; i.e., an image processed without using the present invention.

The noise extraction technique of the present invention was tested and evaluated using the data from the U.S. Army Research Laboratory (ARL) UWB low-frequency SAR that transmits radar signals occupying the frequency spectrum from 50 to 1150 MHz. Interference noise data was collected from the real environment with the antenna pointing toward Washington, D.C., where a typical example is shown in FIG. 6. For each aperture location i where radar data are collected, the noise record was randomly selected and added to the raw radar data record. As described in the U.S. patent application Ser. No. 14/452,902, filed Aug. 6, 2014, now U.S. Pat. No. 9,363,024, FIG. 7 shows a group of raw radar data records that are corrupted by the interference noise (before image formation). Without employing the invented noise extraction technique, the data set of FIG. 7 is sent to the image formation stage to form the noisy radar image that is shown in FIG. 8. The image of FIG. 8 does not show any features from the scene since it is dominated by the high level of noise. This illustrates the severe impact of the interference noise on radar imagery. Next, the data set of FIG. 7 is processed using the invented noise extraction technique. Each column (vertical line) in the image shown in FIG. 7 represents a raw radar record that is contaminated with RFI. The record is color coded using the dB amplitude scale shown by the color bar. Since the RFI noise level is very high compared to the radar signal level, targets cannot be seen in this data visualization.

Figure 9A:
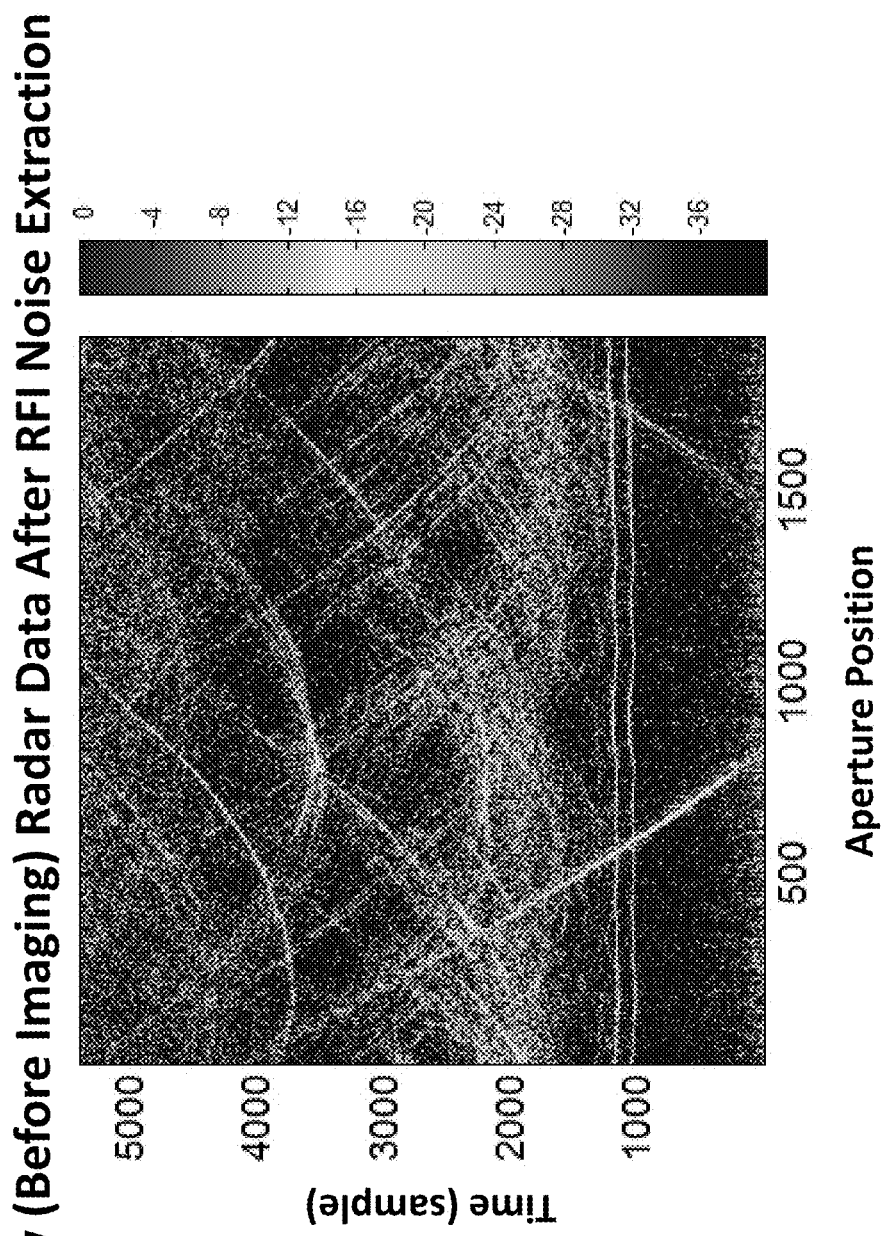
FIG. 9A is an illustration showing raw (before imaging) radar data after RFI noise extraction (using the present invention).
Figure 9B:
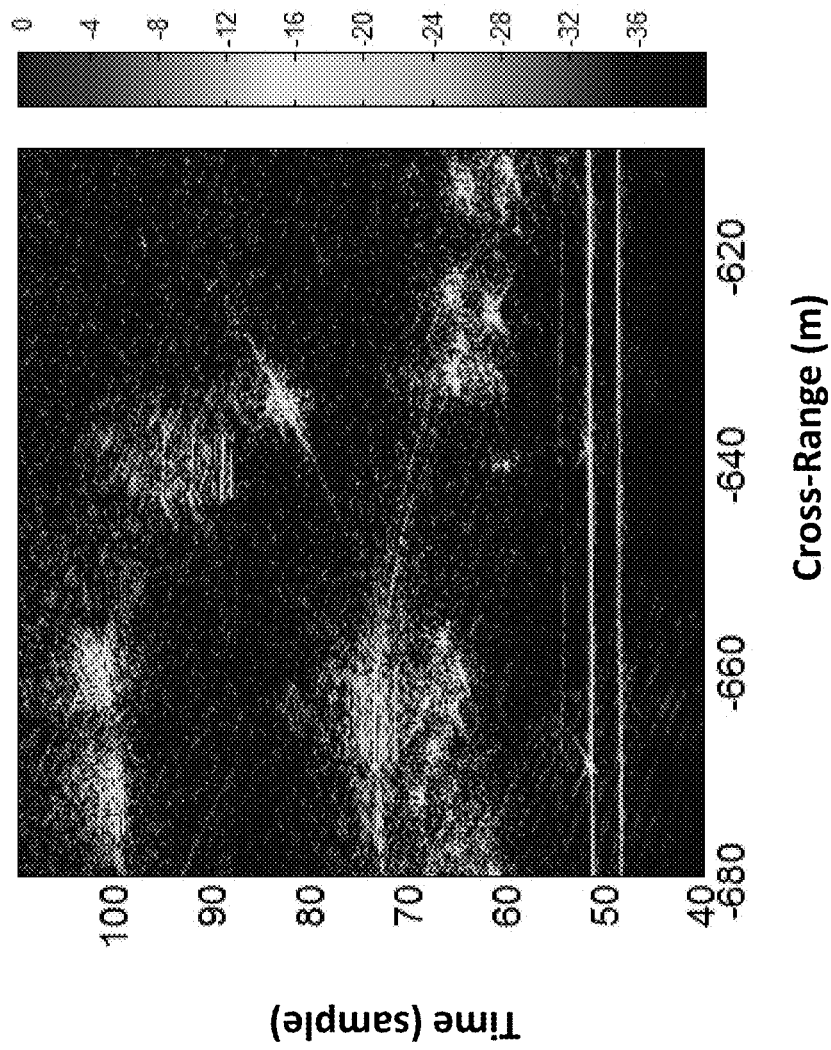
FIG. 9B is an illustration of a resulting outputted SAR image using the invented interference noise extraction technique.
Figure 10:
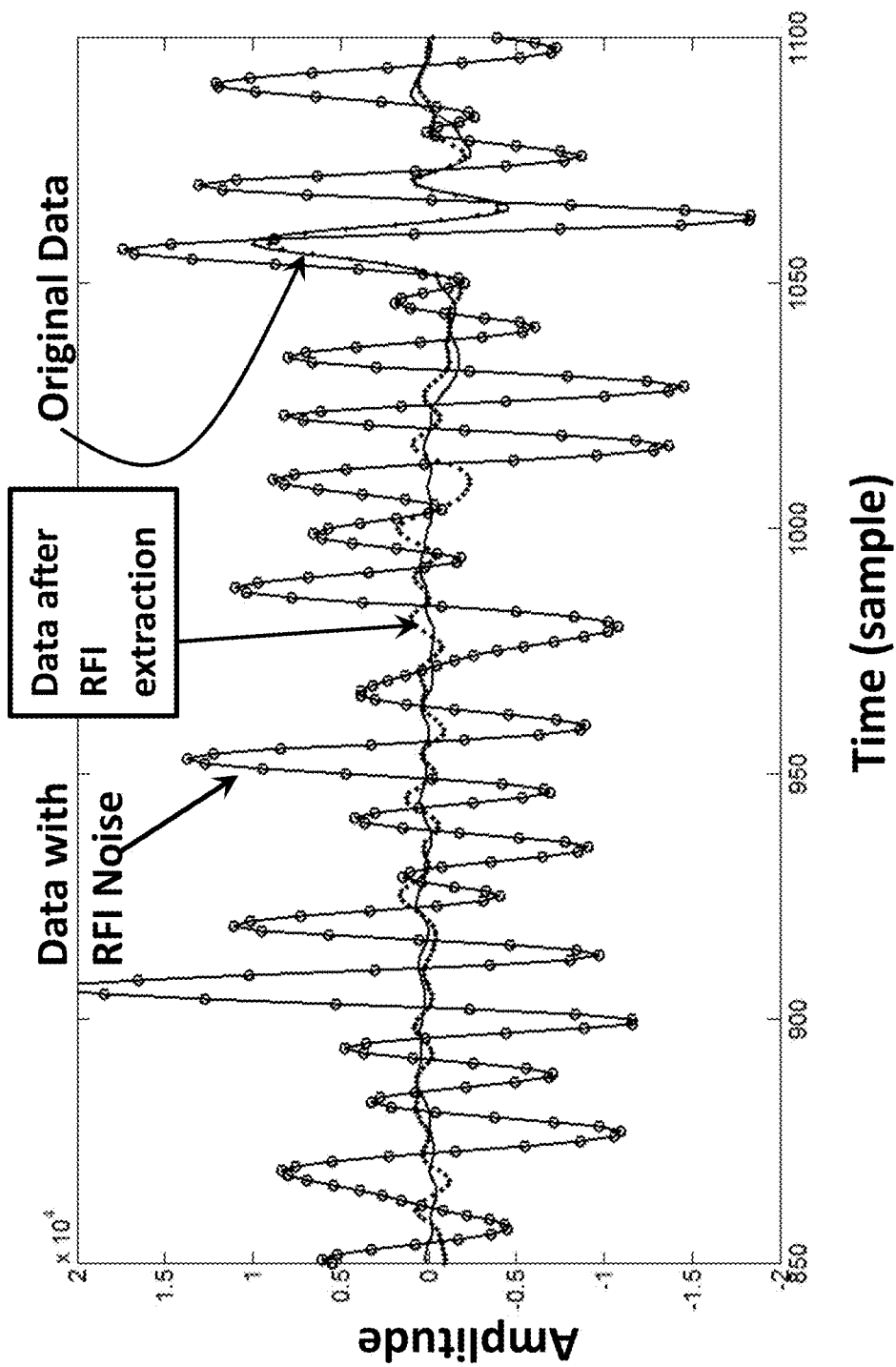
FIG. 10 is a graphical illustration depicting data with RFI noise, original data and data after RFI extraction.

As described in the U.S. patent application Ser. No. 14/452,902, filed Aug. 6, 2014, now U.S. Pat. No. 9,363,024, FIG. 9 shows the same group of radar records after using the invented RFI extraction technique. This results in the clean raw radar data set of FIG. 9 that shows the details of the targets in the scene. FIG. 10 compares the time-domain plots of a typical original radar record (solid line), its interference noise corrupted version (line with circles), and its RFI extracted version (dotted line). The noise corrupted curve shows that the target responses are completely obscured by the strong interference noise signals. Although a small level of residual noise still remains in the RFI extracted radar record (green), the responses from the targets are essentially recovered and very well matched with the original data.

As described in the U.S. patent application Ser. No. 14/452,902, filed Aug. 6, 2014, now U.S. Pat. No. 9,363,024, FIG. 11 visually depicts the resulting radar image using the invented interference noise extraction technique. This SAR image shows a few targets (vehicles) hiding behind foliage and tree area. All the details from the targets in the scene showed up clearly in the resulting image. The signal to noise level is improved by approximately 18 dB using the invented technique.

The techniques provided by the embodiments described in the U.S. patent application Ser. No. 14/452,902, filed Aug. 6, 2014, now U.S. Pat. No. 9,363,024, may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

As described in the U.S. patent application Ser. No. 14/452,902, filed Aug. 6, 2014, now U.S. Pat. No. 9,363,024, the resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software embodiments. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices (including but not limited to receivers, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

There are various techniques for solving the inverse linear system of equations for the sparsest $\alpha^*$ in the compressed sensing community, which can be classified into two categories:
  BASIS PURSUIT via linear programming (as described in E. Candes and T. Tao, "Decoding by linear programming," IEEE Trans. on Information Theory, vol. 51, no. 12, pp. 4203-4215 (December 2005)(hereby incorporated by reference) or gradient projection (as described in M. A. T. Figueiredo, R. D. Nowak, and S. J. Wright, "Gradient projection for sparse reconstruction: Application to compressed sensing and other inverse problems," IEEE Journal of Selected Topics in Signal Processing: Special Issue on Convex Optimization Methods for Signal Processing, vol. 1, no. 4, pp. 586-598 (April 2007)(hereby incorporated by reference);

MATCHING PURSUIT via orthogonal matching pursuit (as described in J. Tropp and A. Gilbert, "Signal recovery from random measurements via orthogonal matching pursuit," IEEE Trans. on Information Theory, vol. 53, no. 12, pp. 4655-4666 (December 2007) (hereby incorporated by reference)) regularized orthogonal matching pursuit (as described in D. Needell and R. Vershynin, "Signal recovery from incomplete and inaccurate measurements via regularized orthogonal matching pursuit," IEEE Journal of Selected Topics in Signal Processing, vol. 4, pp. 310-316 (April 2010) (hereby incorporated by reference)), subspace pursuit (as described further in W. Dai and O. Milenkovic, "Subspace pursuit for compressive sensing: Closing the gap between performance and complexity," IEEE Trans. on Information Theory, vol. 55, pp. 2230-2249 (May 2009) (hereby incorporated by reference)), sparsity adaptive matching pursuit (as described further in T. T. Do, L. Gan, N. H. Nguyen, and T. D. Tran, "Sparsity adaptive matching pursuit algorithm for practical compressed sensing," in Proc. Asilomar Conf. on Signals, Systems, and Computers, pp. 581-587, Pacific Grove (October 2008)(hereby incorporated by reference), etc.

In this implementation the orthogonal matching pursuit technique may be employed as described in J. Tropp and A. Gilbert, "Signal recovery from random measurements via orthogonal matching pursuit," IEEE Trans. on Information Theory, vol. 53, no. 12, pp. 4655-4666 (December 2007) (hereby incorporated by reference) to solve for $\alpha^*$ due to its simplicity, recovery robustness, and fast computation. This algorithm is graphically illustrated in FIG. 4.

Dictionary of Phase Shifted Versions as Sparsifying Matrix

As described in the U.S. patent application Ser. No. 14/452,902, filed Aug. 6, 2014, now U.S. Pat. No. 9,363,024, in the vector space $C^N$ of N-dimensional signals, vector x can be represented as $x=\Psi\alpha$, where $\Psi$ is called the sparsifying matrix which in other words, the representation through $\Psi$ can be (and in many cases, should be) close to the original signal x. The sparsifying matrix is said to be complete if its columns span the entire N-dimensional space. The signal x is said to be strictly K-sparse when there are only K non-zero components in $\alpha$. When the sorted magnitudes of $(\alpha_i)$ decay very quickly and x can be well approximated with only K components, then x is said to be K-compressible. The effectiveness of the recovery algorithm of a class of signal x heavily depends on the sparsest representation of the signal class.

In standard compressed sensing, fixed linear transform bases such as the DCT, FFT and the discrete wavelet transform (DWT) or a combination of all three are often employed to obtain sparsity. In the UWB SAR system, the transmitted pulse is a monocycle impulse with an approximated bandwidth range of 300-3000 MHz. Current collected raw data captured in the 8 receivers do not exhibit any common sparse pattern. In other words, a quick spectrum analysis reveals that the raw data is not time-sparse or frequency sparse or even wavelet sparse. Hence, a naïve direct application of Compressed Sensing (CS) via random projection with Fourier, cosine, or wavelet bases yields disappointing results.

The present invention addresses the two drawbacks of previous RFI-extraction approaches via either environment sniffing or interference estimation. The invention comprises an alternative joint RFI-estimation-extraction technique and demonstrates that the RFI problem can still be solved almost blindly without any cumbersome/costly effort in collecting the prior RFI information in any shape or form. Contributions and novelties in the present invention include, inter alia, (i) modeling RFI contamination across multiple apertures with a general low-rank structure; (ii) UWB SAR signals are approximated as sparse impulsive outliers that are added on top of the low-rank RFI signals; (iii) an efficient robust PCA decomposition is employed to extract RFI from observations; (iv) alternatively, we can also model RFI as the sparse corruptions (with respect to a frequency-based dictionary) while treating UWB SAR signals as low-rank component; (v) a simple tuning mechanism is provided to control the detailed as well as contrast level of the final SAR image; and (vi) the framework can be easily incorporated into most existing systems as a pre-processing stage prior to other popular signal processing and image formation steps since the proposed technique allows the processing of data records in independent fashion, in parallel, and directly in the raw time domain.

In addition to radar, it is believed that the invented noise extraction technique can be applied to any communications systems that suffer from interference noises. Examples of such practical systems and applications include: radars operating in combative environments with frequent enemy jamming; audio recordings with background noise; interference-cancellation for automatic audio-monitoring systems; noise-cancellation pre-processing algorithms for smart phones; noise-cancellation headphones in noisy environments such as airplanes, airports, construction sites, etc.

Sparse/Low-Rank Models and General Assumptions

Figure 11:
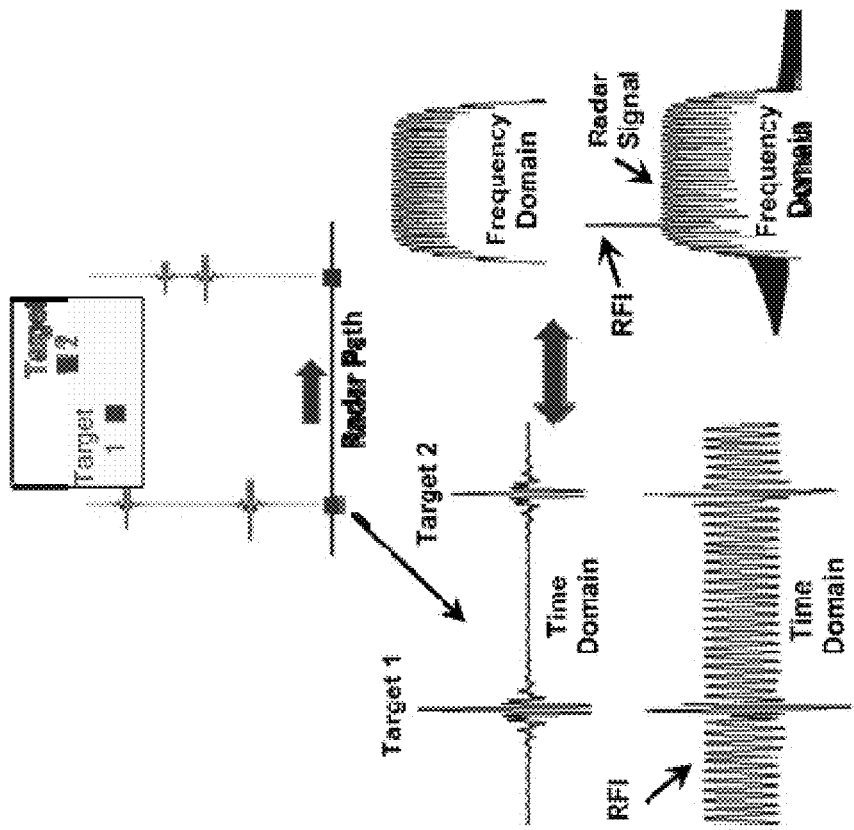
FIG. 11 is a depiction of a simplistic impulse-based SAR system attempting to capture a simple scene with only two significant targets.

FIG. 11 is a depiction of a simplistic impulse-based SAR system attempting to capture a simple scene with only two significant targets. At aperture i, the transmitter would transmit a probing pulse s and the receiver would record the echoed back-scattered signal $y_i$. In the ideal case with exactly two pint targets and without any interference, we expect the received signal to contain two bounced-back pulses indicating how far apart our targets are with respect to the sensing platform. Note that this example illustrates precisely an UWB radar system since the impulse in time leads to a wideband frequency representation. In practice, UWB radar signals are often interfered by wireless signals $r_i$ from AM/FM radios, TV broadcasting, mobile phone communications, etc. At each aperture, we observe a similar SAR signal characteristic: occasional narrow pulses indicating the presence of significant targets of interest embedded in a sea of RFI waves. If the RFI power is strong enough, these SAR spikes might be completely lost in the interference waves and we cannot visually detect them anymore. In short, SAR signals are sparse in the time domain, whereas RFI signals are sparse in the frequency domain. They come from completely different independent sources and they behave very different statistically. This is the most critical assumption in the proposed method. Note that in other popular UWB radar realizations/implementations such as step-frequency-based or chirp-based, received data can always be easily converted back to the raw time-domain representation presented here.

Hence, in accordance with the present invention, the observed radar signals Y are modeled as follows $$Y=X+R+W$$

where each column $y_i$ of the matrix Y is the observed (back-scattered signal captured at the radar receiver) signal at the i-th aperture, which comprises a linear mixture of the desired SAR signal $x_i$, the RFI signal $r_i$, and the common dense white Gaussian noise wt with small bounded energy. The goal is to extract R and W out of the observed mixture of Y, leaving the remaining SAR signal of interest X. Obviously, it is necessary to rely on certain prior knowledge on the structures of X and R to accomplish this separation task. The simplest structure that can be enforced on X and R is that they are either low-rank or sparse. These two properties are similar in capturing simple dominant structures in the data—the main difference is that "sparsity" comes with respect to a certain basis function or a certain set of patterns/waveforms (dictionary atoms) whereas the low-rank property does not need any of such specification in representation. The low-rank property is often associated with the set of eigen-functions of the matrix of interest.

Figure 12:
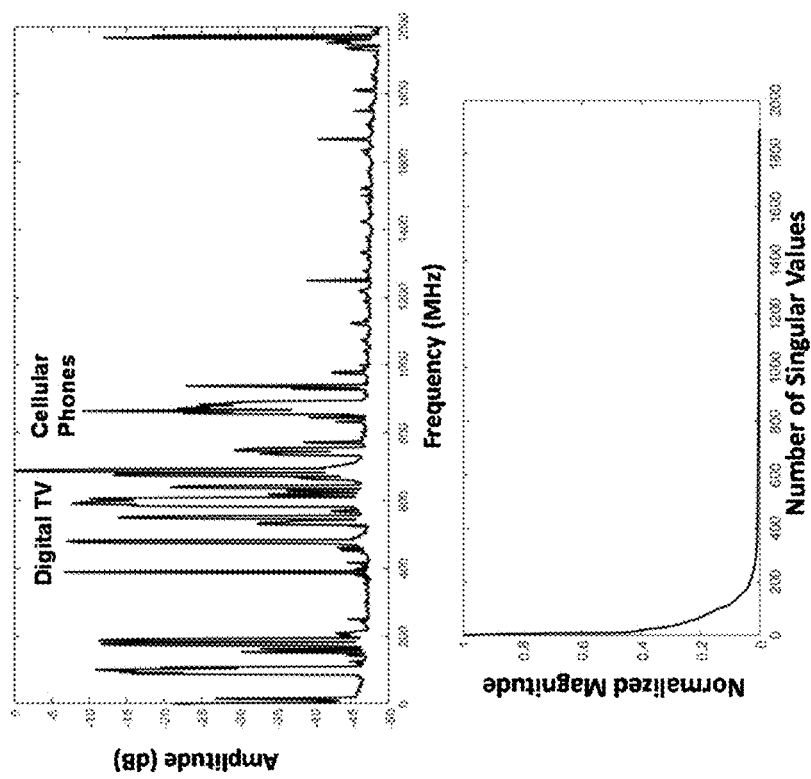
FIG. 12 presents a snapshot of a modern-day RFI spectrum captured from the rooftop of the U.S. Army Research Laboratory (ARL) building. Fortunately, although there are multiple interference sources ranging from AM to FM radio, from digital TV broadcast to cellular phone communications, the RFI turns out to be quite sparse in frequency.
Figure 13:
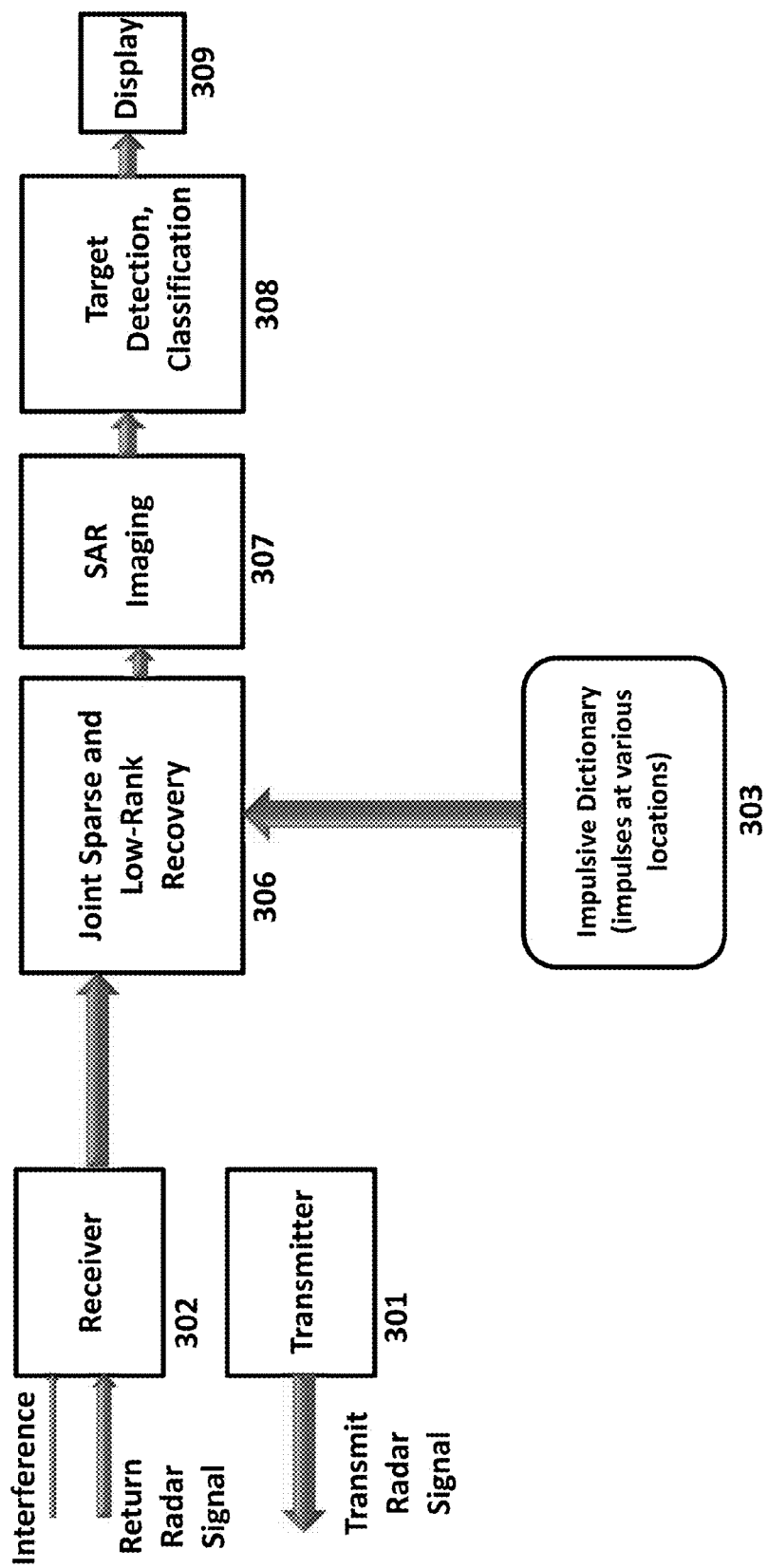
FIGS. 13-16 depict the overall system block diagram of embodiments of the current invention at various different configurations.

Unlike the other noise source $w_i$, the RFI sources $r_i$ buried in our observed signal y; are not completely random. RFI has very strong structured components and often contains a high level of energy. FIG. 12 presents a snapshot of a modern-day RFI spectrum captured from the rooftop of the U.S. Army Research Laboratory (ARL) building. Fortunately, although there are multiple interference sources ranging from AM to FM radio, from digital TV broadcast to cellular phone communications, the RFI turns out to be quite sparse in frequency. FIG. 12 also illustrates that the magnitude of singular values of the pure-RFI matrix R decays very quickly, indicating that R is low-rank. The majority of the RFI power concentrates within the top 10% of its principal components. If received signals are collected and processed within a small spatial-temporal neighborhood, we believe that the low-rank assumption on RFI sources is always valid. In fact, the low-rank structure here should be narrowband sinusoidal patterns resulting from various modulation schemes popular in today's wireless communications. It also turns out that the SAR signal matrix X also has low rank. However, its rank is tightly correlated to the scene complexity. The rank of X decreases when the scene of interest is simpler. On the other hand, when the scene becomes complicated with a high level of details, the rank of X might not be low enough for the low-rank assumption to be effective.

Both SAR matrix X and RFI matrix R can also be represented with sparse models. In fact, this is the key assumption made in our previous works in this domain. See, L. H. Nguyen and T. D. Tran, "Robust and adaptive extraction of RFI signals from ultra-wideband radar data," IEEE Int. Geoscience and Remote Sensing Symposium (IG-ARSS), pp. 7137-7140, (July 2012); L. H. Nguyen, T. D. Tran, and T. Do, "Sparse models and sparse recovery for ultra-wideband SAR applications," *IEEE Trans. on Aerospace and Electronic Systems*, vol. 50, no. 2, pp. 940-958, (February 2014) L. H. Nguyen and T. D. Tran, "Method and system for removal of noise in signal," U.S. Pat. No. 9,172,476. (October 2015); H. Nguyen and T. D. Tran, "Estimation and extraction of radio-frequency interference from ultra-wideband radar signals," *IEEE Int. Geoscience and Remote Sensing Symposium (IGARSS)*. pp. 2848-2851, (July 2015); L. H. Nguyen and T. D. Tran, "Efficient and robust RFI extraction via sparse recovery," *IEEE Journal of Selected Topics in Applied Earth Observations and Remote Sensing*, (to appear, 2016), L. H. Nguyen and T. D. Tran, "Method and system for estimation and extraction of interference noise from signals," U.S. patent application Ser. No. 14/452,902, filed Aug. 6, 2014, now U.S. Pat. No. 9,363,024, all of which are incorporated by reference as though fully rewritten herein.

Since each original SAR signal $x_i$ at the i-th aperture is assumed to be sparse with respect to $D^x$-the phase-shifted dictionary constructed from our transmitted signal s as described in U.S. Pat. No. 9,172,476. 45, the matrix X can be written as $x=D^xS$ where S is the matrix of sparse codes (i.e., each of its column captures the sparsity existing at each radar aperture). Next, RFI sources typically are frequency-sparse compared to the full bandwidth of the radar signals as well. The frequency-sparse feature of RFI can be easily explained: most modern communication systems rely on modulation to various higher frequencies for data transmission and broadcasting, and each system typically occupies only a few MHz of the spectrum. Hypothetically, the RFI noise sources $r_i$ can be captured effectively with its own sparse representation as: $r_i = D^r e_i$, where $D^r$ is the RFI noise sparsifying dictionary constructed from cosine and sine waveforms as described in U.S. patent application Ser. No. 14/452,902, filed Aug. 6, 2014, now U.S. Pat. No. 9,363,024. Hence, the RFI matrix R can be represented as $R=D^rE$ where the matrix E contains the RFI sparse codes.

FIG. 13-FIG. 16 depict the overall system block diagram of the current invention at various different configurations. In the simplest configuration shown in FIG. 13, at each pulse repetition interval (PRI), the radar transmitter (301) transmits radar signals to illuminate the area of interest and receives return radar signals that correspond to the physical objects from the area. The receiver (302) receives the return radar signals that are severely contaminated by many interference sources (radio, TV, cellular phone, communications systems, etc.). A key to the present invention is the joint sparse and low-rank signal recovery processor (306) which employs a single dictionary of impulses (303), i.e., the identity matrix. In this simplest configuration, the RFI is extracted from the observed signals almost completely blind: one does not need to sniff the RFI; in fact, there is no need to estimate the RFI as well as to assume any knowledge of the SAR transmitter. The only assumption here is that RFI signals consist of frequency tones whereas SAR signals are impulsive. The signal recovery processor (306) estimates, separates, and extracts the noise signal components via a separation process where the RFI is modeled as low-rank components while SAR signals are treated as sparse outliers embedded on top. The extracted RFI components are then subtracted out of the raw received signals to generate clean radar signals. For a typical communications system, the output signals would be processed by a detector. In this radar block diagram, the output signals are sent to the image processor (307), and target detection and discrimination (308). The resulting radar data, image and detection information are then visualized by the display (309).

Figure 14:
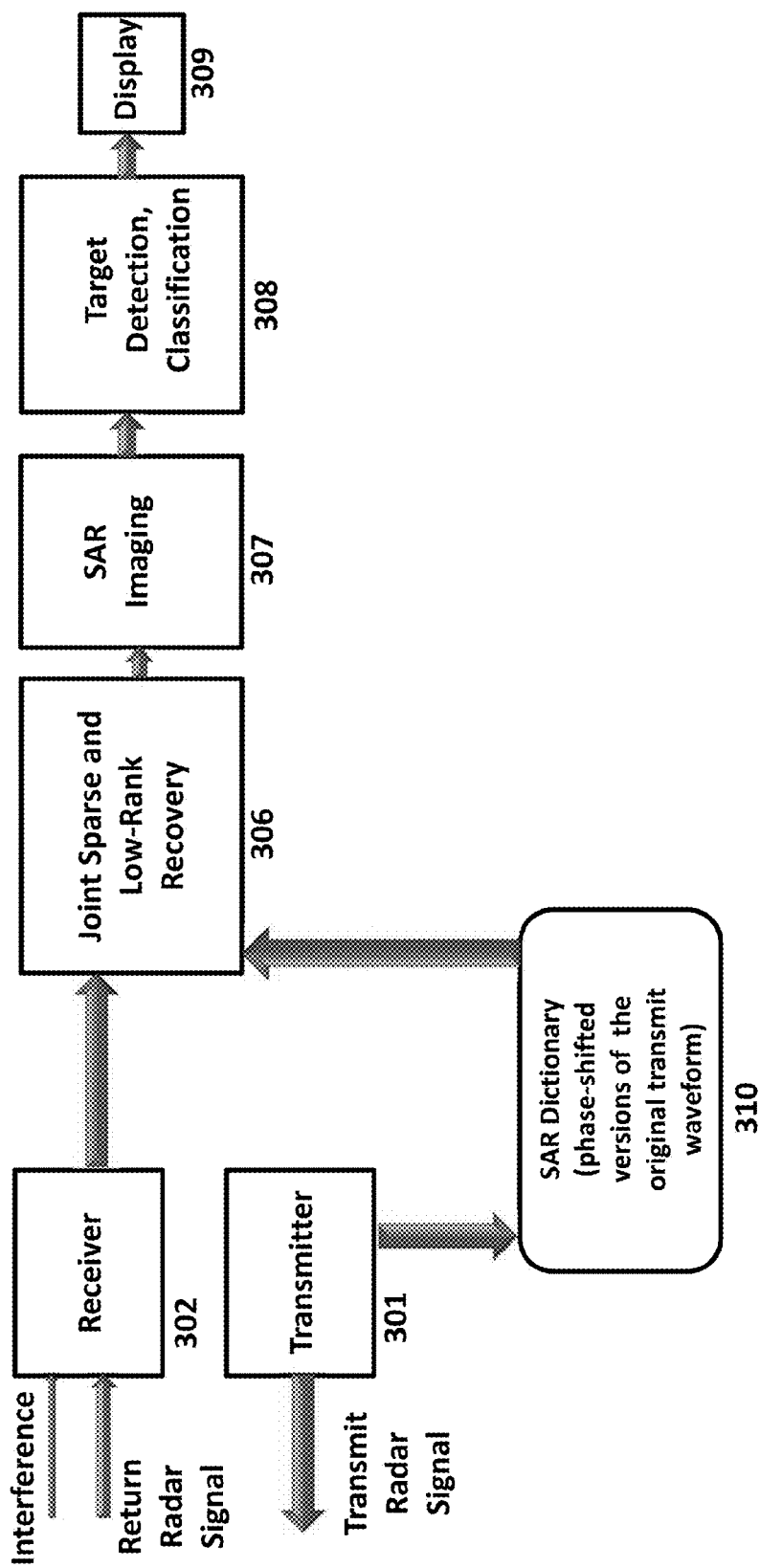

FIG. 14 is an illustration of an alternate preferred embodiment in which at each pulse repetition interval (PRI), the radar transmitter (301) transmits radar signals to illuminate the area of interest and receives return radar signals that correspond to the physical objects from the area. The receiver (302) receives the return radar signals that are severely contaminated by many interference sources (radio, TV, cellular phone, communications systems, etc.). The signal recovery processor (306) estimates, separates, and extracts the noise signal components via a separation process where the RFI is modeled as low-rank components while SAR signals are treated as sparse outliers embedded on top. The extracted RFI components are then subtracted out of the raw received signals to generate clean radar signals. For a typical communications system, the output signals would be processed by a detector. In the preferred embodiment configuration depicted in FIG. 14, it is assumed that one now has knowledge of the SAR transmitter and the transmitted waveforms. In this case, a SAR dictionary (304) consisting of phase-shifted versions of the transmitted waveforms can be constructed as in our previous inventions of U.S. Pat. No. 9,172,476 and U.S. patent application Ser. No. 14/452,902, filed Aug. 6, 2014, now U.S. Pat. No. 9,363,024. This SAR dictionary now replaces the impulsive dictionary (103) in the previous configuration. Here, w-e still model the RFI components as low-rank whereas the sparse SAR components are now captured with sparsifying dictionary as discussed in Section 2.1. Again, we do not need to have any knowledge of RFI whatsoever in this configuration of the invention. Correspondingly numbered elements and features in FIG. 14 are the same as described in FIG. 13.

Figure 15:
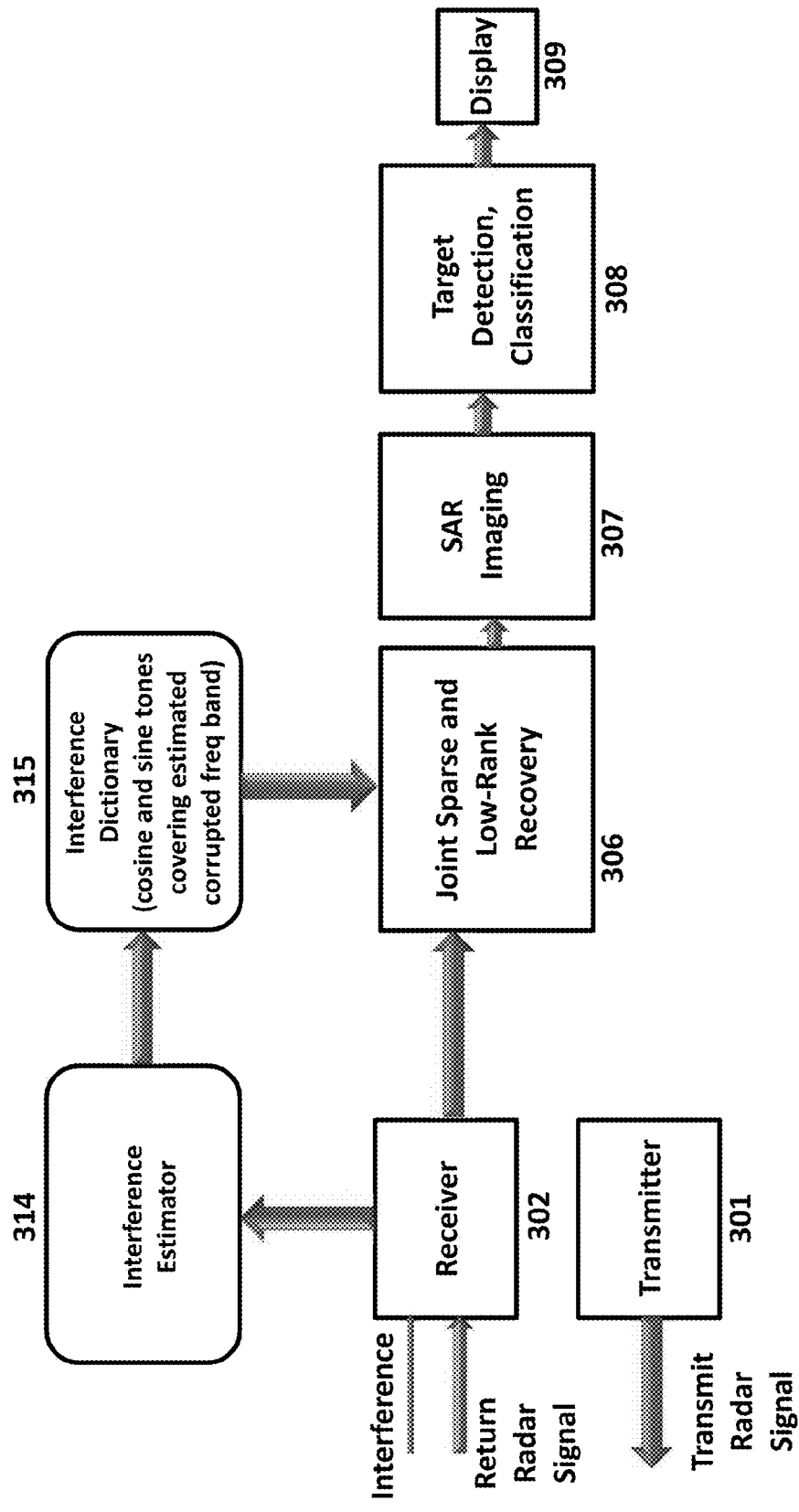

An alternative preferred embodiment configuration is illustrated in FIG. 15 FIG. 15 illustrates at each pulse repetition interval (PRI), the radar transmitter (301) transmits radar signals to illuminate the area of interest and receives return radar signals that correspond to the physical objects from the area. The receiver (302) receives the return radar signals that are severely contaminated by many interference sources (radio, TV, cellular phone, communications systems, etc.). A key to the present invention is the joint sparse and low-rank signal recovery processor (306). The signal recovery processor (306) estimates, separates, and extracts the noise signal components via a separation process where the RFI is modeled as low-rank components while SAR signals are treated as sparse outliers embedded on top. The extracted RFI components are then subtracted out of the raw received signals to generate clean radar signals. For a typical communications system, the output signals would be processed by a detector. In the embodiment illustrated in FIG. 15, the RFI components are modeled as sparse with respect to a dictionary (315) constructed from the interference estimator (314) as described in our previous invention, U.S. patent application Ser. No. 14/452,902.]. The SAR components here are then modeled as low-rank. In this configuration, the processor does not need to estimate the corrupted RFI frequency bands from the observed signals captured by the receiver (302). Correspondingly numbered elements and features in FIG. 15 are the same as described in FIGS. 13 and 14.

Figure 16:
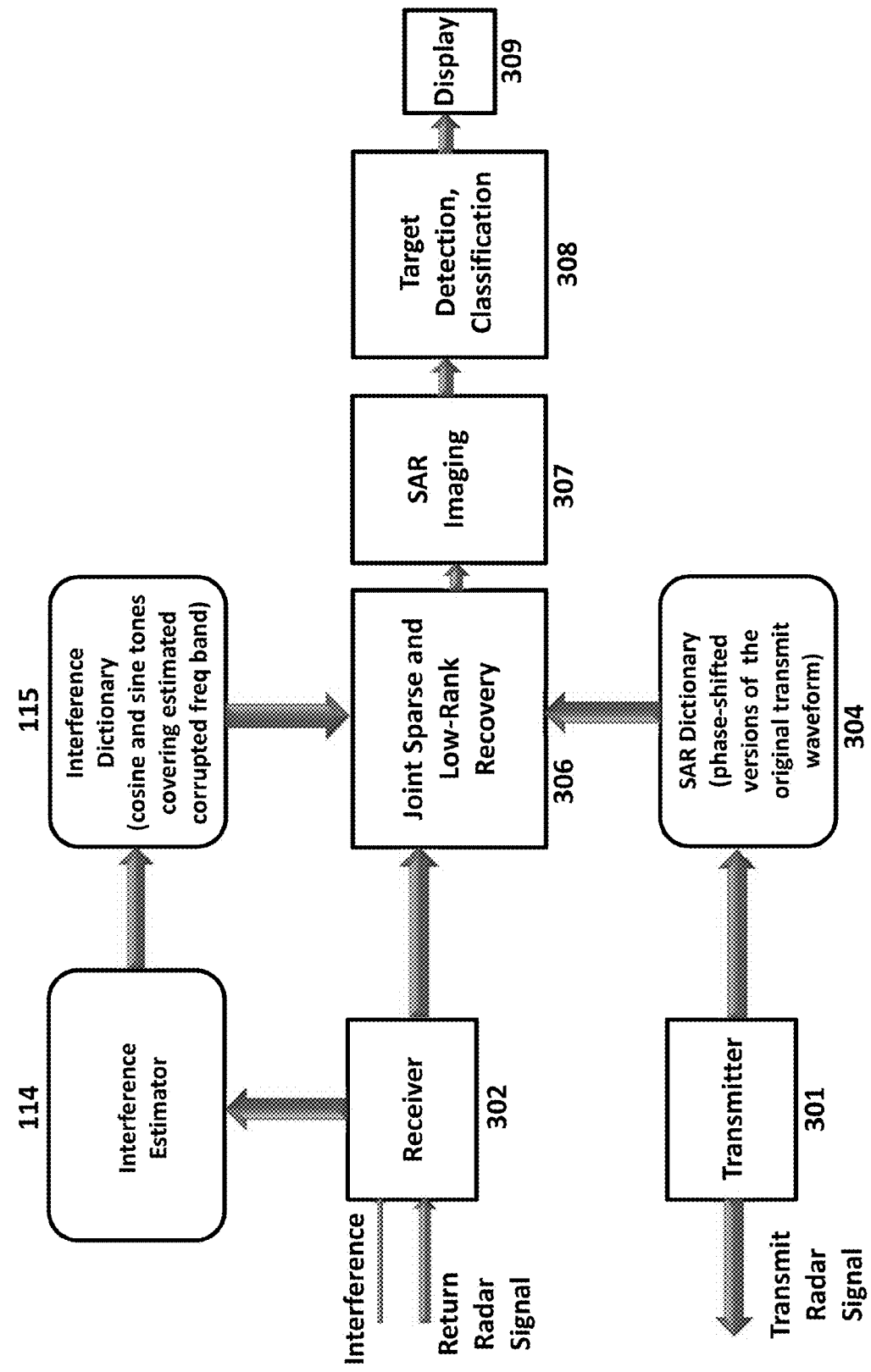

FIG. 16 illustrates an alternate preferred embodiment configuration comprising at each pulse repetition interval (PRI), the radar transmitter (301) transmits radar signals to illuminate the area of interest and receives return radar signals that correspond to the physical objects from the area. The receiver (302) receives the return radar signals that are severely contaminated by many interference sources (radio, TV, cellular phone, communications systems, etc.). A key to the present invention is the joint sparse and low-rank signal recovery processor (306) which employs a single dictionary of impulses (303), i.e., the identity matrix. In this simplest configuration, the RFI is extracted from the observed signals almost completely blind: one does not need to sniff the RFI; in fact, there is no need to estimate the RFI as well as to assume any knowledge of the SAR transmitter. The only assumption here is that RFI signals consist of frequency tones whereas SAR signals are impulsive. The signal recovery processor (306) estimates, separates, and extracts the noise signal components via a separation process where the RFI is modeled as low-rank components while SAR signals are treated as sparse outliers embedded on top. The extracted RFI components are then subtracted out of the raw received signals to generate clean radar signals. For a typical communications system, the output signals may, for example, e processed by a detector. In the alternate preferred embodiment configuration shown in FIG. 16, an assumption is made to have partial knowledge of both RFI components in the past as well as transmitted waveforms from the SAR transmitters. In this case, two sparsifying dictionaries can be constructed: the RFI dictionary (115) from cosine and sine tones as estimated by the interference estimator (114) and the SAR dictionary (104) from knowledge of the transmitted waveforms. Here, both SAR and RFI sources are modeled as sparse components; however, new recent changes in the RFI spectrum (that was not captured accurately by the interference estimator) are modeled as low-rank components. This configuration is designed to account for the non-stationary time-varying RFI noise sources. Correspondingly numbered elements and features in FIG. 15 are the same as described in FIGS. 13 and 14.

The invented technique separates the noise signals from radar signals via simultaneous low-rank and sparse recovery (106). This technique directly estimates and subtracts noise signals from the contaminated radar signals. Therefore, it does not suffer from high sidelobe and reduced target-amplitude effects as in existing notch-filtering approaches. Additionally, the technique is completely adaptive with the changing environment and does not assume any knowledge (amplitude, frequency band, modulation scheme, how many interference sources are present, etc.) of the interference sources. The proposed technique is based on a sparse recovery approach that simultaneously solves for (i) radar signals embedded in noise with large amplitudes and (ii) interference noise signals. In one of our configuration, the matrix representing interference signals is modeled as low-rank whereas the SAR signals are modeled as sparse. Alternatively, the roles can be reversed: SAR as low-rank and RFI as sparse. Finally, any changes can be modeled in the RFI over time as a low-rank component. This way, any inaccuracy in the RFI estimation can be accounted for and this new feature will improve the quality of the final extraction process.

RFI Extraction and Suppression Via Simultaneous Sparse and Low-Rank Recovery (SSLR)

Figure 17:
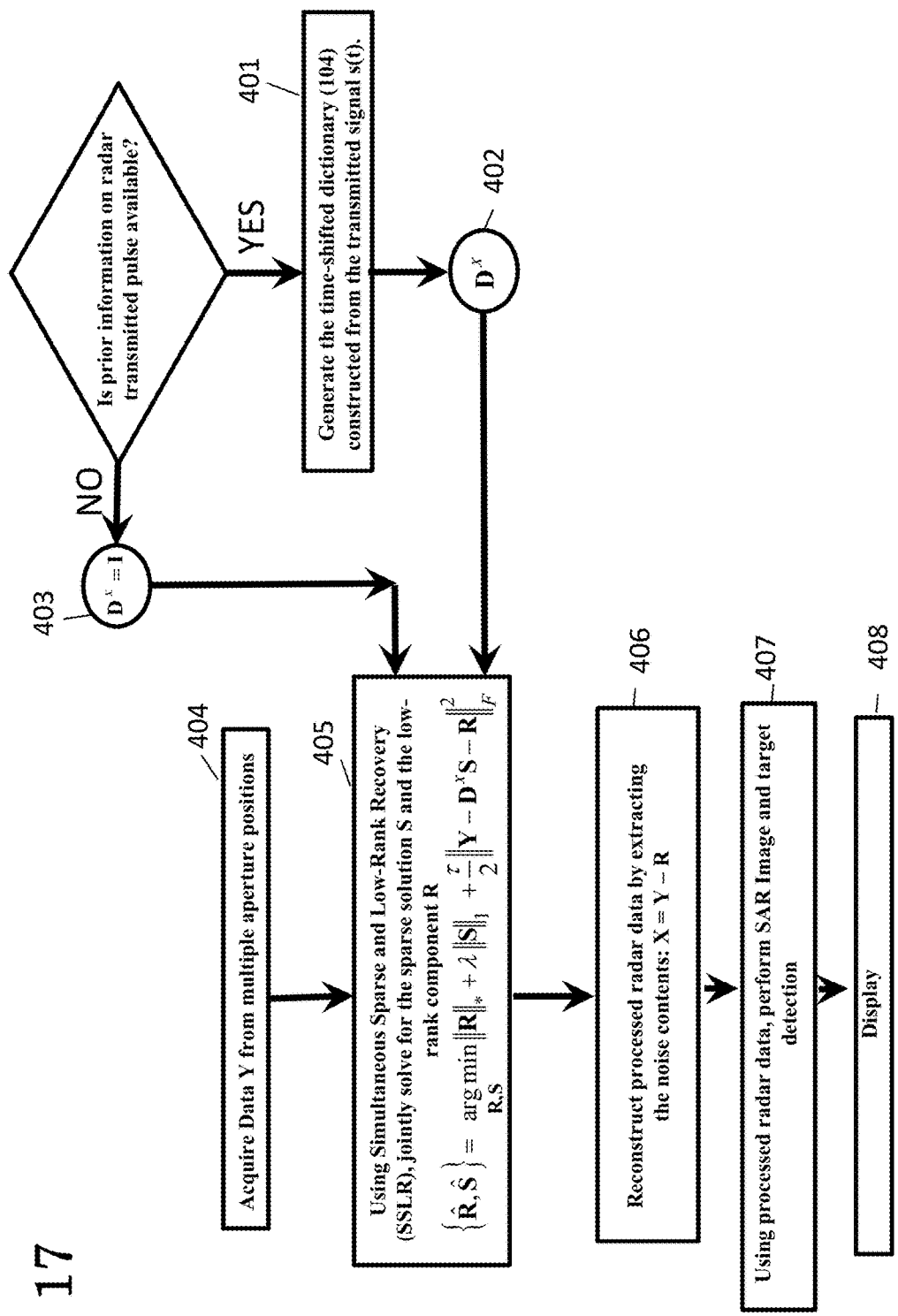
FIG. 17 depicts the overall flow-chart of the noise-source separation algorithm in the present invention.
Figure 18:
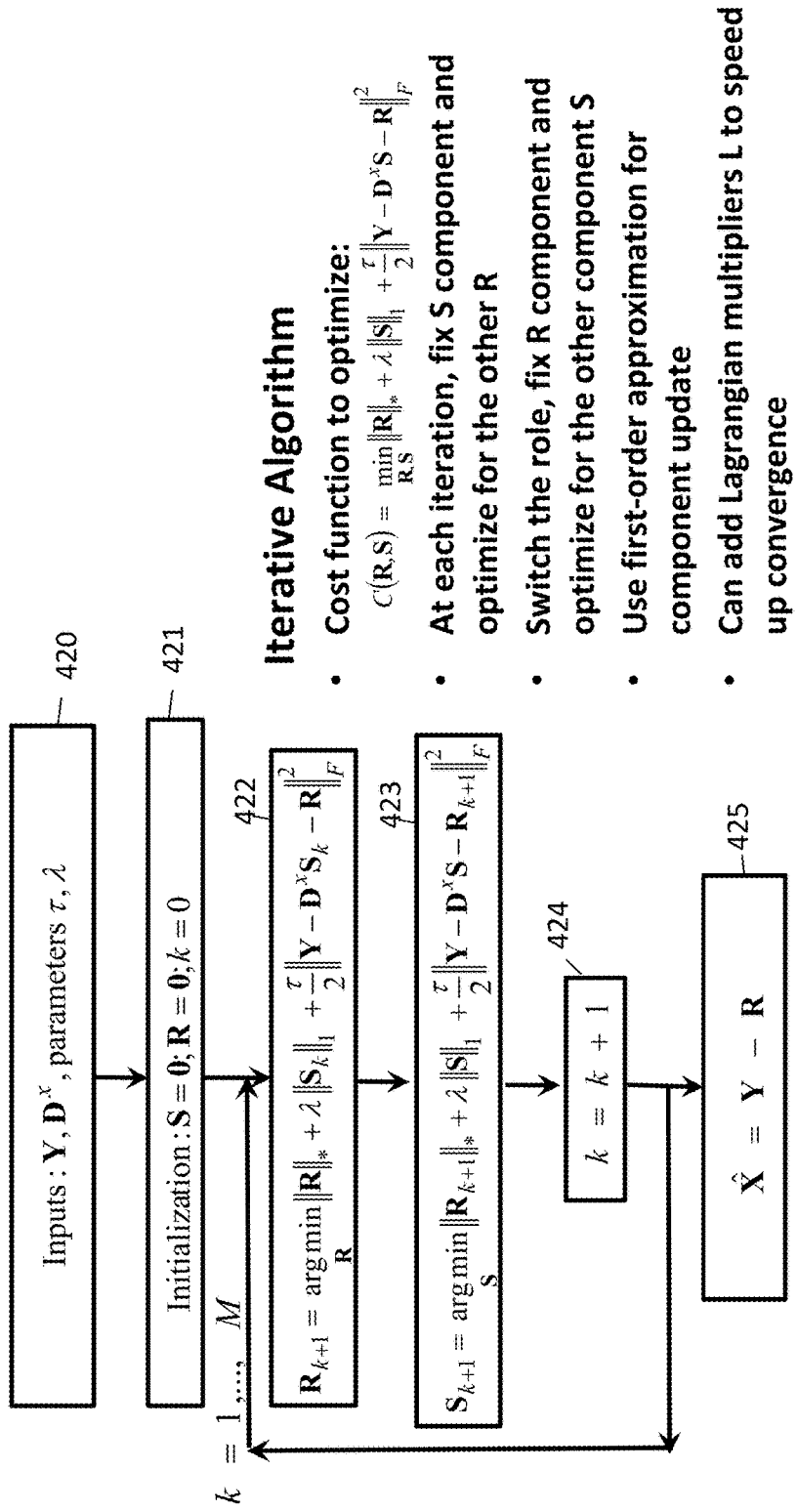
FIG. 18 illustrates in block diagram the iterative simultaneous sparse and low-rank recovery (SSLR) algorithm in the current invention.
Figure 19A:
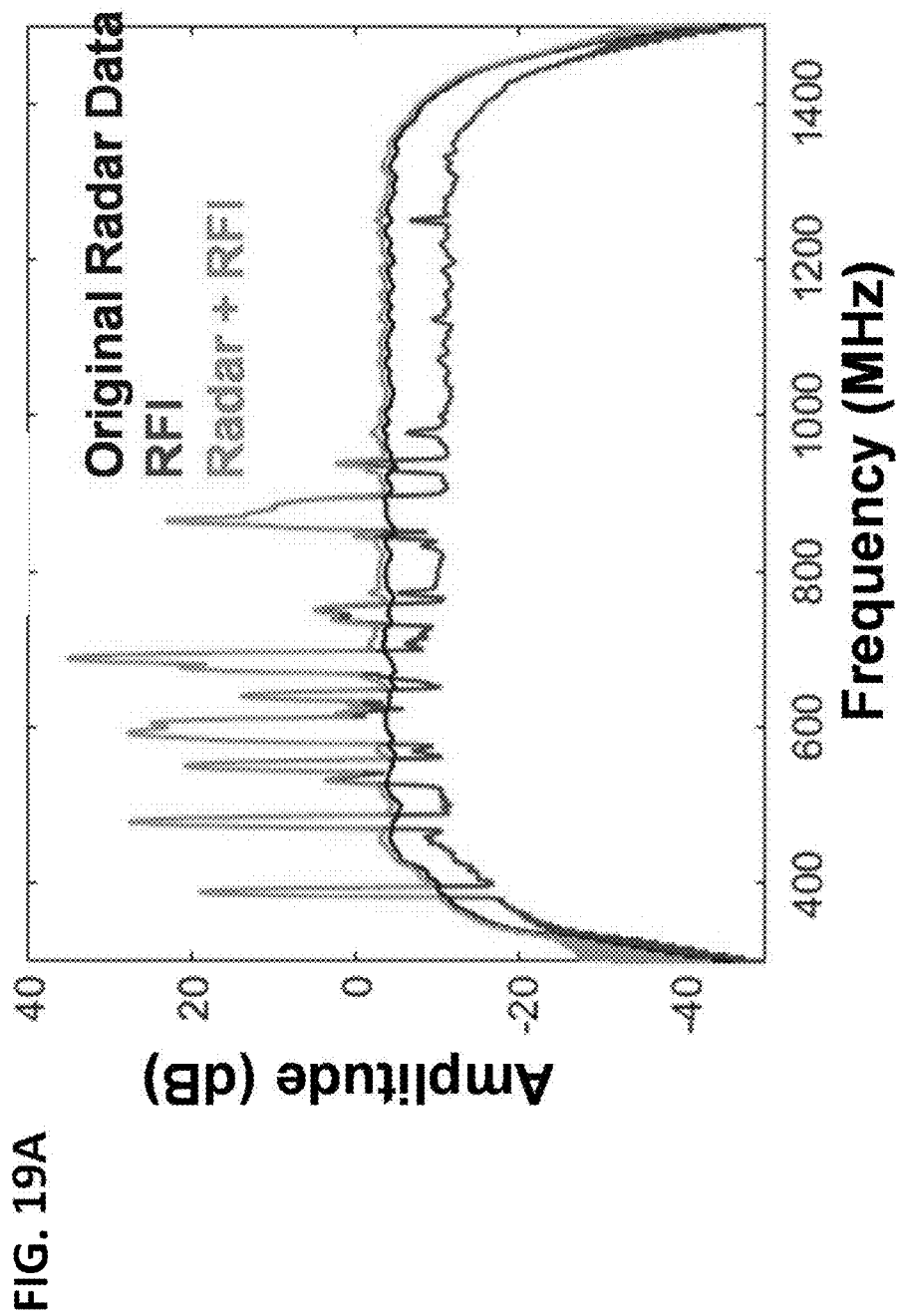
FIGS. 19A-G show the results from the simulated radar data set that has been injected with the measured RFI data. The radar data to RFI energy ratio in this case is −20 dB.
Figure 19B:
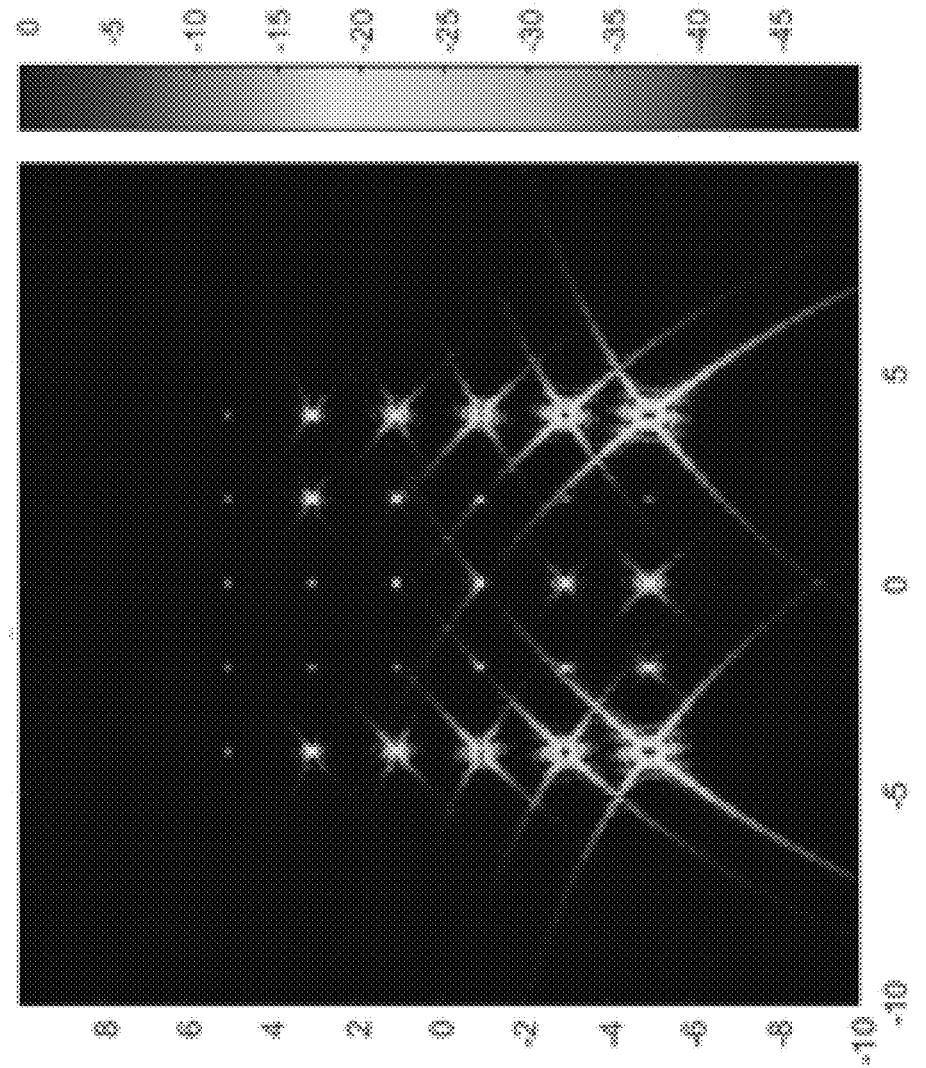
Figure 19C:
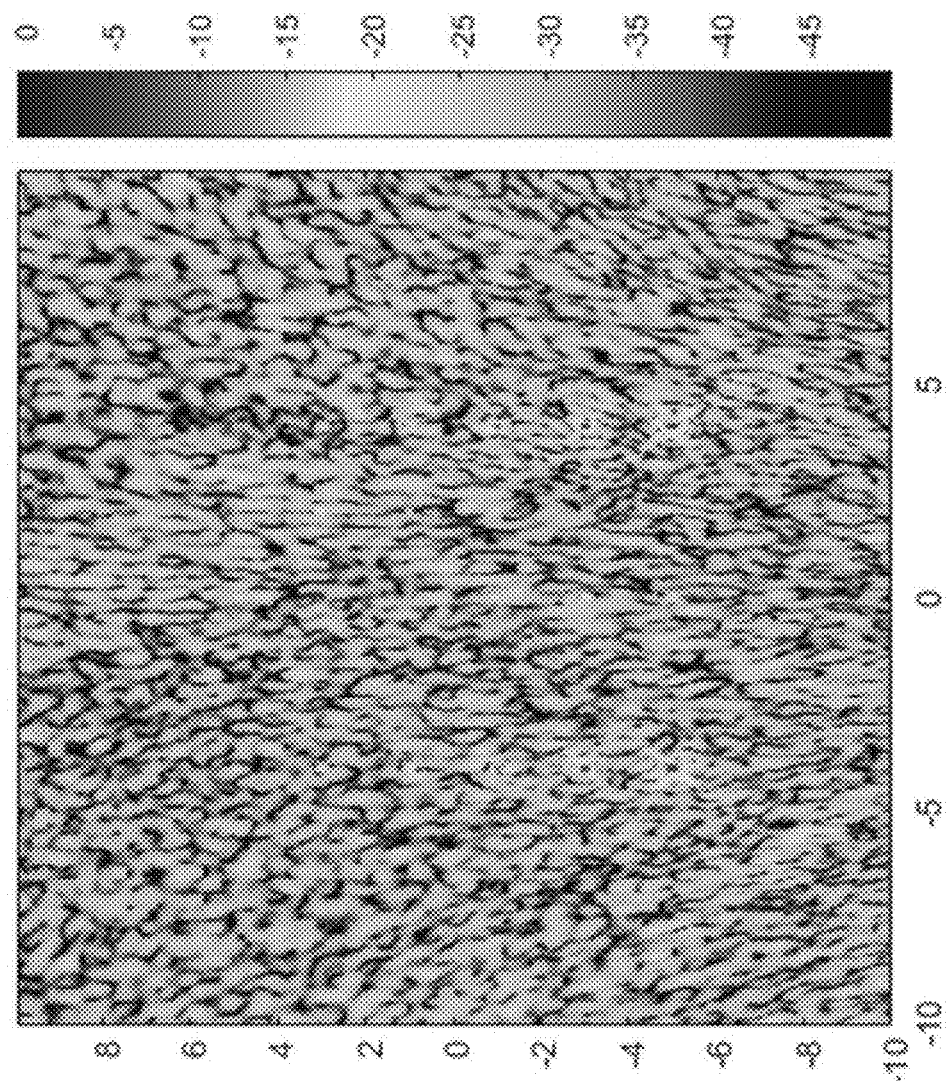
Figure 19D:
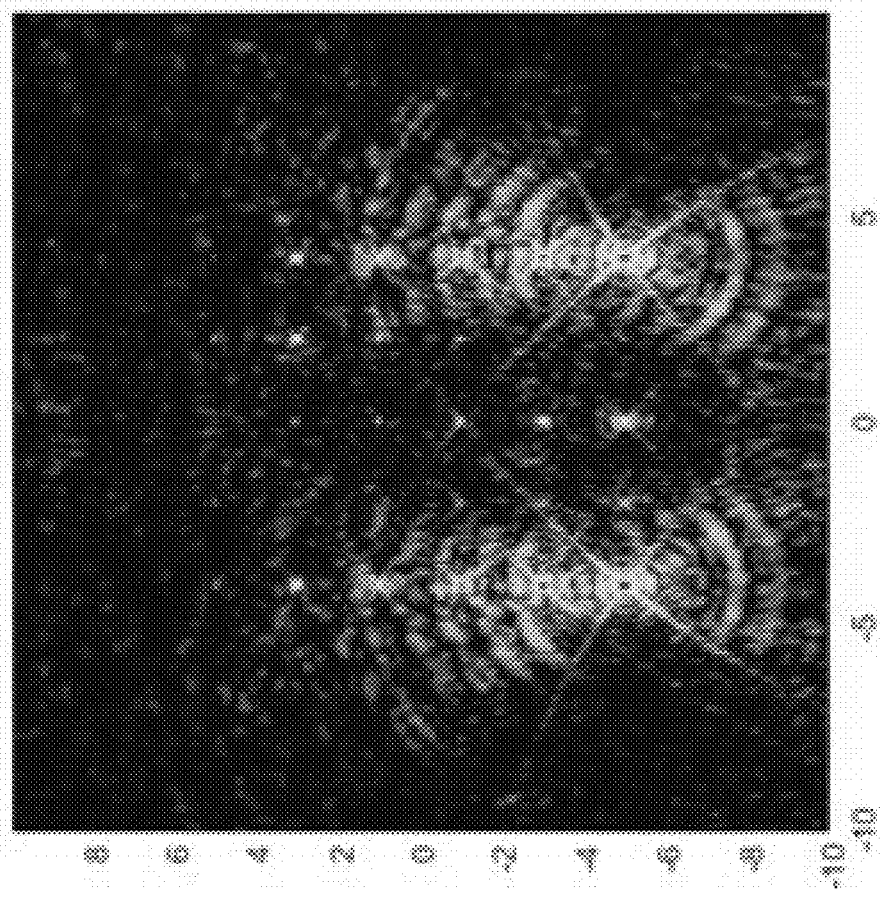
Figure 19E:
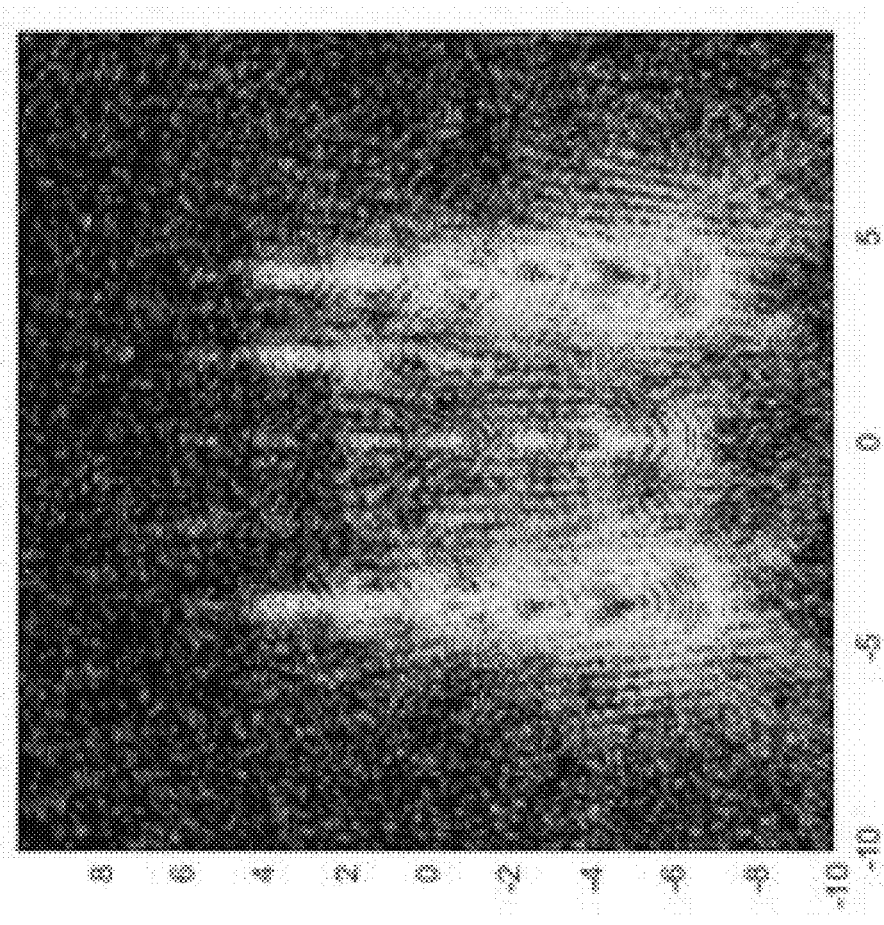
Figure 19F:
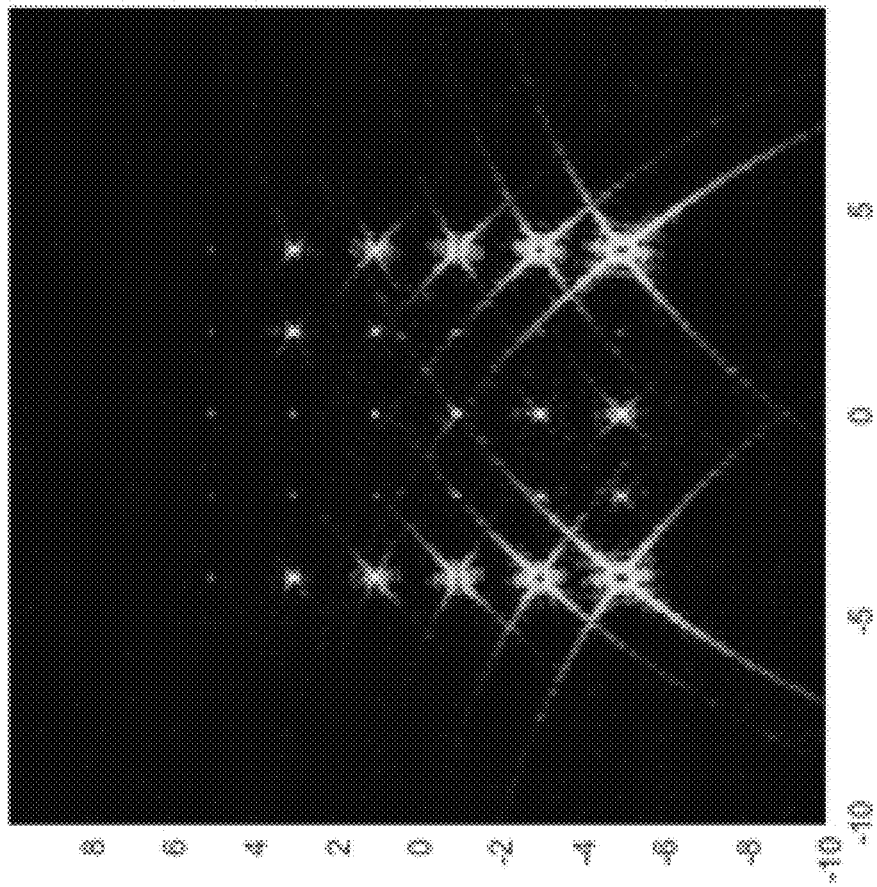
Figure 19G:
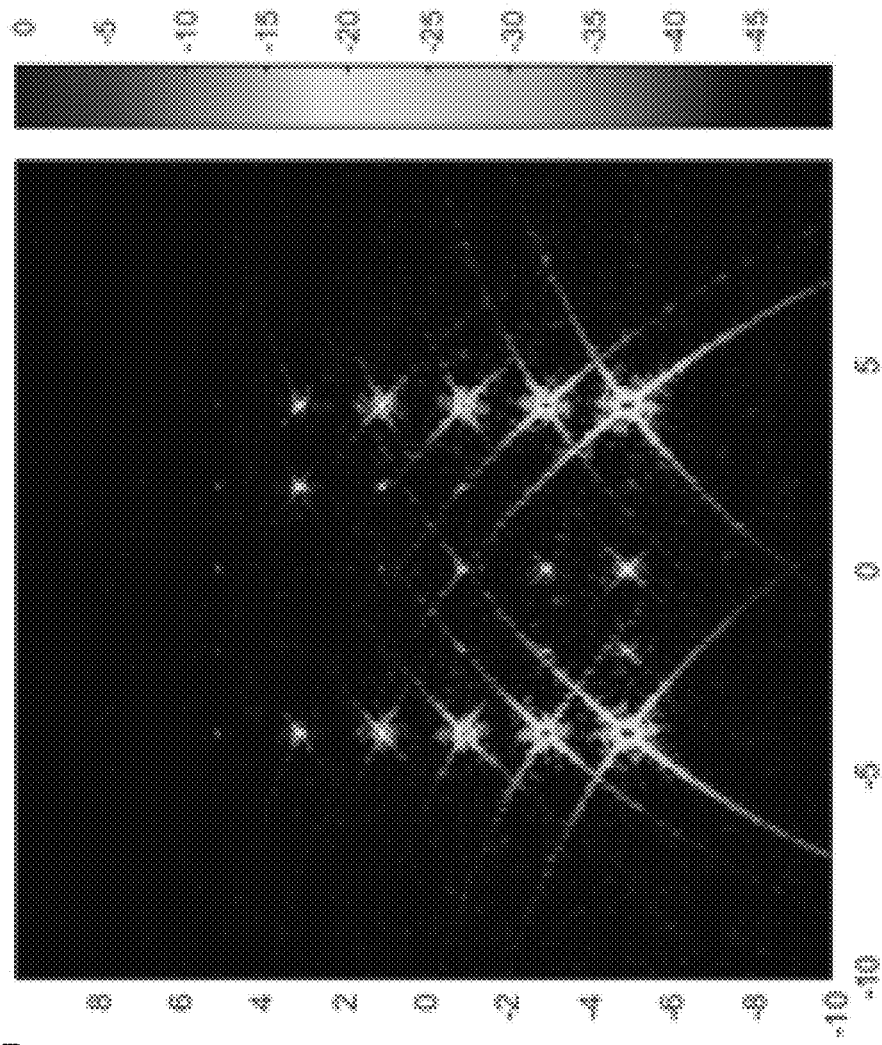
Figure 20A:
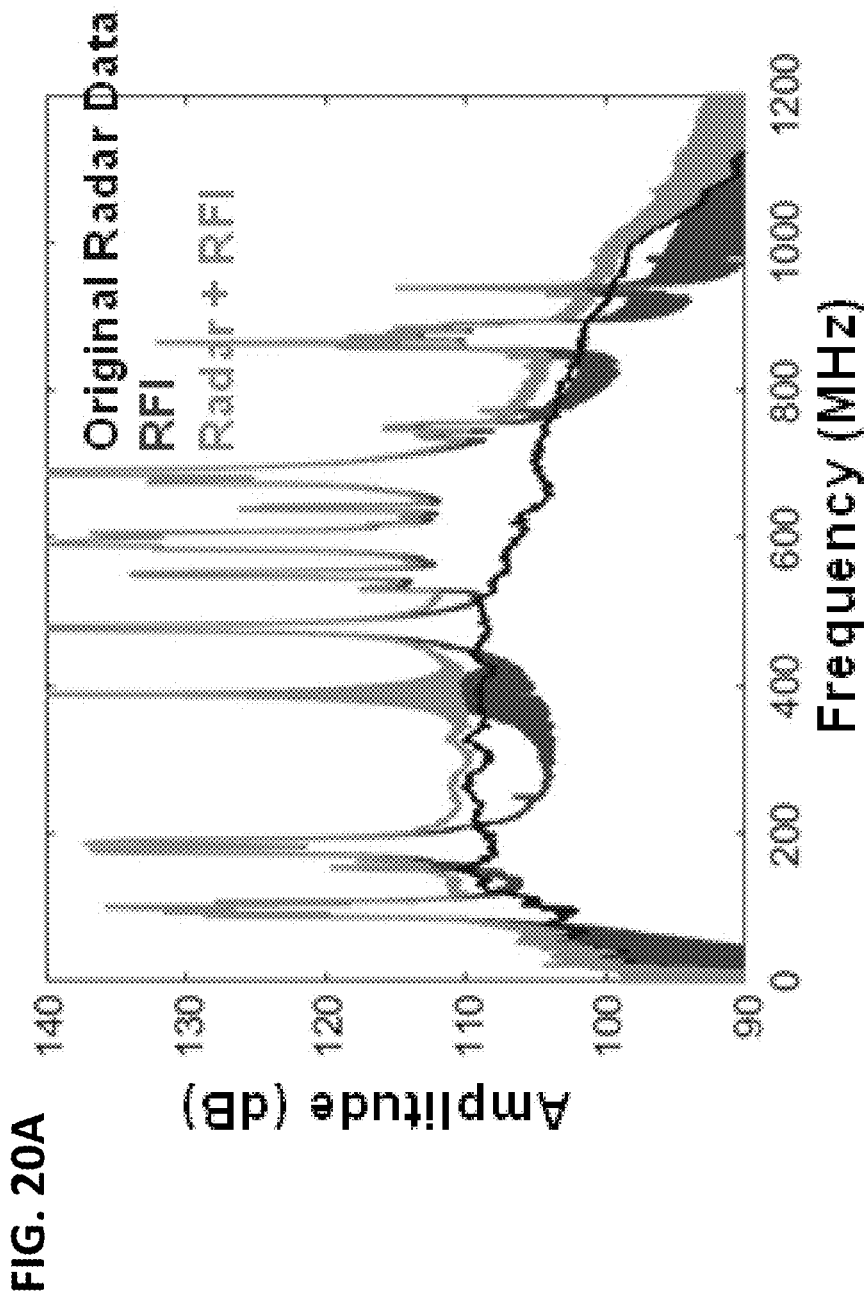
FIG. 20A shows the RFI suppression performance using data from the ARL side-looking UWB BoomSAR radar and real RFI data. The signal to RFI noise ratio in this case is −20 dB.
Figure 20C:
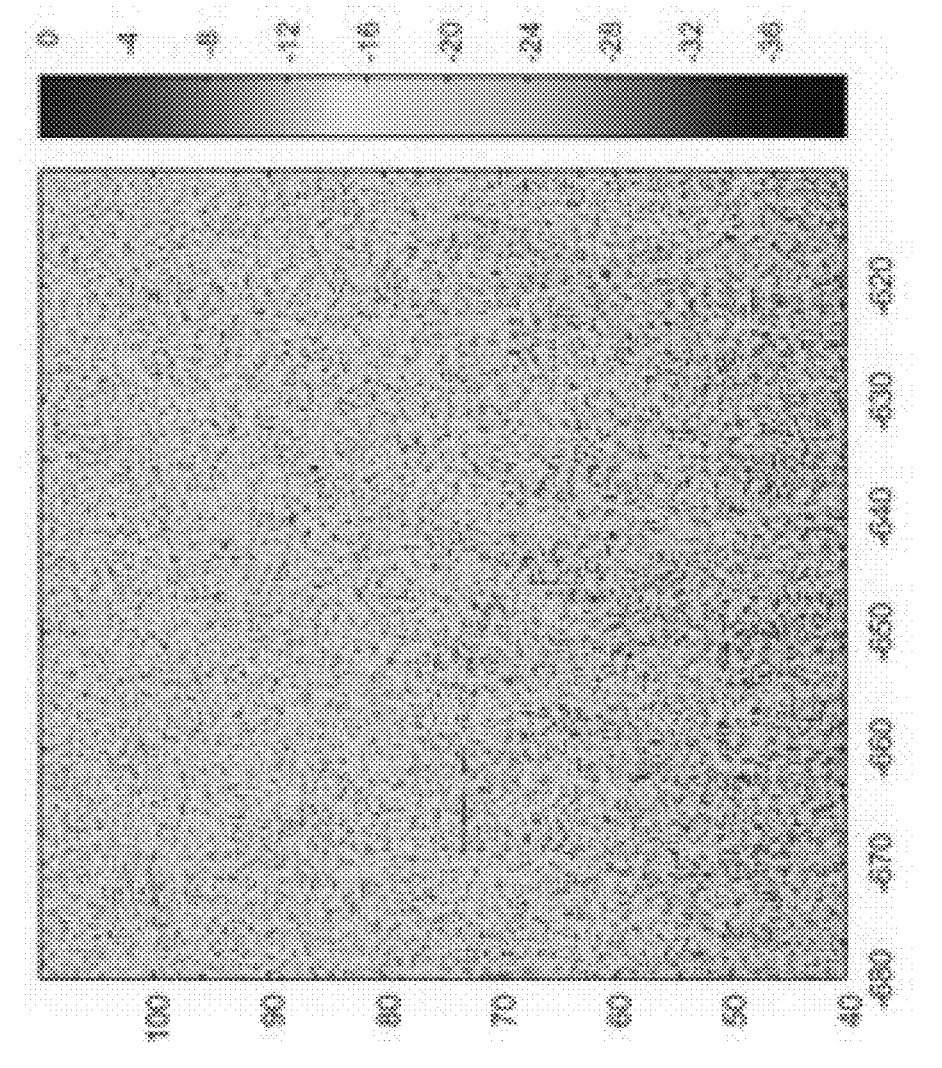
FIG. 20C shows the SAR image formed using the RF contaminated radar data. Only a few largest targets are discernable from the image. The SNR in this case is −14.29 dB.
Figure 20D:
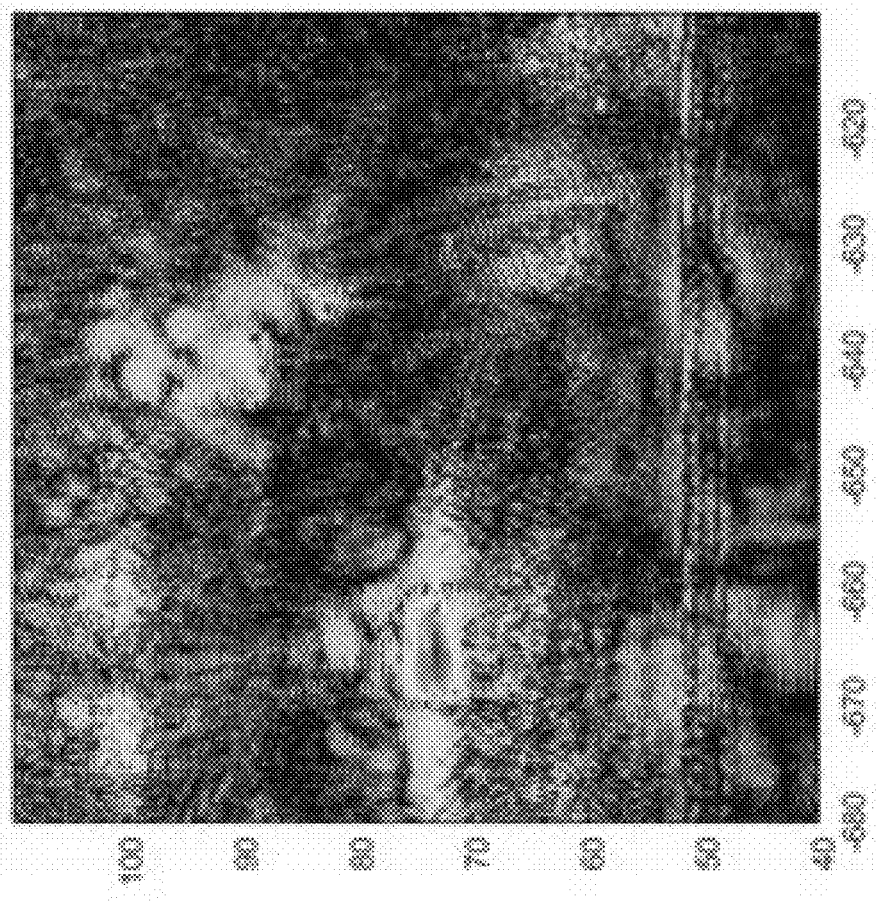
FIG. 20D shows the resulting SAR image using the notch filtering technique for RFI suppression. This SAR image suffers from the severe side-lobes of the larger RCS targets due to the spectral gaps introduced by the notch filter. The processing gain in this case is 10.67 dB while the SNR is −3.62 dB.
Figure 20E:
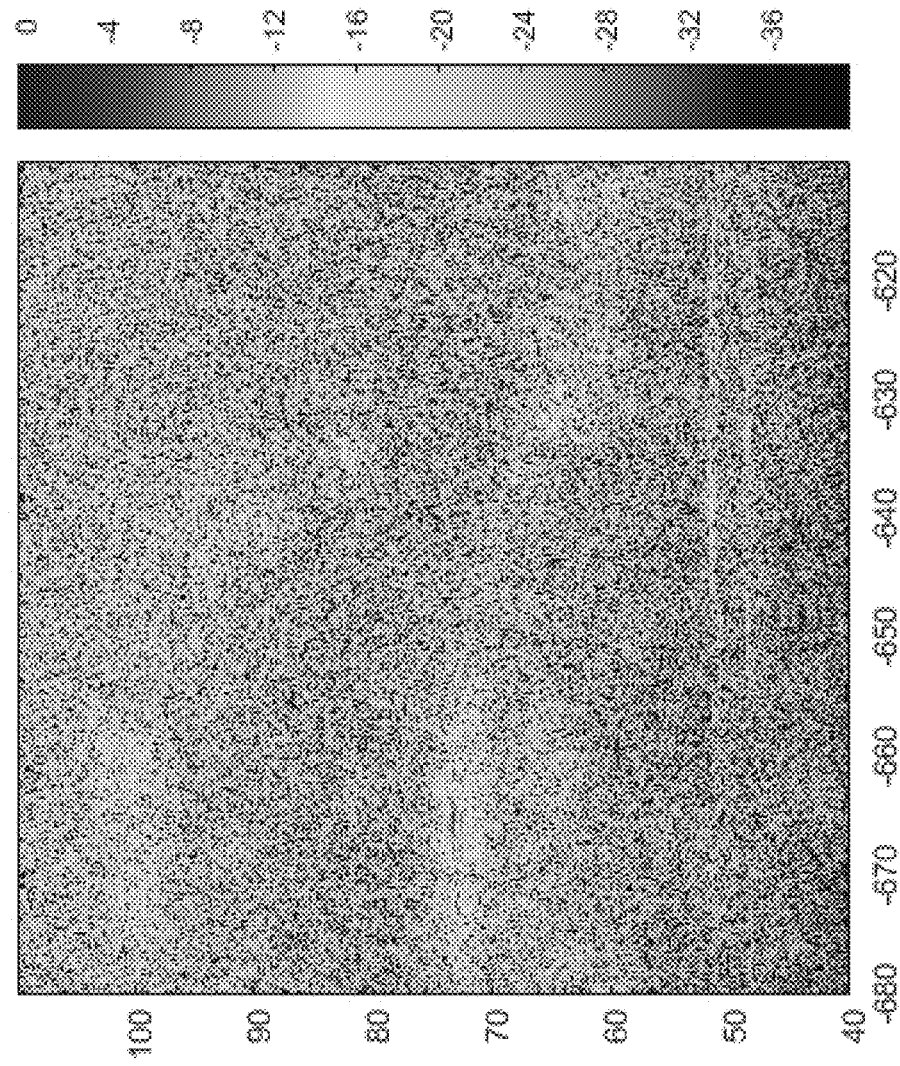
FIG. 20E depicts the SAR image after RFI extraction using the PCA technique which performs poorly. The processing gain is only 5.77 dB.
Figure 20F:
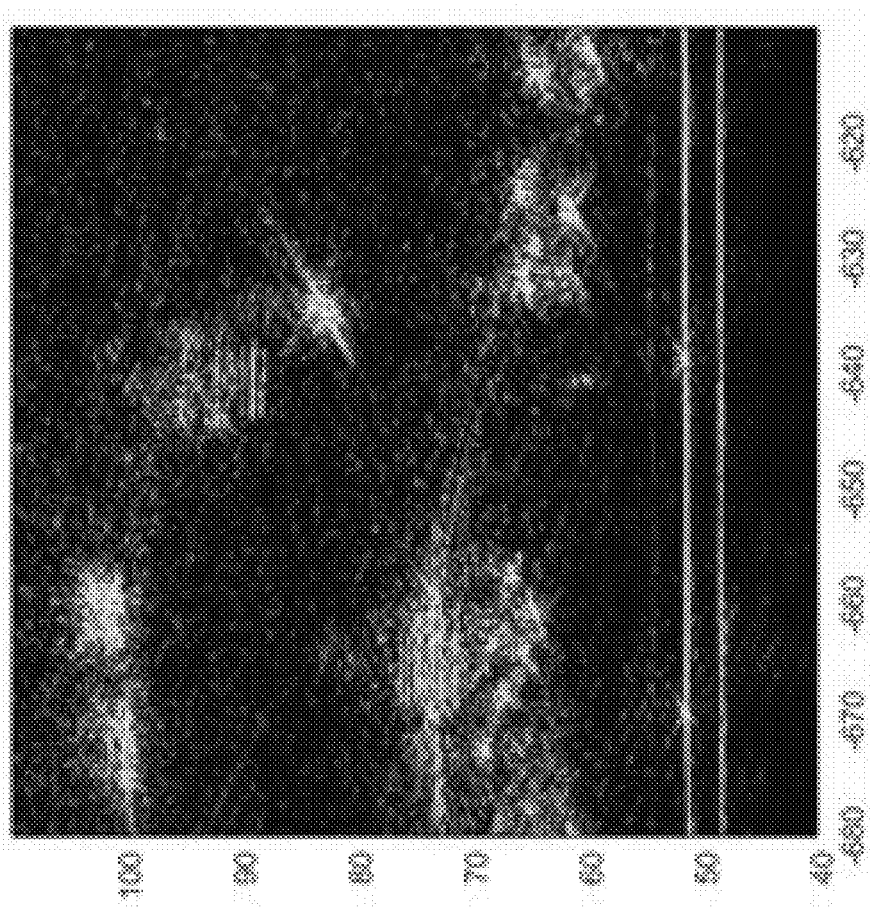
FIG. 20F illustrates the SAR image after RFI extraction using the MSR technique. The processing gain in this case is 19.45 dB.
Figure 20G:
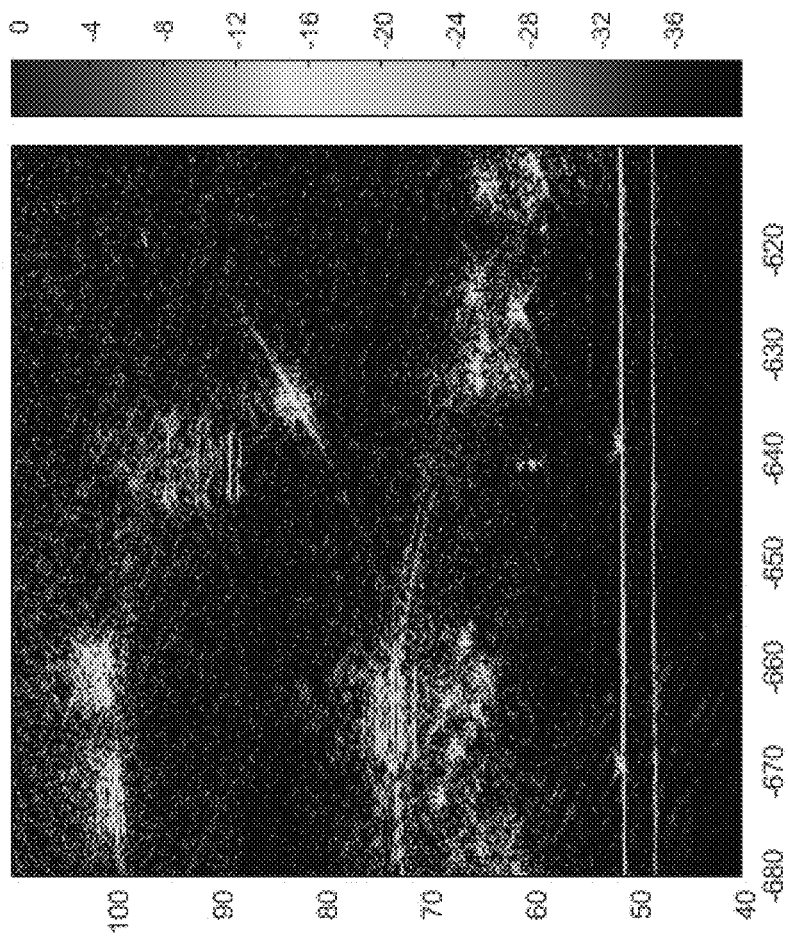
FIG. 20G shows the SAR image after RFI extraction using the Low-Rank and Sparse Recovery technique. The processing gain is 20.56 dB

In accordance with the present invention, the observed radar signals Y is modeled as follows: Y=X+R+W where each column $y_i$ of the matrix Y is the observed radar signal at aperture i-th. A main goal is to extract as much interference noise in R out as possible. Assuming first that W is small and insignificant, modeling R as a low-rank matrix and X as a sparse matrix leads to the following optimization problem:

$$\{\hat{R}, \hat{X}\} = \underset{R, X}{\operatorname{argmin}} \operatorname{rank}(R) + \lambda \|X\|_0 \text{ subject to } Y = X + R \quad (1)$$

where the rank(.) operator computes the matrix rank of R whereas the $l_0$-norm of the matrix X counts the number of its non-zero entries. In other words, the processor is searching for the lowest-rank matrix R and the sparsest matrix X with respect to the constraint that they add up to our observed matrix Y. The competition between the rank of R and the sparsity of X encourages a clustering behavior, leading to the separation between SAR and RFI components. Since there does not exist an efficient method to solve equation (1), the following convex-relaxation problem is considered instead $$\{\hat{R}, \hat{X}\} = \underset{R,X}{\mathrm{argmin}} \|R\|_* + \lambda \|X\|_1 \text{ subject to } Y = X + R \quad (2)$$

where $\|R\|_*$ is the nuclear norm of R (approximating its rank) while $\|X\|_1$ is the $C_1$ entry norm of X (approximating its sparsity level) and the $\lambda$ parameter controls the trade-off between the two components. This problem is commonly known in the mathematics community as Robust Principal Component Analysis (RPCA. A fast modified implementation solver based on Augmented Lagrange Multiplier Method (ALM) is employed as follows:

$$\{\hat{R}, \hat{S}\} = \underset{R,S}{\mathrm{argmin}} \|R\|_* + \lambda \|S\|_1 + \frac{\tau}{2} \|Y - D^x S - R\|_F^2 \quad (3)$$

where we have made a few modifications: (i) the sparse SAR component is modeled as X=D$^x$S (this way, if knowledge of the transmitted waveform is not available, the sparsifying dictionary can be set to D$^x$=I); (ii) the last term enforces data observation consistency: one can think of it as minimizing the small random noise component W; (iii) the two parameters ($\kappa$, $\tau$) offer tuning capability to trade-off between low-rank, sparsity, and data consistency. The resulting noise-suppressed signal can also be computed as $\hat{X}=Y-\hat{R}$. A group of data record can be recovered jointly as long as the number of records is large enough for the low-rank property to hold. All recovered SAR signals are then supplied to the image processor (107) to produce the final SAR image. FIG. 17 summarizes the entire process for this invention whereas FIG. 8 provides the algorithmic description of the SSLR process.

Results

A preferred embodiment of the RFI noise extraction technique was tested and evaluated using the data from the U.S Army Research Laboratory (ARL) UWB low-frequency SAR that transmits radar signals occupying the frequency spectrum that span approximately from 50 to 1150 MHz. Interference noise data were collected from the real environment with the antenna pointing toward Washington, D.C., where a typical snapshot of the frequency spectrum is shown in FIG. 12. The experiments are conducted on two data sets: an UWB step-frequency simulated data set and a real impulse-based UWB BoomSAR data set collected from the ARL radar.

The simulated SAR data set utilized spanned a frequency spectrum from 300 to 1500 MHz. The simulated data are generated using a monostatic, side-looking, step-frequency SAR setting with 1200 aperture positions along a linear aperture, imaging a scene with around 30 point targets of various amplitudes located in a uniform rectangular array. Although this simulated data set represents a simple scenario, it is a challenging data set for the detection of small radar-cross-section (RCS) targets in a congested RF environment. The targets in the scene spanned a dynamic range of 35 dB. Thus, in order to detect targets with smaller RCS, the residual noise from a prospective algorithm must be much lower than the amplitudes of these targets.

The real UWB low-frequency BoomSAR data set was collected from ARL's UWB low-frequency SAR, which transmits impulse radar signals that generate a wide instantaneous bandwidth that spans approximately from 50 to 1150 MHz. The UWB BoomSAR is mounted on a platform that emulates the airborne geometry. The collected data set used in this experiment is configured in horizontal transmit, horizontal receive (HH) polarization.

For both simulated and real radar data sets, the RFI data measured from the real environment was injected with the antenna pointing toward Washington D.C. This RFI data represent a typical urban RF environment with many digital TV and communications signals. The radar data that was contaminated with the measured RFI data was applied to various RFI mitigation algorithms: (i) notch filtering; (ii) PCA [21]-[23]; (iii) the previous invention based on model-based sparse recovery (MSR) as described in U.S. Pat. No. 9,363,024; and (iv) a preferred embodiment of this invention—SLSR algorithm. None of the algorithms has any information about either the radar data or the RFI data.

FIG. 19 shows the results from the simulated radar data set that has been injected with the measured RFI data. The radar data to RFI energy ratio in this case is −20 dB. FIG. 19A shows the spectral contents of the original data, the RFI data, and the RFI contaminated radar data. FIG. 19B shows the SAR image of the simulation scene without noise. All targets, including the smallest RCS targets, show up clearly in the SAR image. FIG. 19C shows the SAR image formed using the RF contaminated radar data. Only a few largest targets are discernable from the image. FIG. 19D shows the resulting SAR image using the notch filtering technique for RFI suppression. This SAR image suffers from the severe side-lobes of the larger RCS targets due to the spectral gaps introduced by the notch filter. The processing gain in this case is 11.26 dB. FIG. 19E shows the resulting SAR image using the PCA technique, which performs poorly on this data set. The processing gain is −4.16 dB. FIG. 19F shows the resulting SAR image using our previous MSR technique. All targets, including the smallest RCS targets, are discernable. The processing gain is 22.83 dB. Finally, FIG. 19G shows the resulting SAR image using the proposed SLS technique. The processing gain for SLSR is 19.68 dB, which is approximately 3 dB lower than that of the MSR technique. The superior performance of MSR is expected since it can model a perfect SAR dictionary based on the radar impulse response in this simulation case, while the proposed SLSR algorithm does not incorporate any information.

FIG. 20 depicts the results from the real radar data set. The radar data to RFI energy ratio in this case is −20 dB. FIG. 20A compares the spectral contents of the original data, the RFI data, and the RFI contaminated radar data. FIGS. 20B and 20C show the SAR images formed using the original data and the RF contaminated data, respectively. Similar to the simulation case, FIG. 20D-0G show the resulting SAR images using the notch filtering, the PCA, the MSR, and SLSR techniques, respectively. The corresponding processing gains are 10.67, 5.77, 19.58, and 20.56 dB, respectively. In contrast to the simulation case, the proposed SLSR performance is even slightly better than that of the MSR technique. This can be explained by the fact that in the case of real data since the true radar impulse response is only approximated by the MSR for the construction of its SAR dictionary, any error in the estimation of the SAR dictionary would result in non-optimal performance.

Figure 21A:
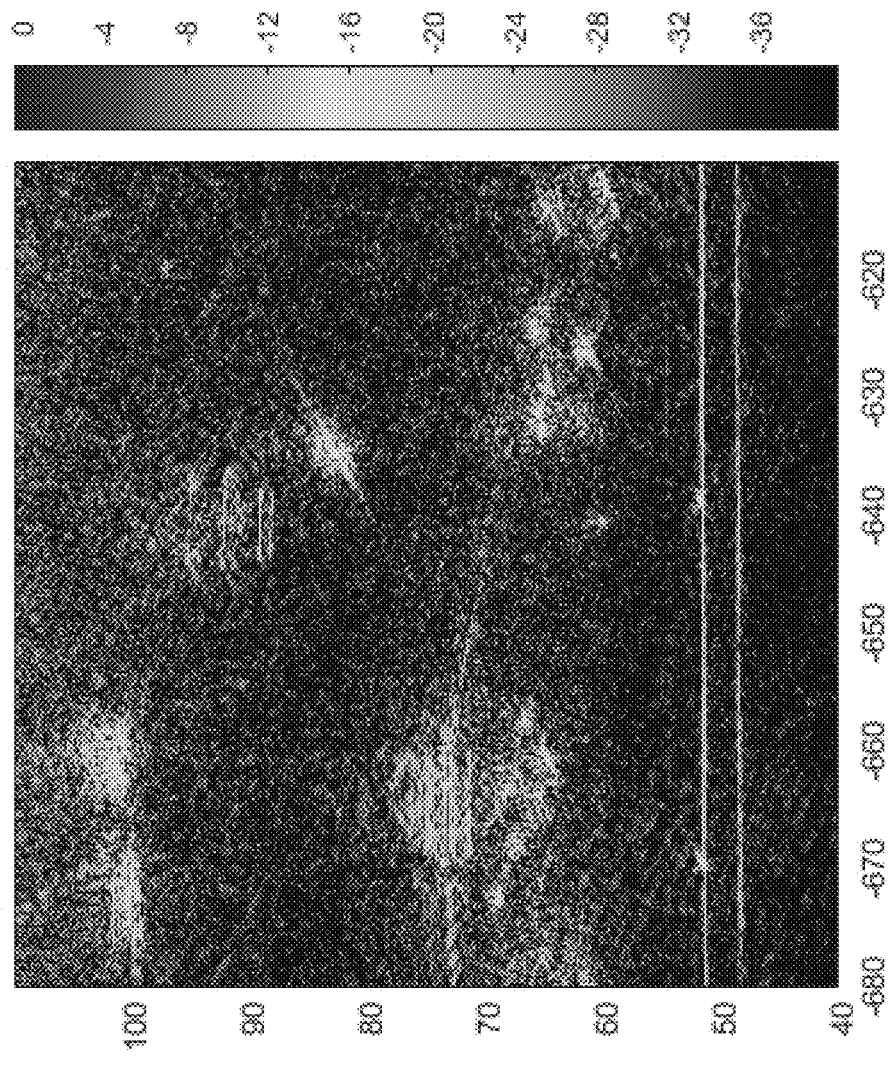
FIG. 21A illustrates a more detailed higher-noise-level SAR image with a small value of λ.
Figure 21B:
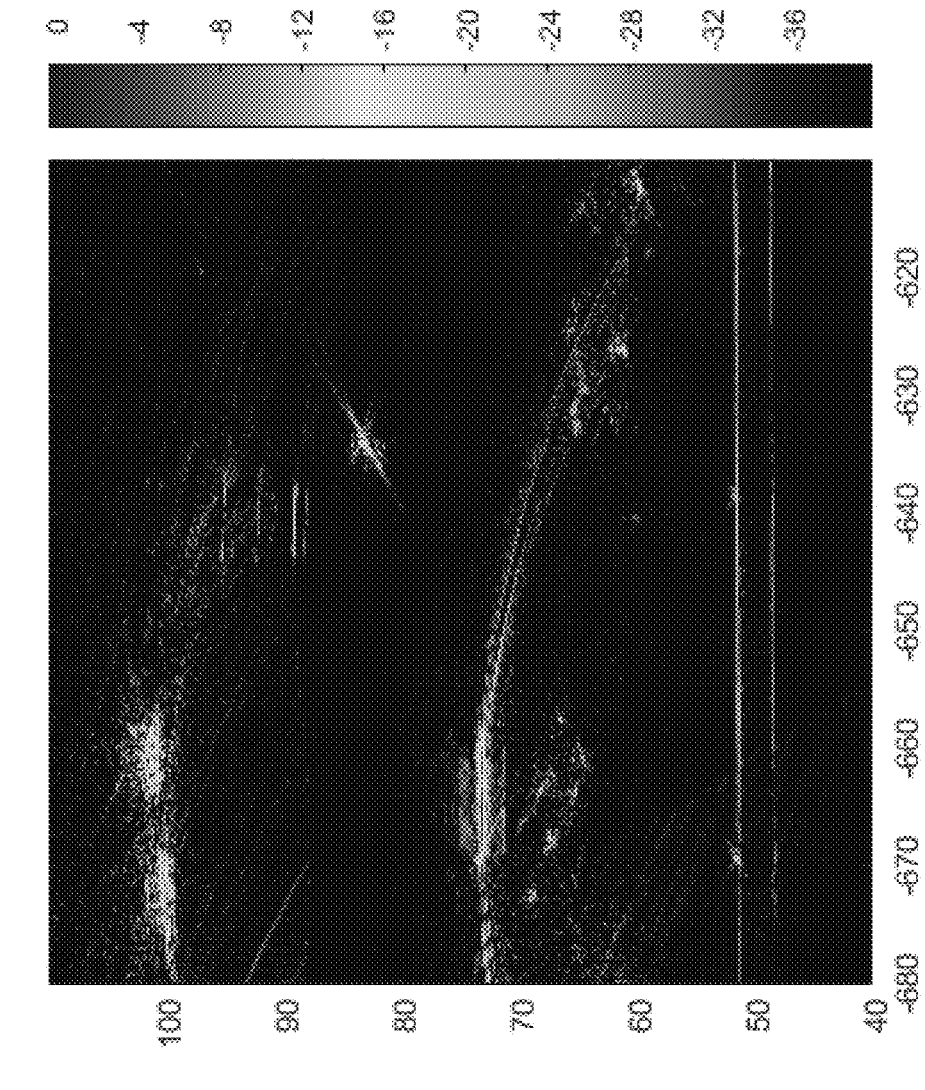
FIG. 21B illustrates a less detailed lower-noise-level SAR image with a high value of λ.

FIG. 21 illustrates another advantage of the SLSR technique that the level of the scene sparsity in the resulting SAR image can be easily adjusted using the parameter $\lambda$ from (1)-(3). A low value of λ would result in a SAR image with more details, while a larger value of λ would result in a much cleaner SAR image with higher contrast. However, smaller features from the scene might not show up in the image when the value of is set too high. In FIG. 21, the value of A is increased from low to high from FIG. 21A-B.

The invented technique directly estimates and subtracts interference noise signals from the radar signals. Therefore, it does not suffer from: (i) high sidelobes, and (ii) reduced target-amplitude effects as in existing notch-filtering approaches. The radar system does not have to monitor or sniff or even estimate the noise signals in the environment. The proposed technique simultaneously solves for (i) the radar signals embedded in interference noise with large amplitudes and (ii) the interference noise signals within one unified sparsity/low-rank-driven optimization framework.

Low-frequency UWB radar and communications systems have played important roles in many applications. Over the past two decades, low-frequency UWB radar systems have been developed to detect difficult targets in various applications such as foliage penetration, ground penetration, and sensing-through-the-wall. These systems must operate in the low-frequency spectrum that spans from under 100 MHz to several GHz in order to penetrate. In addition to the low-frequency requirement for penetration, these systems must also employ wide-bandwidth signals to achieve the desired resolution. Thus, the signal occupies a wide spectrum that is also shared by radio, TV, cellular phone, and other communications systems. To generate high quality radar imagery for detecting difficult targets with low RCS, interference signals from other systems must be suppressed from the received radar signals. In addition, sometimes radar has to operate in the presence of jamming signals. These interference signals are essentially large amplitude noise that often masks the underlying radar signals. Various interference noise suppression techniques have been proposed to date. The simplest approach that has been widely employed in practice involves implementing adaptive notch filters (the notches in the frequency domain correspond to interference noise components) to suppress the energy from interference noise signals. Depending on the nature of the interference noise sources, this notch-filter approach would result in (i) large sidelobes in the time domain of the received signal and (ii) reduced target amplitudes.

The present invention directly addresses the two aforementioned drawbacks of our previous RFI-extraction approaches via either environment sniffing or interference estimation. We invent an alternative joint RFI-estimation-extraction technique and demonstrate that the RFI problem can still be solved almost blindly without any cumbersome/costly effort in collecting the prior RFI information in any shape or form. Our main contributions and novelties in this invention are: (i) we model RFI contamination across multiple apertures with a general low-rank structure; (ii) UWB SAR signals are approximated as sparse impulsive outliers that are added on top of the low-rank RFI signals; (iii) we employ efficient robust PCA decomposition to extract RFI from observations; (iv) alternatively, we can also model RFI as the sparse corruptions (with respect to a frequency-based dictionary) while treating UWB SAR signals as low-rank component; (v) we provide a simple tuning mechanism to control the detailed as well as contrast level of the final SAR image from a parameter employed in the optimization process; and finally (vi) our framework can be easily incorporated into most existing systems as a pre-processing stage prior to other popular signal processing and image formation steps since the proposed technique allows the processing of data records in independent fashion, in parallel, and directly in the raw time domain.

In addition to radar, we believe that the invented noise extraction technique can be applied to any communications systems that suffer from interference noises. Examples of such practical systems and applications include: radars operating in combative environments with frequent enemy jamming; audio recordings with background noise; interference-cancellation for automatic audio-monitoring systems; noise-cancellation pre-processing algorithms for smart phones; noise-cancellation headphones in noisy environments such as airplanes, airports, construction sites, etc.

As used herein "processor" may include but is not limited to a computer, central processing unit (CPU), microprocessor, multiprocessor, main frame computer, personal computer, or laptop computer.

As used herein the terminology "matching pursuit" means a technique for finding the "best matching" projections of multidimensional data onto an over-complete dictionary. As stated in Wikipedia, the basic idea is to represent a signal from Hilbert space as a weighted sum of functions (called atoms) taken from called atoms) taken from D:

$$f(t) = \sum_{n=0}^{+\infty} a_n g_{\gamma_n}(t)$$

where indexes the atoms that have been chosen, and a weighting factor (an amplitude) for each atom. Given a fixed dictionary, matching pursuit will first find the one atom that has the biggest inner product with the signal, then subtract the contribution due to that atom, and repeat the process until the signal is satisfactorily decomposed. By taking an extremely redundant dictionary one can look in it for functions that best match a signal. Finding a representation where most of the coefficients in the sum are close to 0 (sparse representation) is desirable for signal coding and compression.

Although a preferred embodiment of the invention discloses application of this technique for radar applications only, it is within the skill of the art to use the spectral recovery techniques of the present invention to such applications as communications systems, including UWB communication systems. In addition to radar, the invented noise extraction technique may be applied to any communications systems that suffer from interference noises. Examples of such practical systems and applications include: radars operating in combative environments with frequent enemy jamming; audio recordings with background noise; noise-cancellation headphones in noisy environments such as airplanes, airports, construction sites, etc.

As used herein, the terminology "sparsity driven" of "sparsity-driven" is a relative term relating to the finding of a compressible solution which is intended to be treated broadly. For example, a sparse matrix is a matrix with enough zeros that it pays to take advantage of them; commonly interpreted from an economics view point in that if one can save time and memory by exploiting the zeros, then a matrix is sparse. The terminology sparsity refers to the selection of a model, within a hierarchy of model classes, that yields a compact representation; i.e. a model that depends on only a few of the observations, selecting a small subset of features for classification or visualization. Selection of an optimal representation which is sufficiently sparse enables efficient computation by optimization techniques and alleviates the extreme difficulty encountered without sufficient sparsity.

As used herein, the terminology "target" area means area of interest, which may be, for example, a scene, an animal or human body or portion thereof, face (as in face recognition), object, ground region, field, landscape, aerial environment, or a combination thereof.

The term "noise" as used herein relates to observation noise. There are many sources that cause noise in the resulting observed signal. Noise can be divided into two categories: additive noise and multiplicative noise. System noise, thermal noise, quantization noise, self-interference noise, radio frequency interference (RFI) noise are some examples of the additive noise. Multiplicative noise is much more difficult to deal with since it is data dependent. Some sources that cause multiplicative noise include: timing jitter in data sampling, small aperture size compared to image area, the under-sampling of aperture samples, the non-uniform spacing between aperture samples, errors in position measurement system, etc. Multiplicative noise results in undesired sidelobes that create high noise floor in the image and thus limit the ability to detect targets.

As used herein, the terminology "dictionary" means an organized listing of data stored in machine-readable form for reference. The dictionary may be located in any type of storage or memory for storage of data. As an example, the "dictionary" may comprise phase shifted versions of the point target response.

As used herein the terminology "memory" or "memory portion" means computer memory used to store data on a temporary or permanent basis for use in conjunction with computer, processor, microprocessor, or the like. The term "memory" means any physical system that can store data. As used herein, when the terms "first" memory and "second" memory are used, the first and second memories may be portions or areas of the same memory, i.e., separate storage areas within a memory device or a plurality of memory devices.

As used herein the terminology "processor" means computer, microprocessor, CPU, desktop computer, laptop, tablet, mobile processor, main frame, or the like.

As used herein the terminology "spectrum estimator" includes a spectrum analyzer and a spectrum detector which detects interfering signals. For example, the detector will detect any frequency band that has higher power than the spectral response of a radar system As used herein, the "point-target response" means a reconstructed (or in radar terminology, range-compressed) signal from a point-like target at the receiver output. The "point-target response" can be represented in time domain as s(t) (echo from a point-target) or in frequency domain as S(f), where S(f) is the Fourier transform of s(t). S(f) also occupies the same frequency band of the radar transmit signal. The transmit pulse can be short impulse, chirp (frequency modulation), or stepped sine waves. As an example of a "point-target response," in the case of impulse radar, the radar transmits a short pulse s(t) that occupies the full bandwidth of the radar. In theory, if the transmit antenna, the receive antenna, the radar electronics are perfect, the echo from a point target should be $s(t-t_0)$, which is exactly the same as s(t) with a time delay $t_0$. In the perfect case, the point-target response is a stored replica of the transmit signal upon reflection from a point-like target (taking into account the processing of the system). However, since the radar components (antennas, electronics) have their own transfer functions, the echo from a point target would be s'(t) with some delay, which is a modified version of s(t). For simplicity, it is assumed that s'(t)=s(t). The echo signal s(t) or s'(t) is called range-compressed signal. The "point-target response" may be based upon construction at the receiver output and may be computed from the radar parameters. The typical composite return signal from a scene is a linear combination of many point target responses with various phases and amplitudes. For frequency modulation (FM) radar, the transmit signal p(t) also occupies the full bandwidth of the radar but is stretched in time. Thus, at the receiver the response from a point-target must be reconstructed by matching the echo signal $p(t-t_0)$ to the transmit signal to get the equivalent range-compressed signal s(t) as in the case of impulse radar. As a further example, for stepped-frequency radar, the radar transmits many pulses (each with a single frequency), and many echo signals from a point-target are used to reconstruct the equivalent range-compressed signal s(t) as in the case of impulse radar. In the case of frequency modulated radar or stepped frequency radar, the "point-target response" means, as used herein, the range-compressed point-target response. This is because impulse radar transmit signal occupies the full frequency band in a very short time (hence, range-compressed). Frequency modulated radar transmit signal occupies the full frequency band in a longer time interval (thus the need for a reconstructed range-compressed signal). Stepped-frequency only transmits one frequency at a time. It eventually transmits all frequency in the band after a number of transmit pulses. The term "point target response" includes impulse response in time or spatial domain or transfer function in the frequency domain from any radar, communication, signal processing systems. The term "point target response" also covers point spread function in imaging systems.

As used herein the terminology "spectral" means of or relating to a spectrum. The terminology "spectrum" refers to a band, portion or region of the electromagnetic spectrum which may or may not be continuous, for example, the radio spectrum is the region of the electromagnetic spectrum spanning the radio frequency range. The terminology "spectra" is the plural of spectrum.

As used herein, the terminology "noise extracted signal" refers to the estimation of the received signal without noise or interfering signals.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for reception of electromagnetic waves in a spectrum in which interference with radio frequencies of other electronics devices occurs comprising:
at least one transmitter configured to transmit signals at a wide range of frequencies, including frequencies in which RF devices transmit;

at least one receiver configured to receive the received signal; each received signal organized into a digital vector;

at least one memory portion configured to store a plurality of received signals in a vector form; the vectors being combined into a matrix, each vector of the matrix being a digital data record representing a received signal;

at least one processor operatively connected to the at least one memory portion; the at least one processor configured to estimate that portion of the received signal attributable to noise;

the at least one processor operating to jointly estimate a minimal number of distinctive noise patterns and minimize the simplicity of the data of interest;

the at least processor operating to process the noise and data of interest separately.

2. The system of claim 1 wherein the at least one memory portion comprises a first portion for storing the received signal, a second portion in which the processor stores the noise and a third memory portion in which the at least one processor stores the data of interest.

3. The system of claim 1 wherein the noise and data is separated by using the optimization problem:

$$\{\hat{R}, \hat{X}\} = \underset{R,X}{\mathrm{argmin}}\, \mathrm{rank}(R) + \lambda \|X\|_0 \text{ subject to } Y = X + R$$

where Y is the received signal which is separated into components X representing the data of interest and R representing the noise; the rank operator computes the matrix rank of R whereas the $l_0$-norm of the matrix X counts the number of its non-zero entries, and searches for the lowest-rank matrix R and the sparsest matrix X with respect to the constraint that the B noise R and data X to the received signal matrix Y.

4. The system of claim 1 wherein the noise and data is separated by using the optimization problem:

$$\{\hat{R}, \hat{X}\} = \underset{R,X}{\mathrm{argmin}}\, \|R\|_* + \lambda \|X\|_1 \text{ subject to } Y = X + R$$

where Y is the received signal which is separated into components X representing the data of interest and R representing the noise, $\|R\|_*$ is the nuclear norm of R, approximating its rank, while $\|X\|_1$ is the $l_1$ entry norm of X, approximating its simplicity level, and the $\lambda$ parameter controls the trade-off between the two components with respect to the constraint that the noise R and data X to the received signal matrix Y.

5. The system of claim 1 wherein the noise and data is separated by using the optimization problem:

$$\{\hat{R}, \hat{S}\} = \underset{R,S}{\mathrm{argmin}}\, \|R\|_* + \lambda \|S\|_1 + \frac{\tau}{2}\|Y - D^xS - R\|_F^2$$

subject to $Y = X + R$ where Y is the received signal which is separated into components X representing the data of interest modeled as $X = D^xS$ where $D^x$ is the dictionary of a transmitted waveform, R representing the noise, $\|R\|_*$ is the nuclear norm of R, approximating its rank, S is a matrix of data the sparse codes1, $\|S\|_1$ represents the $l_1$ entry norm of S, and the $\{\lambda, \tau\}$ parameters control the trade-off between the three components with respect to the constraint that the summation of the noise R and data X comes substantially close to the received signal matrix Y as enforced by the Frobenius-norm term $\|Y-D^xS-R\|_F^2$.

6. The system of claim 3 wherein the parameter $\lambda$ is employed as a contrast adjustment parameter which allows a trade-off between more details in a scene with a higher noise leverl or less details in a scene with a lower noise level.

7. The system of claim 1 wherein the received signals are compiled in a first matrix and the at least one processor operates to separate the first matrix into a data matrix and a noise matrix, the at least one processor being configured to simultaneously minimize the number of patterns in the noise matrix while minimizing the number of nonzero entries in the data matrix.

8. The system of claim 3 wherein the at least one processor is configured to determine the noise pattern using Eigen vectors to estimate that portion of the received signal attributable to noise.

9. The system of claim 3 wherein the at least one processor simultaneously utilizes an iterative procedure wherein the summation of the estimated noise signals and estimated data remain substantially equal to the received signals, while the noise components are captured as a linear combination of the Eigen vectors.

10. The system of claim 8 wherein it is desirable to minimize the number of distinctive noise signal sources and each of the noise sources is estimated utilizing an Eigen vector.

11. The system of claim 8 wherein the number of data sources represent the number of targets or objects in a scene; each non-zero entry in a vector corresponds to an object or target in a scene of interest.

12. The system of claim 1 wherein the system utilizes a synthetic aperture and each sample value of the vector is a variation of the range in the scene.

13. The system of claim 1 configured into one of noise cancellation headphones, noise cancellation devices, noise cancellation systems, speech enhancement systems in speech responsive devices, hands-free communication systems inside cars or buildings, cellphones or radios; and wherein a data source or a target of interest is one of trees, bushes, rocks, vehicles, manmade objects, land mines, buildings, and wherein a noise source is one of signals from cell phones, radio stations, jammers, cross-talk, other radars, television stations, communications devices, and/or communications systems.

14. A method of making a system for reception of electromagnetic waves in a spectrum in which interference with radio frequencies of other electronics devices occurs comprising:

providing at least one transmitter configured to transmit signals at a wide range of frequencies, including frequencies in which RF devices transmit;

providing at least one receiver configured to receive the received signal; each received signal organized into a digital vector;

providing at least one memory portion configured to store a plurality of received signals in a vector form; the vectors being combined into a matrix, each vector of the matrix being a digital data record representing a received signal;

proving at least one processor operatively connected to the at least one memory portion; the at least one processor configured to estimate that portion of the received signal attributable to noise; the at least one processor operating to jointly estimate a minimal number of distinctive noise patterns and minimize the simplicity of the data of interest;

the at least processor being configured to process the noise and data of interest separately.

15. The method of claim 14 wherein the at least one processor is configured to separate the noise and data using the optimization problem:

$$\{\hat{R}, \hat{X}\} = \underset{R,X}{\operatorname{argmin}} \operatorname{rank}(R) + \lambda \|X\|_0 \text{ subject to } Y = X + R$$

where Y is the received signal which is separated into components X representing the data of interest and R representing the noise; the rank operator computes the matrix rank of R whereas the $l_0$-norm of the matrix X counts the number of its non-zero entries, and searches for the lowest-rank matrix R and the sparsest matrix X with respect to the constraint that the B noise R and data X to the received signal matrix Y.

16. The method of claim 14 wherein the at least one processor is configured to separate the noise and data using the optimization problem:

$$\{\hat{R}, \hat{X}\} = \underset{R,X}{\operatorname{argmin}} \|R\|_* + \lambda \|X\|_1 \text{ subject to } Y = X + R$$

where Y is the received signal which is separated into components X representing the data of interest and R representing the noise, $\|R\|_*$ is the nuclear norm of R, approximating its rank, while $\|X\|_1$, is the $l_1$ entry norm of X, approximating its simplicity level, and the $\lambda$ parameter controls the trade-off between the two components with respect to the constraint that the noise R and data X to the received signal matrix Y.

17. The method of claim 14 wherein the at least one processor is configured to separate the noise and data using the optimization problem:

$$\{\hat{R}, \hat{S}\} = \underset{R,S}{\operatorname{argmin}} \|R\|_* + \lambda \|S\|_1 + \frac{\tau}{2} \|Y - D^x S - R\|_F^2$$

subject to $Y = X + R$ where Y is the received signal which is separated into components X representing the data of interest modeled as $X = D^x S$ where $D^x$ is the dictionary of a transmitted waveform, R representing the noise, $\|R\|_*$ is the nuclear norm of R, approximating its rank, S is a matrix of data the sparse codes1, $\|S\|_1$ represents the $l_1$ entry norm of S, and the $\{\lambda, \tau\}$ parameters control the trade-off between the three components with respect to the constraint that the summation of the noise R and data X comes substantially close to the received signal matrix Y as enforced by the Frobenius-norm term $\|Y - D^x S - R\|_F^2$.

18. The method of claim 15 wherein the parameter $\lambda$ is employed as a contrast adjustment parameter which allows a trade-off between more details in a scene with a higher noise leverl or less details in a scene with a lower noise level.

19. A system for reception of electromagnetic waves in which noise occurs comprising:

a transmitter configured to transmit signals at a wide range of frequencies, including frequencies in which radio frequency devices transmit;

at least one receiver configured to receive the received signal; each received signal organized into a vector;

at least one memory portion configured to store a plurality of received signals in a vector form; the vectors being combined into a matrix, each vector of the matrix being a digital data record representing a received signal;

at least one processor operatively connected to the at least one receiver; the at least one processor operating to jointly estimate a minimal number of distinctive noise patterns and minimize the simplicity of the data of interest;

the at least processor operating to process the noise and data of interest separately.

20. The system of claim 19 wherein the at least one processor is configured to form a matrix comprising rows and columns for storage of point target response data and components of the interfering signal and wherein the at least one processor is configured to utilize an optimization process in conjunction with the low-rank representations to determine amplitudes and frequency locations of the noise components in the received signal.

* * * * *